United States Patent [19]

Hasegawa

[11] Patent Number: 5,423,526
[45] Date of Patent: Jun. 13, 1995

[54] SHEET SUPPLYING APPARATUS

[75] Inventor: Kazuhiko Hasegawa, Kawasaki, Japan

[73] Assignee: Canon Kabushiki Kaisha, Tokyo, Japan

[21] Appl. No.: 80,715

[22] Filed: Jun. 24, 1993

[30] Foreign Application Priority Data

Jun. 26, 1992 [JP] Japan ................... 4-193115

[51] Int. Cl.⁶ ............................................. B65H 5/00
[52] U.S. Cl. ...................... 271/10; 271/110; 271/114; 271/118
[58] Field of Search .............. 271/10, 110, 111, 114, 271/116, 117, 118

[56] References Cited

U.S. PATENT DOCUMENTS

| 3,288,461 | 11/1966 | Smith | 271/35 |
| 4,822,023 | 4/1989 | Miyoshi | 271/118 |
| 4,927,130 | 5/1990 | Tanaka et al. | 271/10 |
| 5,259,607 | 11/1993 | Hironori et al. | 271/10 |

FOREIGN PATENT DOCUMENTS

| 311821 | 4/1989 | European Pat. Off. | |
| 468432 | 1/1992 | European Pat. Off. | |
| 0051521 | 3/1987 | Japan | 271/117 |
| 3216428 | 9/1991 | Japan | 271/110 |

OTHER PUBLICATIONS

Groenewald, Picker Document and Separator, 1-72, IBM Technical Disclosure Bulletin, vol. 14 No. 18 pp. 2265-2256.

Thigpen, Rotating Arm for Picker Roller, 8-76, IBM Technical Disclosure Bulletin, vol. 19 No. 3 pp. 752-753.

*Primary Examiner*—H. Grant Skaggs
*Assistant Examiner*—Carol L. Druzbick
*Attorney, Agent, or Firm*—Fitzpatrick, Cella, Harper & Scinto

[57] ABSTRACT

The present invention provides a sheet supplying apparatus with a feeding device for feeding out sheets tacked on a stacking tray, a separator for separating the sheets fed out by the feeding device one by one and for conveying the separated sheet, a drive device for driving the separator and the feeding device, sheet conveyer for conveying the sheet separated by the separator at a speed faster than a conveying speed of the separator, a rotation controller for transmitting one direction rotation of the drive device to a drive shaft of the drive device to cause the separation and conveyance of the sheet and for interrupting the transmission of the one direction rotation to the drive shaft so that the separator is driven by the movement of the sheet due to the difference in conveying speed thereby causing such interruption by the driven movement of the separator, support for supporting the feeding device for shifting movement between a sheet convey position and a non-convey position and for shifting the feeding device to the sheet convey position, and a retractor for retracting the feeding device to the non-convey position when the one direction rotation to the drive shaft is interrupted.

34 Claims, 37 Drawing Sheets

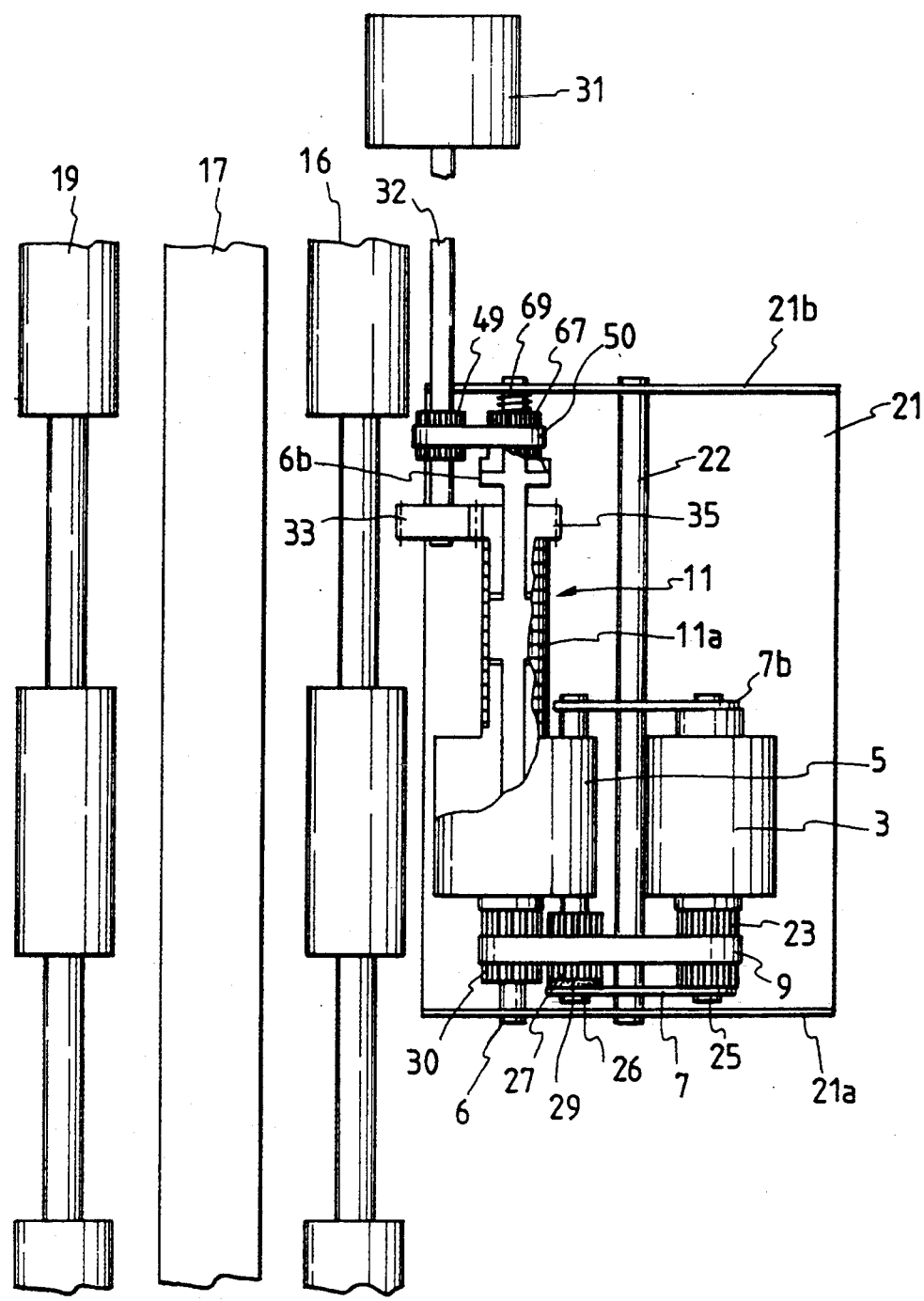

SHEET SUPPLYING APPARATUS

BACKGROUND OF THE INVENTION

1. Field of the Invention

The present invention relates to a sheet supplying apparatus for supplying a sheet such as a recording sheet or an original sheet to an image forming apparatus such as a copying machine, a printer, a facsimile and the like.

2. Related Background Art

In the past, for example, in an image forming apparatus such as a facsimile system and the like, sheets such as original sheets supplied from a sheet stacking tray are separated one by one by a separation means, and a separated sheet is sent, by a convey means, to a reading portion where image information on the sheet is read, and thereafter the sheet is discharged out of the apparatus.

The sheets stacked on the sheet stacking tray are sent to the separation means from the lowermost one by rotating an auxiliary convey means (referred to as "auxiliary convey roller" hereinafter) disposed below the sheet stacking tray while abutting it against the lowermost sheet of the sheet stack. Since a rotary shaft of the auxiliary convey roller is not shifted and a peripheral surface of the auxiliary convey roller has an ellipic shape or a triangular shape in order to transmit and interrupt the sheet feeding force to the sheet, when the auxiliary convey roller is rotated, the peripheral surface of the auxiliary convey roller is protruded upwardly and retracted downwardly with respect to the sheet stacking tray repeatedly.

On the other hand, there is a conveying mechanism in which a shaft of an auxiliary convey roller can be shifted in an up-and-down direction so that, when it is shifted upwardly, the auxiliary convey roller is abutted against the sheet stack, thereby feeding the sheet. In this mechanism, the upward and downward movement of the auxiliary convey roller is controlled by an electric signal via a plunger or an electromagnetic clutch for shifting the auxiliary convey roller.

However, in case of the auxiliary convey roller having the elliptic or triangular peripheral surface, since the auxiliary convey roller is extended and retracted with respect to the sheet stacking tray, the feeding force is transmitted and interrupted repeatedly with respect to the sheet (i.e. transmitted intermittently). Thus, it takes a long feeding time and the influence upon the separation means is not stabilized, thereby causing the double-feed of the sheets or the poor sheet feeding.

On the other hand, in the mechanism for controlling the upward and downward movement of the auxiliary convey roller by using the plunger or the electromagnetic clutch, since the number of parts is increased, the apparatus is made expensive and large-sized.

SUMMARY OF THE INVENTION

An object of the present invention is to provide a sheet supplying apparatus wherein the influence of an auxiliary convey roller upon a separation means can be stabilized without using any electric elements and control means therefor.

According to one aspect of the present invention, there is provided a sheet supplying apparatus comprising an auxiliary convey means for conveying sheets stacked on a stacking tray, a separation means for separating and conveying the sheets fed by the auxiliary convey means one by one, a sheet convey means for conveying the sheet separated by the separation means at a conveying speed faster than a conveying speed of the separation means, a supporting means for supporting the auxiliary convey means for shifting movement between a convey position and a non-convey position and for shifting the auxiliary convey means to the convey position when a rotation is transmitted to the separation means, and a retard means driven by the movement of the sheet conveyed by the sheet convey means, thereby retarding the auxiliary convey means to the non-convey position.

According to another aspect of the present invention, there is provided a sheet supplying apparatus comprising an auxiliary convey means for conveying sheets stacked on a stacking tray, a separation means for separating and conveying the sheets fed by the auxiliary convey means one by one, a drive means for driving the separation means and the auxiliary convey means, a sheet convey means for conveying the sheet separated by the separation means at a conveying speed faster than a conveying speed of the separation means, a rotation control means for transmitting one direction rotation (rotation in one direction) of the drive means to a shaft of the drive means to cause the separation and conveyance of the sheet and for interrupting the transmission of the one direction rotation to the drive means when the separated sheet is conveyed by the sheet convey means so that the separation means is driven by the movement of the sheet due to the difference in the conveying speed, thereby causing such interruption by the driven movement of the separation means, a supporting means for supporting the auxiliary convey means for shifting movement between a convey position and a non-convey position and for shifting the auxiliary convey means to the convey position when the one direction rotation is transmitted to the shaft of the drive means, and a retard means for retarding the auxiliary convey means to the non-convey position when the one direction rotation to the drive shaft is interrupted.

With the arrangement as mentioned above, when the one direction rotation from the drive means is transmitted to the drive shaft by the rotation control means, the supporting means shifts the auxiliary convey means to the convey position by such rotation, whereby the sheets stacked on the stacking tray are fed out by the auxiliary convey means toward the separation means. The sheet separated by the separation means is further conveyed by the sheet convey means. In this case, since the conveying speed of the sheet convey means is faster than that of the separation means, the separation means is driven by the movement of the sheet. By this driven movement of the separation means, the rotation control means interrupts the transmission of the one direction rotation to the drive shaft, thereby retarding the auxiliary convey means to the non-convey position by the retard means. In this way, the auxiliary convey means is automatically shifted between the convey position and the non-convey position only by the rotation of the drive means, thereby supplying the sheets successively.

BRIEF DESCRIPTION OF THE DRAWINGS

FIG. 13 is a plan view showing a fifth alteration of the first embodiment;

DETAILED DESCRIPTION OF THE PREFERRED EMBODIMENTS

Figure 1:
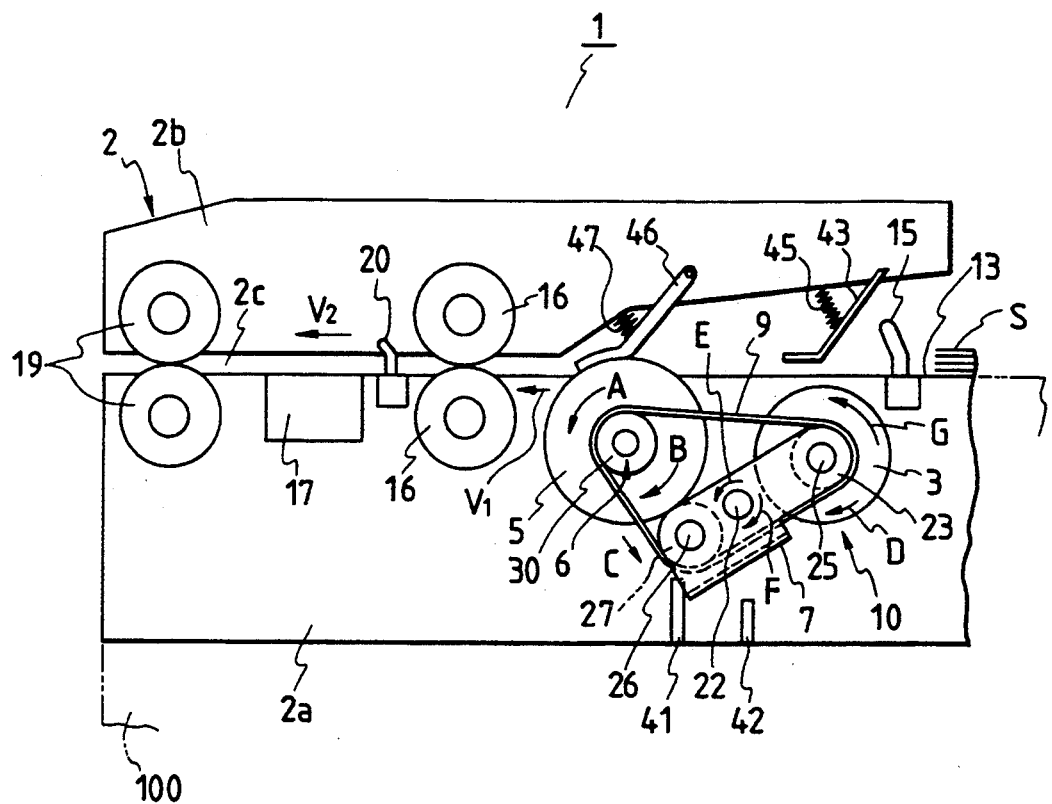
FIG. 1 is a longitudinal sectional view of a sheet supplying apparatus according to a first embodiment of the present invention.

The present invention will now be explained with reference to the accompanying drawings.

First of all, a first embodiment of the present invention will be described referring to FIGS. 1 to 3.

In this embodiment, a sheet supplying apparatus according to the present invention is applied to a facsimile system as an image forming apparatus. A frame 2 of the sheet supplying apparatus 1 comprises an upper frame 2b and a lower frame 2a which define a sheet convey path 2c therebetween. At an upstream side of the sheet supplying apparatus 1, there is arranged a sheet stacking tray 13 on which a plurality of sheets S to be read are stacked, and a sheet detection sensor 15 for detecting the presence/absence of the sheet S is disposed on the sheet stacking tray 13.

At a downstream side of the sheet detection sensor 15, there are arranged an auxiliary convey roller (auxiliary convey means) 3 for feeding out and conveying the sheet S, and a separation roller (separation means) 5 for separating the sheet S one by one when plural sheets are fed out. These elements will be fully described later. At a downstream side of the separation roller 5, there are arranged in order a pair of convey rollers 16 for conveying the separated sheet S, a reading portion 17 for reading image information on the sheet S, and a pair of discharge rollers 19 for discharging the read sheet out of the apparatus. An aligning sensor 20 for detecting a leading end of the separated and conveyed sheet S is disposed between the paired convey rollers 16 and the reading portion 17. Incidentally, a conveying speed $V_2$ of the convey roller pair 16 for conveying the sheet S is selected to be faster than a conveying speed $V_1$ of the separation roller 5.

Figure 3:
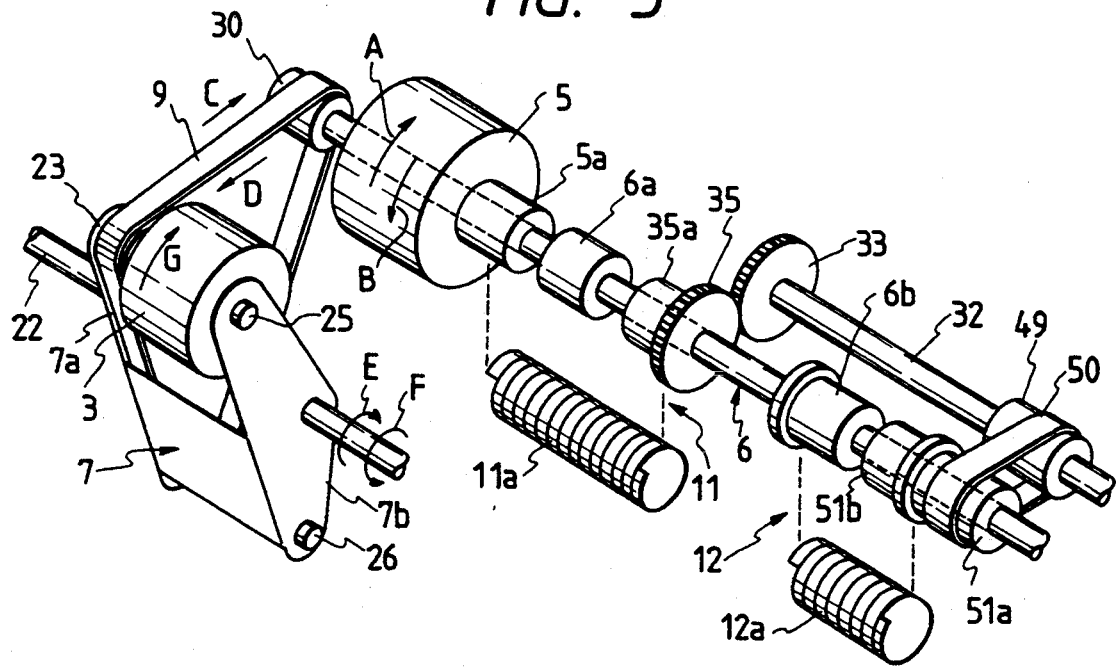
FIG. 3 is a perspective view of the sheet supplying apparatus of FIG. 1.
Figure 2:
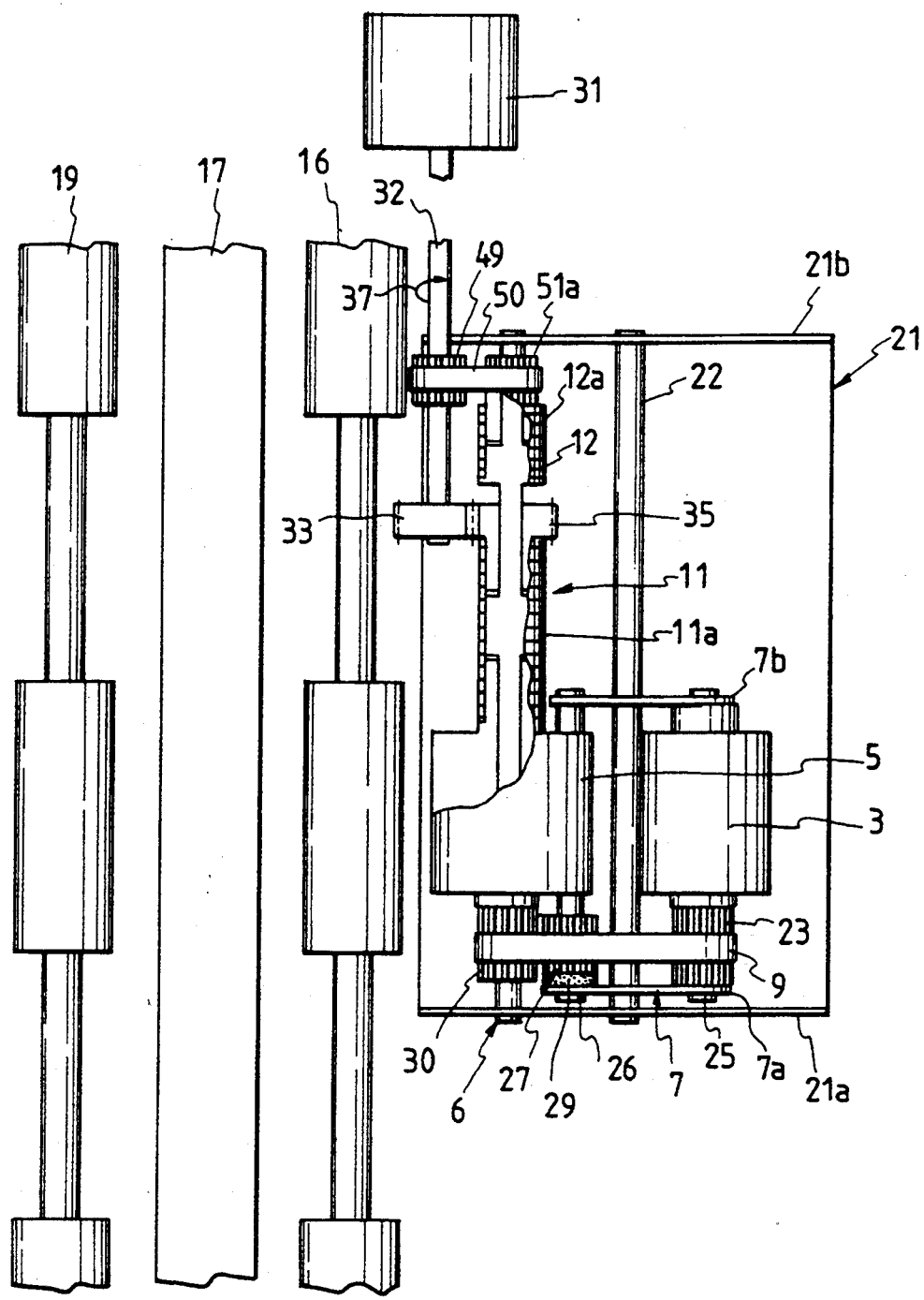
FIG. 2 is a plan view of the sheet supplying apparatus of FIG. 1.

As shown in FIG. 2, within the lower frame 2a below the sheet stacking tray 13, a frame 21 having side plates 21a, 21b is arranged, and a separation shaft (drive shaft) 6 rotatably supported by the side plates 21a, 21b has a large diameter portions 6a, 6b secured thereto as shown in FIG. 3. At the left and right of the large diameter portion 6a of the separation shaft 6, the separation roller 5 having a boss 5a and a separation gear 35 having a boss 35a are rotatably mounted on the shaft, respectively. The large diameter portion 6a, the bosses 5a, 35a having the same diameter as that of the large diameter portion, and a clutch spring 11a wound around these elements constitute a first clutch (rotation control means) 11 comprising a one-way rotation clutch.

A motor gear 33 meshed with the separation gear 35 is secured to an output shaft 32 of the drive motor (drive means) 31 fixed to a fixed member (not shown) and is rotated in a direct ion shown 37 by the arrow in FIG. 2. Incidentally, the first clutch 11 is engaged when the separation gear 35 is rotated in a direction shown by the arrow A (FIG. 3) by the motor gear 33, thereby transmitting a rotational force of the drive motor 31 to the separation roller 5 and the separation shaft 6. Upon the engagement of the first clutch 11, the separation roller 5 and the separation shaft 6 are rotated in a sheet supplying direction shown by the arrow A (referred to as "normal rotation direction" hereinafter).

As shown in FIGS. 2 and 3, in the proximity of the large diameter portion 6b of the separation shaft 6, a reverse rotation driven pulley 51a having a barrel 51b having the same diameter as that of the large diameter portion is rotatably mounted on the shaft. The reverse rotation driven pulley 51a is connected to a reverse rotation drive pulley 49 secured to the output shaft 32 of the drive motor 31 via a reverse rotation belt 50 so that, when the drive motor 31 is rotated, the reverse rotation driven pulley is always rotated in a direction shown by the arrow B in FIG. 3 (referred to as "reverse rotation direction" hereinafter).

The barrel 51b of the reverse rotation driven pulley 51a, the large diameter portion 6b of the separation shaft 6 and a clutch spring 12a wound around these elements constitute a second clutch (reverse rotation clutch) 12 comprising a one-way rotation clutch. Incidentally, a winding direction of the clutch spring 12a of the second clutch 12 is the same as that of the clutch spring 11a of the first clutch 11, and a loosing torque of the clutch spring 12a with respect to the separation shaft 6 is greater than that of the clutch spring 11a.

Incidentally, as the means for transmitting the reverse rotation power, a pair of gears may be used in place of the above-mentioned reverse rotation belt 50, or a torque limiter which is disconnected from the drive motor 31 when a predetermined load is applied may be used in place of the above-mentioned second clutch 12.

A support shaft 22 is supported by the frame 21 at an upstream side of the separation shaft 6, and an intermediate portion of a support member 7 having side wall plates 7a, 7b is rotatably mounted on the support shaft 22. The auxiliary convey roller 3 having an auxiliary convey pulley 23 secured thereto is rotatably mounted on the support member 7 via a pivot shaft 25. Further, an idle pulley 27 is rotatably mounted on the support member 7 via a pivot shaft 26. A cushion member (friction member) 29 for applying the load to the idle pulley 27 to generate a rotational force (described layer) for rotating the support member 7 is arranged between the idle pulley 27 and the side wall plate 7a.

A drive pulley 30 is secured to the left end (lower end in FIG. 2) of the separation shaft 6 and is connected to the auxiliary convey pulley 23 and the idle pulley 27 via a shift belt 9. When the drive pulley 30 integral with the separation shaft 6 is rotated in the normal rotation direction A to rotate the shift belt in the normal rotation direction shown by the arrow C (anti-clockwise direction in FIG. 1), the support member 7 is rotated around the support shaft 22 in a direction shown by the arrow E (normal rotation direction) by the power due to the loading action of the cushion member 29. On the other hand, when the drive pulley 30 is rotated in the reverse rotation direction B to rotate the shift belt 9 in a direction shown by the arrow D, the support member 7 is rotated in a direction shown by the arrow F in FIG. 1 (reverse rotation direction).

The rotation of the support member 7 in the normal rotation direction is regulated by a normal rotation stopper 42 (FIG. 1) disposed below the support member 7, and the rotation of the support member 7 in the reverse rotation direction is regulated by a reverse rotation stopper 41. When the support member 7 is rotated in the normal rotation direction as mentioned above, the auxiliary convey roller 3 is shifted upwardly, so that an upper portion of the peripheral surface of this roller is protruded upwardly through an opening (not shown) formed in the sheet stacking tray 13 to abut against a lower surface of the sheet stack S.

An original hold-down member 43 is arranged above the auxiliary convey roller 3, which hold-down member has a base portion pivotally mounted on the upper frame 2b and a free end portion biased downwardly by a compression spring 45. When the auxiliary convey roller 3 is shifted upwardly, the original hold-down member 43 is abutted against the auxiliary convey roller 3 so that the latter provides a conveying force for conveying the sheet S. Further, a separation member 46 having a base portion pivotally mounted on the upper frame 2b is disposed above the separation roller 5. The separation member 46 is abutted against the separation roller 5 by a compression spring 47 to cooperate with the separation roller 5 for separating the sheets S.

Incidentally, the pair of convey rollers 16 and the pair of discharge rollers 19 are connected to the drive motor 31 via a transmission system such as a gear train or a belt (not shown). Accordingly, when the drive motor 31 is rotated, the separation roller 5, the auxiliary convey roller 3, the pair of convey rollers 16 and the pair of discharge rollers 19 are driven simultaneously.

Figure 4:
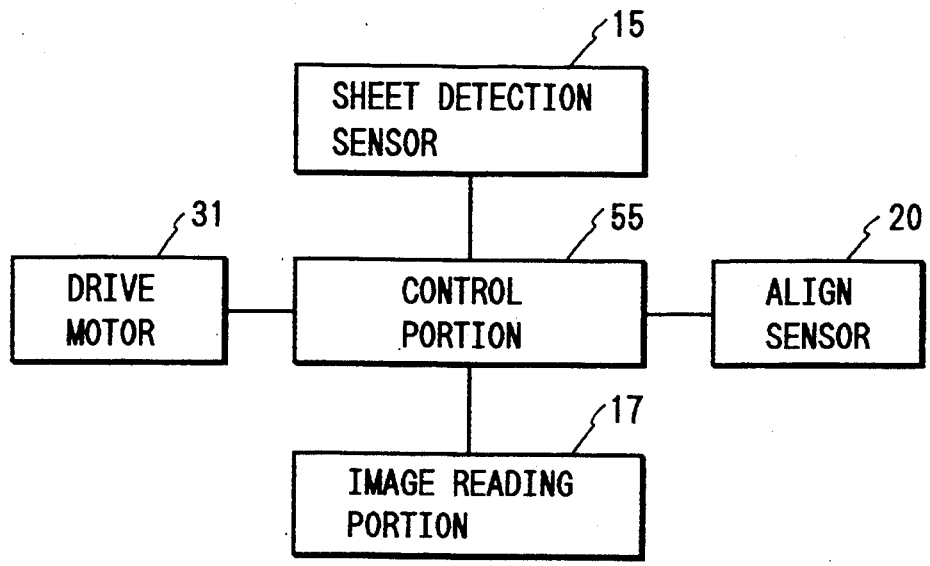
FIG. 4 is a block diagram of a control portion of the sheet supplying apparatus of FIG. 1.

FIG. 4 is a block diagram showing an example of a control portion of the sheet supplying apparatus of the present invention. In FIG. 4, the reference numeral 55 denotes a control portion of a facsimile system and the like having the sheet supplying apparatus according to the present invention. The sheet detection sensor 15, reading portion 17, aligning sensor 20 and drive motor 31 are controlled by the control portion 55.

Next, an operation of the sheet supplying apparatus according to the present invention will be explained.

First of all, an operation of the auxiliary convey system for feeding out the sheets S on the sheet stacking tray 13 will be described.

As shown in FIG. 1, in a condition that the auxiliary convey roller 3 is retarded below the sheet stacking tray 13, the separation roller 5 and the drive pulley 30 integral with the separation shaft 6 are rotated in the normal rotation direction (shown by the arrow A) in a manner which will be described later. As a result, when the rotation of the drive pulley 30 is transmitted to the idle pulley 27 and the auxiliary convey pulley 23 via the shift belt 9, the support member is firstly rotated around the pivot shaft 22 in the normal rotation direction E until it is stopped by the normal rotation stopper 42. Then, the auxiliary convey roller 3 and the idle pulley 27 are rotated in directions shown by the arrow G in FIG. 1, respectively.

In order to operate the support member 7 and the auxiliary convey roller 3 as mentioned above, it is necessary to reduce a rotational resistance of the support member 7 as small as possible, because, in a condition that the shift belt 9 is stopped, the auxiliary convey pulley 23 or the idle pulley 27 must be subjected to the rotational resistance to an extent that the support member 7 can be kept stationary at any position within a rotational range of the support member 7 without being rotated by the weight of the auxiliary convey roller 3, auxiliary convey pulley 23, pivot shaft 25, idle pulley 27, pivot shaft 26 and support member 7 themselves. To this end, in the illustrated embodiment, as shown in FIG. 2, the cushion member 29 is mounted on the pivot shaft 26 between the idle pulley 27 and the side wall plate 7a to apply the load to the idle pulley 27, thereby permitting the support member 7 to be made stationary at any position. Incidentally, the normal rotation stopper 42 is positioned so that the auxiliary convey roller 3 is subjected to an appropriate urging force from the original hold-down member 43 when it is positioned above the sheet stacking tray 13.

On the other hand, when the drive pulley 30 is rotated in the reverse rotation direction shown by the arrow B in FIG. 1 to transmit the driving force to the idle pulley 27 and the auxiliary convey pulley 23 via the shift belt 9, as shown in FIG. 1, the support member 7 is firstly rotated around the support shaft 22 in the reverse rotation direction (shown by the arrow F) until it is stopped by the reverse rotation stopper 41. The reverse rotation stopper 41 is positioned so that the auxiliary convey roller 3 is positioned below the sheet stacking tray 13 at this point. Further, within the rotational range of the support member 7, it is designed so that an outer peripheral length defined by the auxiliary convey pulley 23, idle pulley 27 and drive pulley 30 is substantially constant, whereby the shift belt 9 is prevented from being tensioned too great or too small during the rotation of the shift belt 9.

Figure 6:
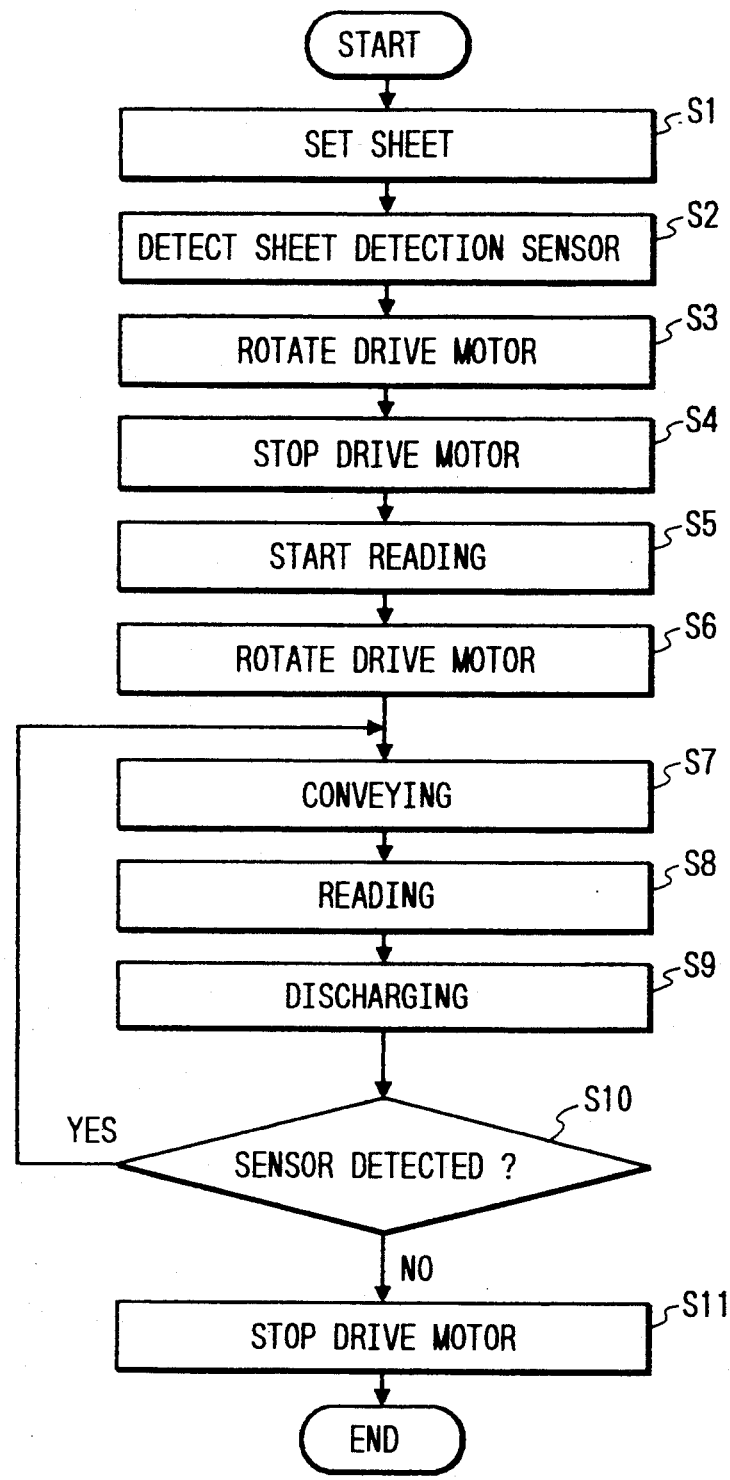
FIG. 6 is a flow chart showing the operation of the sheet supplying apparatus of FIG. 1.

Next, a reading operation of the facsimile system 100 incorporating the sheet supplying apparatus 1 therein will be explained with reference to a flow chart shown in FIG. 6.

First of all, when an operator sets the sheets S on the sheet stacking tray 13 (step S1), the sheet detection sensor 15 detects the presence of the sheets (step S2), and a detection signal from the sensor is sent to the control portion 55. The drive motor 31 is rotated, in the direction shown by the arrow 37 (step S3) by a signal from the control portion 55, thereby rotating the separation gear 35 in the direction A (normal rotation direction). Since the normal rotation of the separation gear 35 tightens the clutch spring 11a, the first clutch 11 is engaged or applied. The engagement of the first clutch 11 causes the separation gear 35 to connect to the large diameter portion 6a of the separation shaft 6 and the boss 5a of the separation roller 5, with the result that the separation roller 5 and the separation shaft 6 are rotated in the direction A.

On the other hand, by the rotation of the drive motor 31, the reverse rotation driven pulley 51a and the barrel 51b formed integrally therewith are rotated in the direction B (reverse rotation direction) in FIG. 3. The large diameter portion 6b of the separation shaft 6 constituting the second clutch 12 is rotated in the direction A, and the barrel 51b is rotated in the opposite direction B. However, since the clutch spring 12a acts in the loosing direction, the rotation of the separation shaft 6 in the direction A is not obstructed. That is, by the rotation of the drive motor 31, since the first clutch 11 is engaged and the second clutch 12 is disengaged, the rotation of the drive motor 31 is transmitted to the separation shaft 6 only through the first clutch 11, and the second clutch 12 does not concern to the transmitting operation in this case.

When the separation shaft 6 and the drive pulley 30 integral therewith are rotated in the direction A, as mentioned above, the support member 7 is rotated in the normal rotation direction and the auxiliary convey roller 3 is abutted against the sheet stack S, thereby supplying the sheets on the sheet stacking tray 13. The supplied sheets are sent to the separation roller 5, and then the lowermost sheet S is sent to a nip of the separation roller 5. If plural sheets S are sent to the nip, these sheets are separated, and only one sheet S is sent to the pair of convey rollers 16.

By the way, when the operator sets the sheets S on the sheet stacking tray 13, if the sheets S are inserted at a speed slower than a peripheral speed of the auxiliary convey roller 3, the sheets S are pulled by the auxiliary convey roller 3; whereas, if the sheets S are inserted at a speed faster than the peripheral speed of the auxiliary convey roller 3, the auxiliary convey roller 3 is driven by the movement of the sheets S, so that the auxiliary convey roller is rotated faster than a speed given by the drive motor 31.

By the above rotation of the auxiliary convey roller 3, since a length of the shift belt 9 between the auxiliary convey pulley 23 and the drive pulley 30 tends to be increased and a length of the shift belt 9 between the idle pulley 27 and the drive pulley 30 tends to be decreased, the support member 7 is rotated in the direction F in FIG. 1. As a result, since the auxiliary convey roller 3 is lowered to be spaced apart from the sheet S, it is not feared that the sheets S are caught by the auxiliary convey roller 3 during the sheet inserting operation, thereby damaging the sheet S.

Thereafter, when the operator stops the insertion of the sheets S, the auxiliary convey roller 3 is abutted against the sheet S again, thereby starting the supply of the sheet S. Incidentally, the rotation of the support member 7 is regulated by the reverse rotation stopper 41 so that the support member 7 is not excessively rotated in the reverse rotation direction (step S3). The sheets S supplied by the auxiliary convey roller 3 are separated one by one from the lowermost one by the separation roller 5 and the separation member 46. When the leading end of the separated sheet is detected by the aligning sensor 20, the control portion 55 controls to stop the drive motor 31 (step S4).

In this condition, the image density and resolving power during the reading of image information are set by the operator, and the reading is started (step S5). The drive motor 31 is rotated by the signal from the control portion 55 (step S6) to rotate the separation roller 5 and the separation shaft 6 in the normal rotation direction A.

The separated sheet S is conveyed to the reading portion 17 by the pair of convey rollers 16 (step S7), and the image information is read (step S8), and then the sheet is discharged out of the apparatus by the pair of discharge rollers 19 (step S9). Thereafter, when the fact that the sheet(s) still exist on the sheet stacking tray 13 by the sheet detection sensor 15 (step S10), a next sheet is conveyed in the same manner as mentioned above. When the presence of the sheet S is not detected by the sensor 15, it is considered that the reading of all of the sheets S has been completed, and the control portion 55 controls to stop the drive motor 31 (step S11).

In the above step S7, when the sheet S is conveyed to the reading portion 17 by the pair of convey rollers 16, since the peripheral speeds $V_2$ of the paired convey rollers 16 are faster than the peripheral speed $V_1$ of the separation roller 5, the separation roller 5 is driven by the movement of the conveyed sheet S. Accordingly, the separation roller 5 is rotated in the normal rotation direction at a speed faster than the rotational speed given by the drive motor 31, i.e., the rotational speed of the separation gear 35.

In FIGS. 2 and 3, since the boss 5a of the separation roller 5 is rotated at a speed faster than that of the large diameter portion 35a of the separation gear 35, the clutch spring 11a wound around these elements acts in the loosing direction, thereby interrupting the power transmitting operation of the first clutch 11. As a result, the separation gear 35 is rotated idly, and the power transmission to the separation shaft 6 is interrupted.

On the other hand, although the loosing torque due to the clutch spring 12a acts on the large diameter portion 6b constituting the second clutch 12, as mentioned above, since the loosing torque of the second clutch 12 to the separation shaft 6 is greater than that of the first clutch 11, the separation shaft 6 is rotated in the reverse rotation direction B. That is, when the first clutch 11 is disengaged or released, the separation shaft 6 is rotated in the reverse rotation direction (shown by the arrow B) by the loosing torque of the second clutch 12. Incidentally, even when the separation shaft 6 is rotated in the reverse rotation direction as mentioned above, the separation roller 5 is still driven by the movement of the sheet S in the normal rotation direction.

When the separation shaft 6 and the drive pulley 30 integral therewith are rotated in the reverse rotation direction, the shift belt 9 is rotated in the reverse direction shown by the arrow D, thereby rotating the support member 7 in the reverse rotation (shown by the arrow F) around the support shaft 22. The rotation of the support member 7 continues until the downstream end of the support member 7 is engaged by the reverse rotation stopper 41. By the reverse rotation of the support member 7, the auxiliary convey roller 3 is shifted to be spaced apart from the sheet stack S on the sheet stacking tray 13, thereby interrupting the transmission of the conveying force to the sheet S.

Thereafter, when the trailing end of the sheet S leaves the separation roller 5, the driving of the separation roller 5 by the movement of the sheet S is stopped. Consequently, the first clutch 11 is engaged, with the result that the shift belt 9 is rotated in the normal rotation direction and the support member 7 is also rotated in the normal rotation direction (shown by the arrow E) to abut the auxiliary convey roller 3 against the next sheet S, thereby supplying the next sheet S. When the first clutch 11 is engaged again to rotate the separation shaft 6 in the normal direction as mentioned above, the power transmitting action of the second clutch 12 for transmitting the reverse rotation force is released.

Incidentally, in some cases, there is no need to provide the auxiliary conveying force to the next sheet S, i.e., there is a case where a plurality of sheets S are properly wedged in the nip between the separation roller 5 and the separation member 46 thereby to convey the sheet only by the separation roller 5. In such a case, before the auxiliary convey roller 3 is protruded above the sheet stacking tray 13 to restore the auxiliary conveying force, the first clutch 11 is disengaged again. To this end, a time period during which the sheet S is conveyed from the separation position to the convey roller pair 16 by the separation roller 5 is so selected to be shorter than a time period during which the support member 7 is shifted between the normal rotation stopper 42 and the reverse rotation stopper 41, i.e., a time period during which the auxiliary convey roller 3 is shifted from a position where it is furthest spaced apart from the sheet stack S on the sheet stacking tray 13 to a position where it is abutted against the sheet stack S, thereby preventing the unnecessary conveying force from acting on the next sheet S at a proper timing (step S7).

With the above-mentioned arrangement of the sheet supplying apparatus according to the present invention, it is possible to automatically transmit or interrupt the auxiliary conveying force with respect to the sheet S without any complicated control only by the single drive motor 31, and to improve the setting ability of the sheets S on the sheet stacking tray 13.

Figure 7:
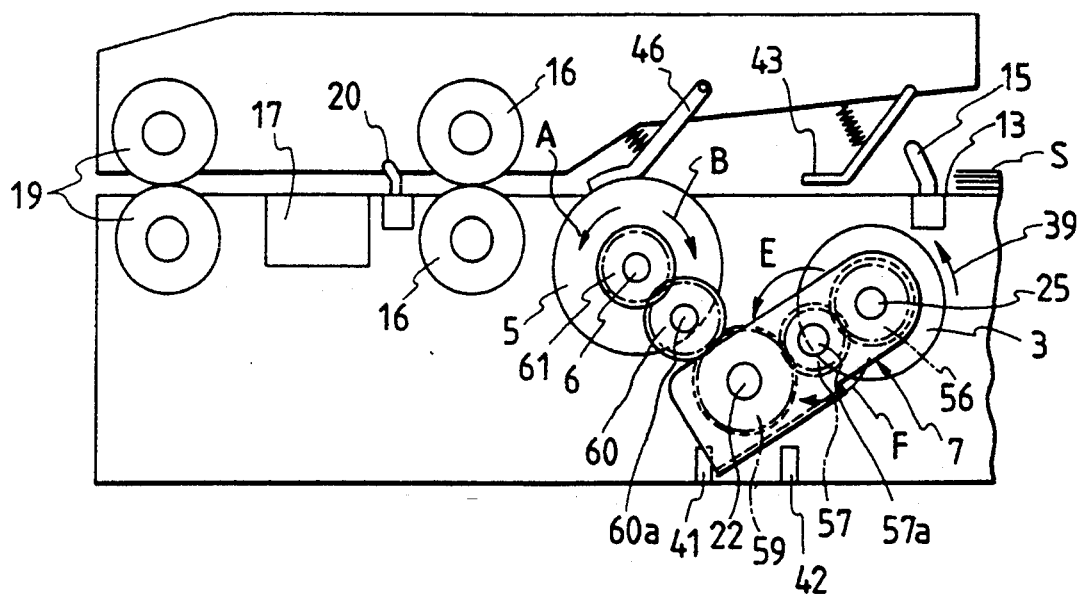
FIG. 7 is a longitudinal sectional view showing a first alteration of the first embodiment.
Figure 8:
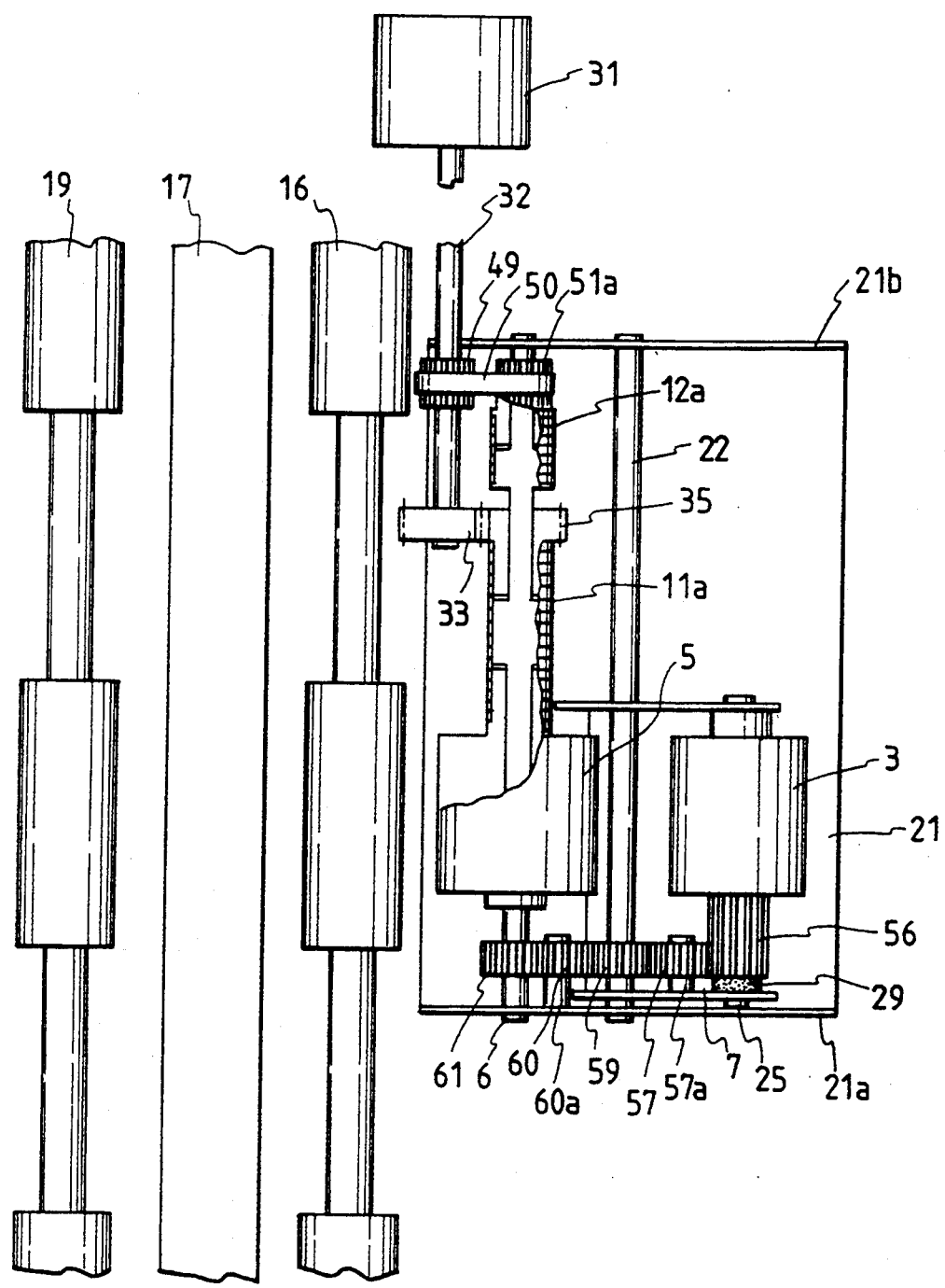
FIG. 8 is a plan view of the sheet supplying apparatus of FIG. 7.

FIGS. 7 and 8 show a first alteration of the first embodiment. In this first alteration, as the means for driving the auxiliary convey roller 3, gears are used in place of the above-mentioned shift belt 9.

In FIGS. 7 and 8, an auxiliary convey gear 56 is coaxially secured to the auxiliary convey roller 3, which gear 56 is connected to a support member gear 59 rotatably mounted on the support shaft 22 via an auxiliary convey transmission gear 57 rotatably mounted on a support shaft 57a of the support member 7. Further, the support member gear 59 is connected to a drive gear 61 secured to the separation shaft 6 via a drive transmission gear 60 rotatably mounted on a support shaft 60a of the frame 21. The cushion member 29 for applying the load to the rotation of the auxiliary convey roller 3 is disposed between the auxiliary convey gear 56 and the side wall plate 7a of the support member 7.

With the above-mentioned driving force transmitting arrangement, by selecting the disposition and the numbers of teeth of various gears, it is possible to set the rotational speed and the rotational range of the support member 7 relatively freely even if there are certain limitations.

Figure 9:
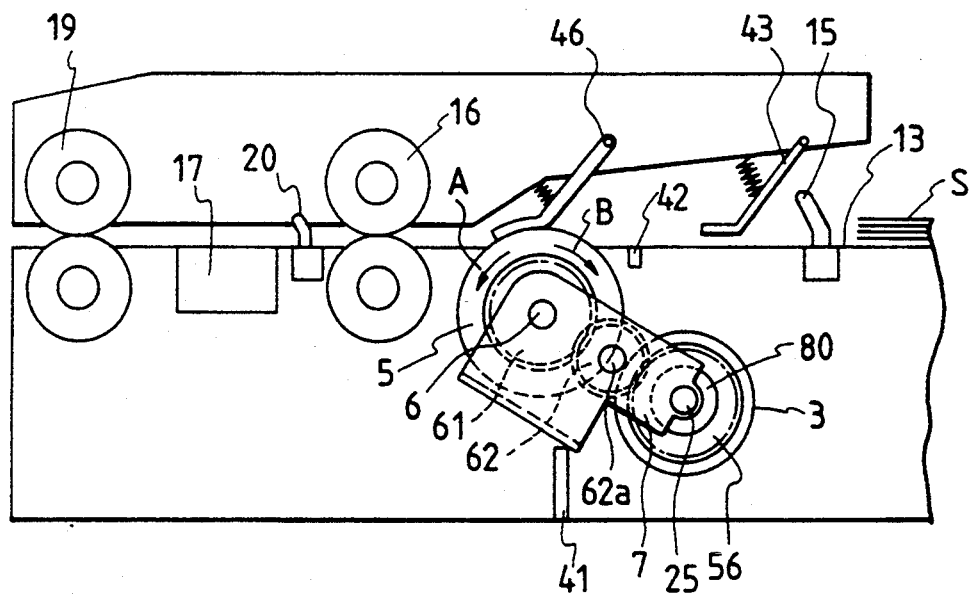
FIG. 9 is a longitudinal sectional view showing a second alteration of the first embodiment.
Figure 10:
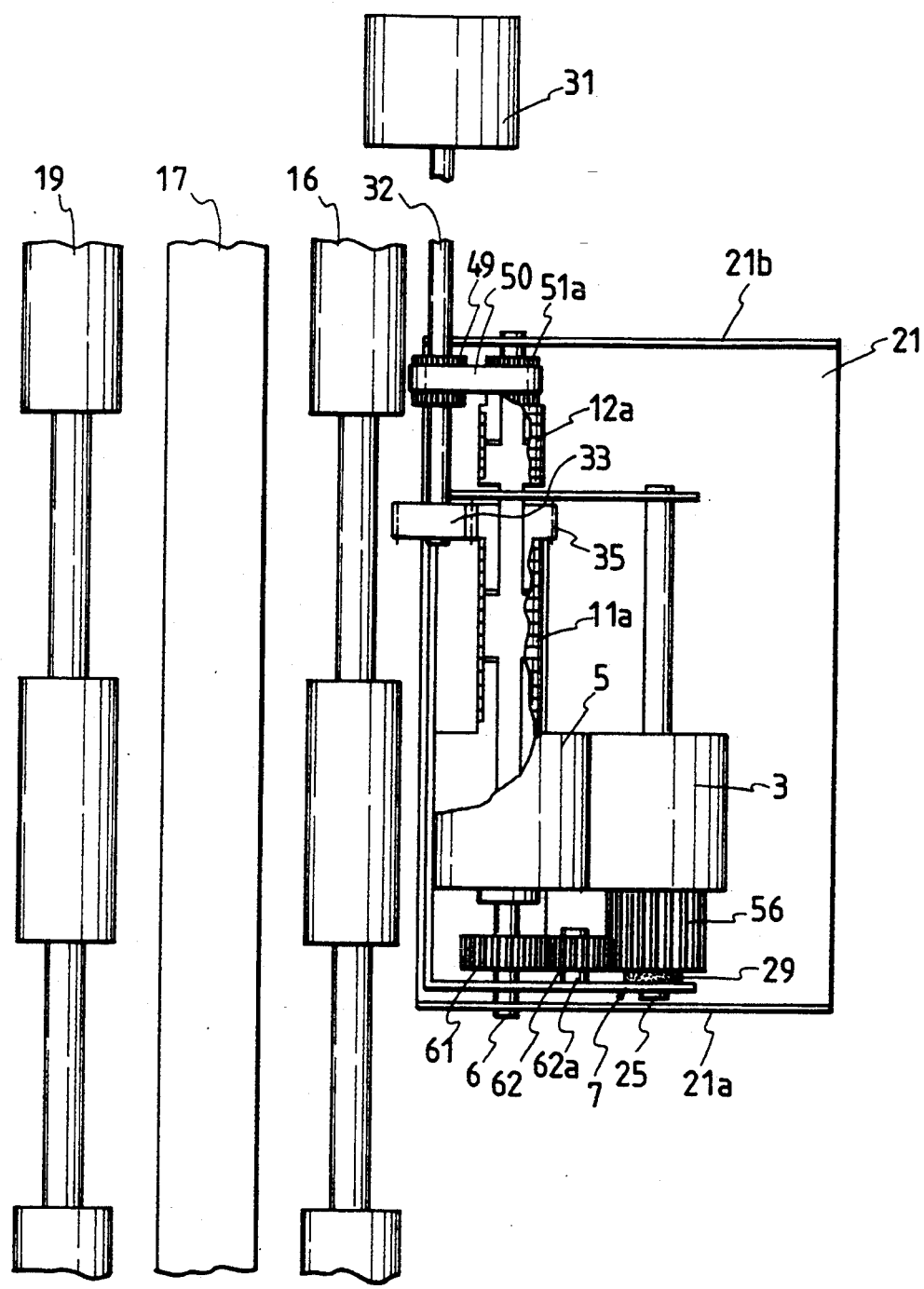
FIG. 10 is a plan view of the sheet supplying apparatus of FIG. 9.

FIGS. 9 and 10 show a second alteration of the first embodiment.

In this second alteration, the support member 7 is supported on the separation shaft 6. The drive gear 61 is connected to the auxiliary convey gear 56 integrally formed with the auxiliary convey roller 3 via an idle gear 62 rotatably mounted on the support member 7 via a support shaft 62a. With this arrangement, it is possible to reduce the number of parts, thereby making the apparatus inexpensive. Incidentally, in place of the idle gear 62, a belt may be used to transmit the driving force.

Figure 11:
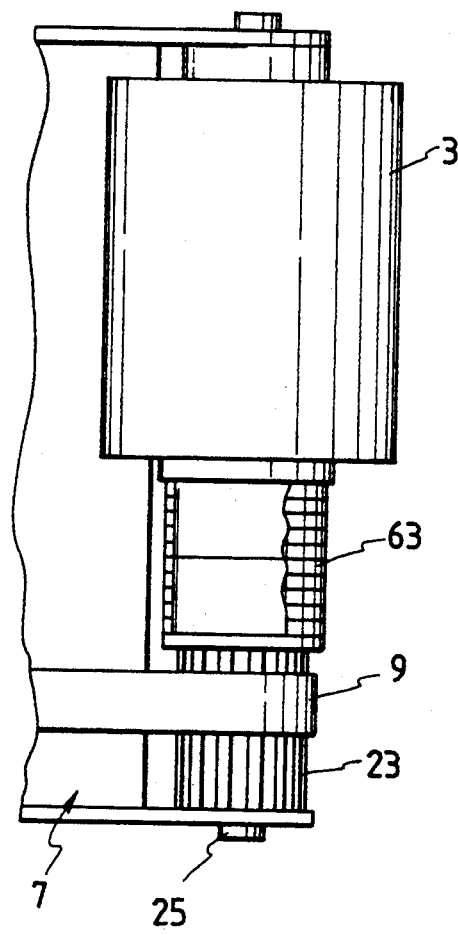
FIG. 11 is an enlarged view showing a main portion of a third alteration of the first embodiment.

FIG. 11 shows a third alteration of the first embodiment.

In this third alteration, the auxiliary convey roller 3 and the auxiliary convey pulley 23 are interconnected via a clutch. In FIG. 11, a spring clutch 63 is arranged between the auxiliary convey roller 3 and the auxiliary convey pulley 23, which spring clutch 63 serves to interrupt the driving force when the auxiliary convey roller 3 is rotated in the normal rotation direction (shown by the arrow G in FIG. 1).

With the above-mentioned arrangement of the drive transmitting system for the auxiliary convey roller 3, even when the drive pulley 30 is rotated in the reverse rotation direction, since the auxiliary convey roller 3 is driven by the movement of the sheet S, it is possible to prevent the sheet (original) S from being smudged by the rubbing of the auxiliary convey roller 3 and to permit the smooth reverse rotation of the support member 7. Further, when the operator sets the sheet S, even if the sheets s are inserted at a speed faster than the peripheral speed of the auxiliary convey roller 3, since the spring clutch 63 is disengaged so that the auxiliary convey roller 3 is driven by the movement of the sheet S, the sheet S is not damaged.

Figure 12:
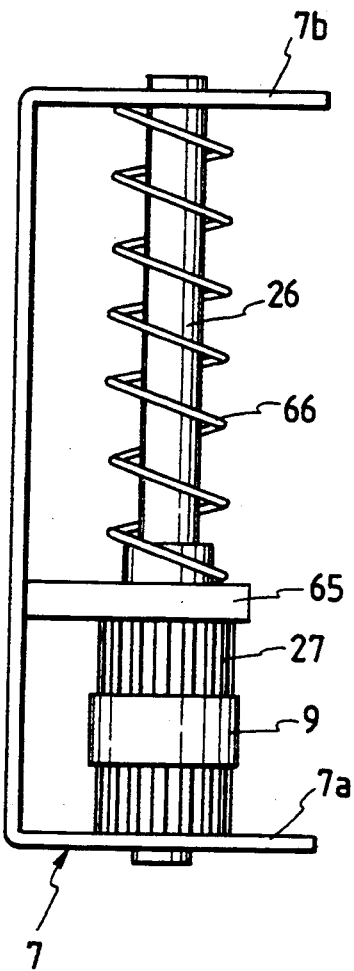
FIG. 12 is an enlarged view showing a main portion of a fourth alteration of the first embodiment.

FIG. 12 shows a fourth alteration of the first embodiment. In this alteration, another loading means for applying the load to the idle pulley 27 of the support member 7 is shown.

In FIG. 12, a friction plate 65 is freely mounted on the pivot shaft 26 at an inner end position of the idle pulley 27, which friction plate 65 is non-rotatably secured to the support member 7. The friction plate 65 is urged against the idle pulley 27 by an elastic force of a compression spring 66 disposed between the side wall plate 7b of the support member 7 and the friction plate 65, thereby applying the load (resistance) to the rotation of the idle pulley 27. Incidentally, as mentioned above, by using this arrangement, the load may be applied to the rotation of the auxiliary convey roller 3.

Next, alterations of the reverse rotation means according to the first embodiment will be explained with reference to FIGS. 13 to 21. In these alterations, a plurality of other means for rotating the separation shaft 6 in the reverse rotation direction are shown.

In FIG. 13, a friction reverse rotation pulley 67 is rotatably mounted on an outer end of the large diameter portion 6b of the separation shaft 6, which pulley 67 is connected to a reverse rotation drive pulley 49 via a reverse rotation belt 50. The friction reverse rotation pulley 67 has a friction member having high friction of coefficient provided on an interface between the large diameter portion 6b and the friction reverse rotation pulley. A compression spring 69 is disposed between the friction reverse rotation pulley 67 and a wall plate 21b of the frame 21, thereby urging the friction member of the friction reverse rotation pulley 67 against the large diameter portion 6b with an appropriate force. Although the friction reverse rotation pulley 67 is rotated in the reverse rotation direction through the reverse rotation belt 50, when the first clutch 11 is engaged and the separation shaft 6 is rotated in the normal rotation direction, the friction reverse rotation pulley 67 is slipped with respect to the large diameter portion 6b. When the first clutch 11 is disengaged, the rotation of the friction reverse rotation pulley 67 is transmitted to the separation shaft 6 by the friction force between the large diameter portion 6b and the friction reverse rotation pulley 67, thereby rotating the separation shaft 6 in the reverse rotation direction.

Figure 14:
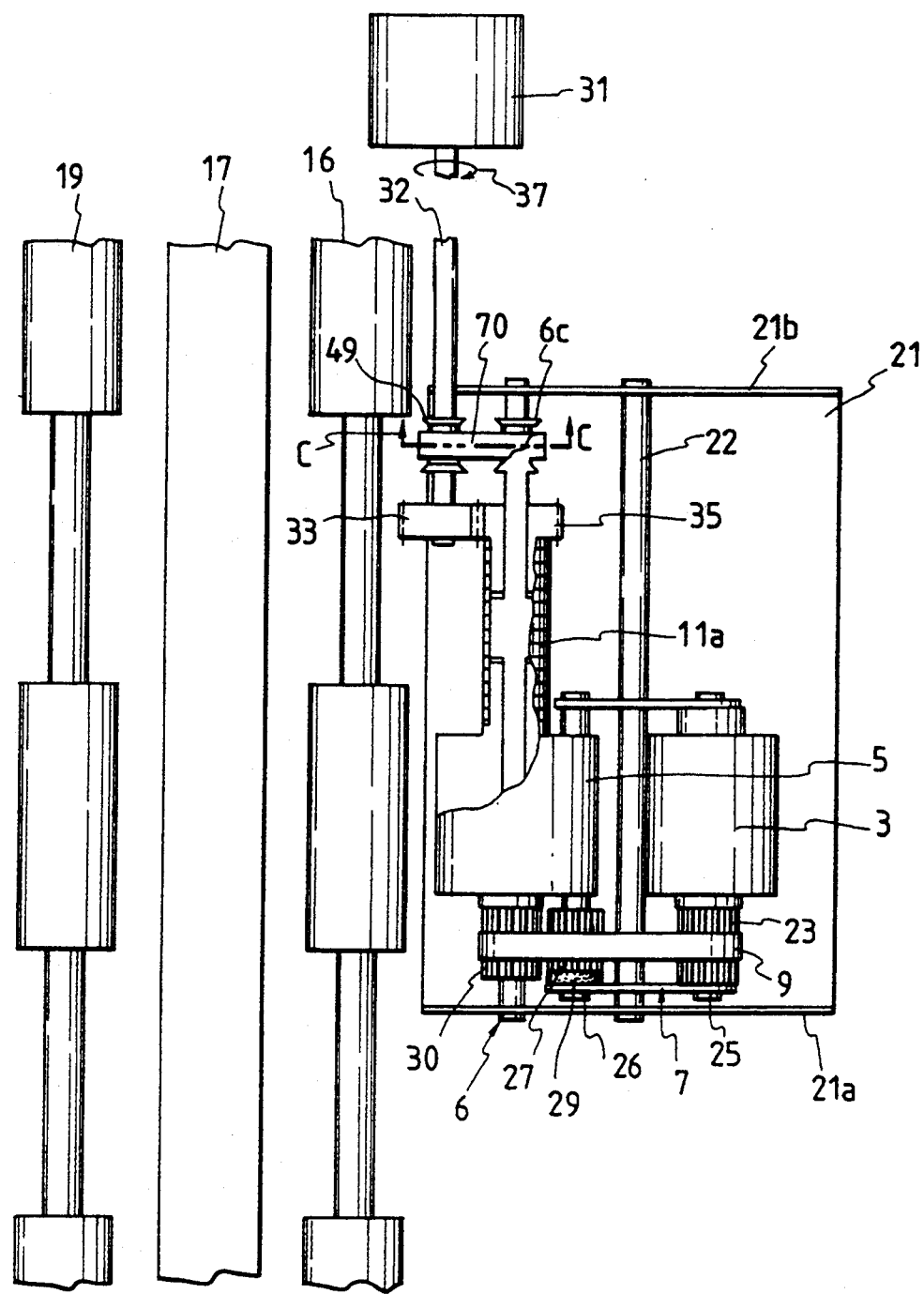
FIG. 14 is a plan view showing a sixth alteration of the first embodiment.

FIG. 14 shows a further alteration of the reverse rotation means for the separation shaft 6.

Figure 15:
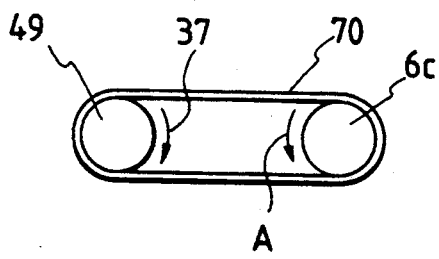
FIGS. 15 and 16 are views showing a rotating condition of a friction belt shown in FIG. 14.
Figure 16:
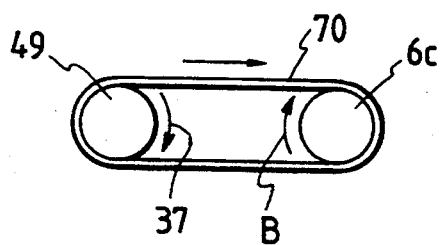

In FIG. 14, a friction belt 70 is wound around and extends between a reverse rotation driven pulley 6c integrally formed with the separation shaft 6 and a reverse rotation drive pulley 49. When the first clutch is engaged to transmit the driving force, as shown in FIG. 15, since the rotational direction of the output shaft 32 of the drive motor 31 and accordingly the reverse rotation drive pulley 49 is opposite to the rotational direction of the separation shaft 6 and accordingly the reverse rotation driven pulley 6c, the friction belt 70 is slipped not to rotate the separation shaft 6. When the first clutch 11 is disengaged, as shown in FIG. 16, the separation shaft 6 is rotated in the reverse rotation direction (shown by the arrow B in FIG. 3) by the friction force between the reverse rotation drive pulley 49 and the reverse rotation driven pulley 6c, and the friction belt 70.

Figure 17:
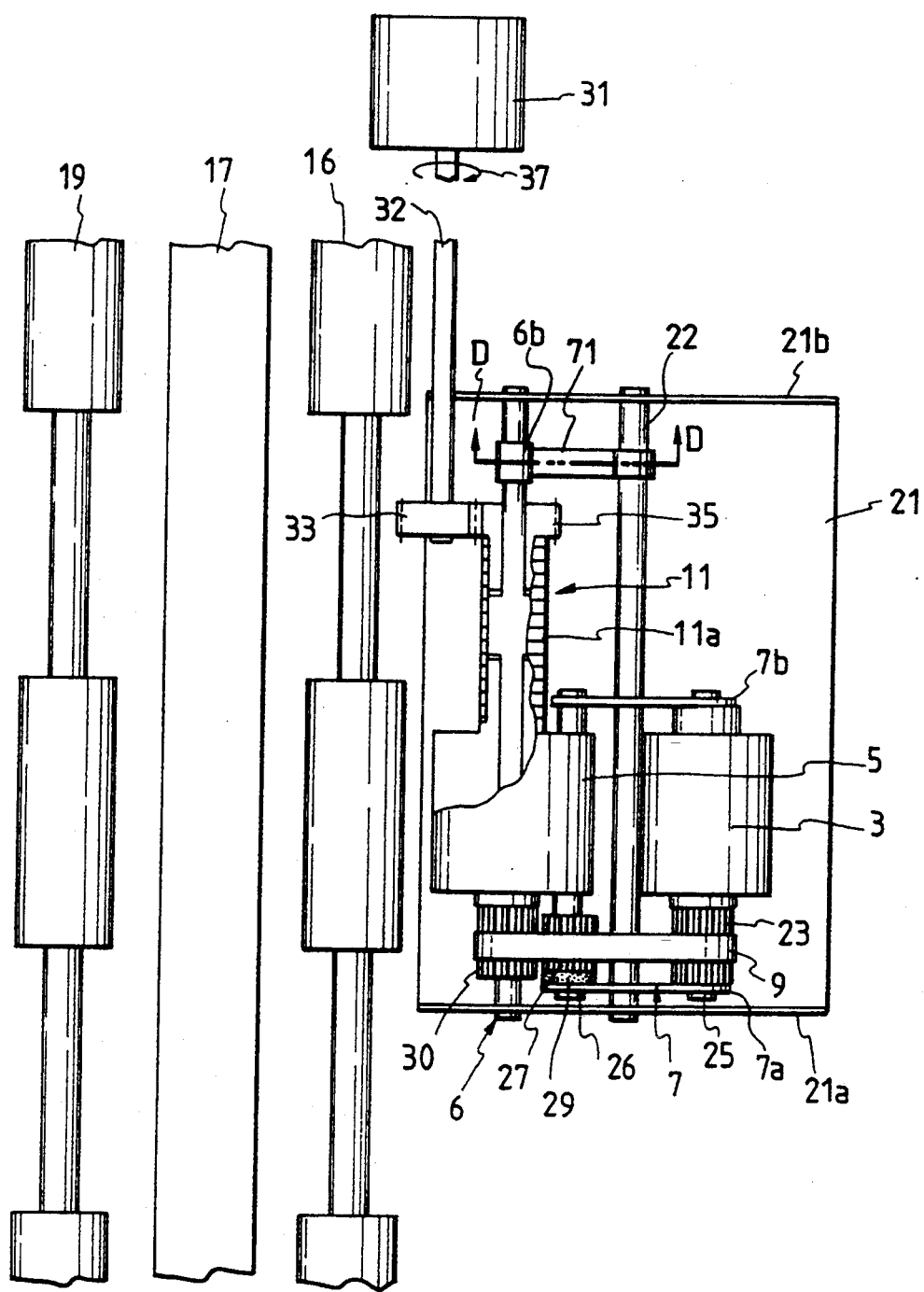
FIG. 17 is a plan view showing a seventh alteration of the first embodiment.
Figure 18:
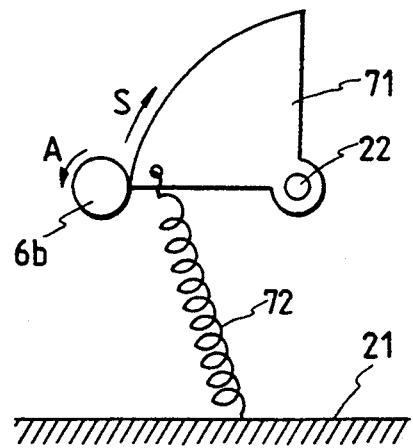
FIGS. 18 and 19 are views showing an operating condition of a sector member shown in FIG. 17.
Figure 19:
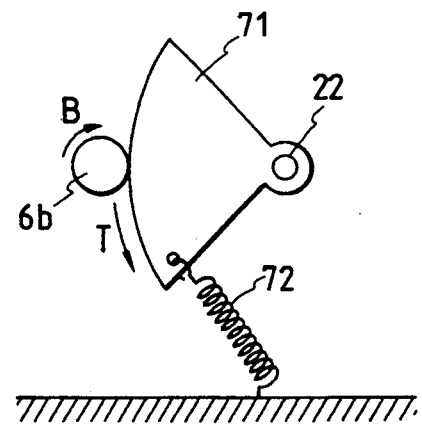

FIGS. 17 to 19 show an example that a sector member is used as the reverse rotation means for the separation shaft 6.

In FIGS. 17 to 19, a sector member 71 is secured to a base portion of the support shaft 22, and a high friction member provided on a peripheral surface of the sector member is abutted against the large diameter portion 6b of the separation shaft 6. The sector member 71 is biased toward an anti-clockwise direction in FIG. 18 by an elastic force of a tension spring 72 having one end secured to the frame 21.

When the driving force is being transmitted by the first clutch 11, as shown in FIG. 18, since the separation shaft 6 is rotated in the normal rotation direction A, the sector member 71 is rotated in an upward direction shown by the arrow S in opposition to the elastic force of the tension spring 72. When the first clutch 11 is disengaged to disconnect the separation gear 35 from the separation shaft 6 thereby to permit the free rotation of the separation shaft 6, as shown in FIG. 19, the sector member 71 is rotated in a direction shown by the arrow T by the tension spring 72, thereby rotating the separation shaft 6 in the reverse rotation direction B.

Figure 20:
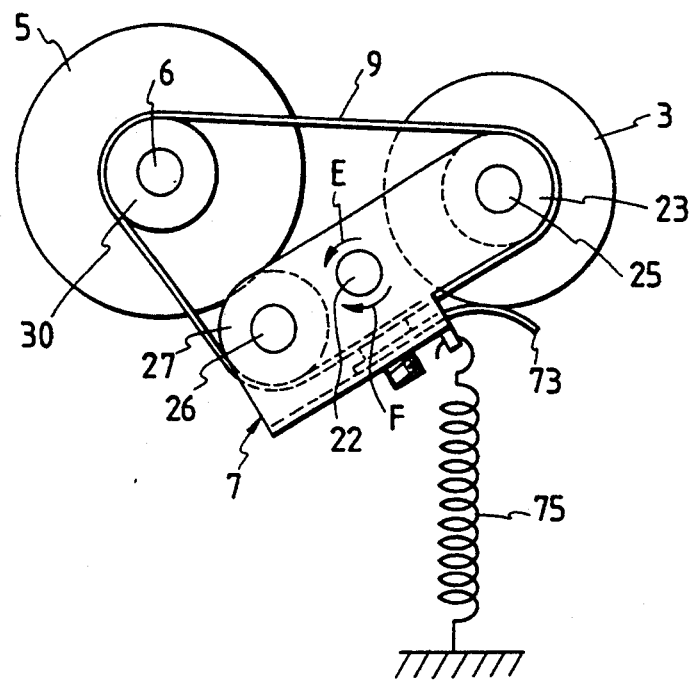
FIG. 20 is a plan view showing an eighth alteration of the first embodiment.

FIG. 20 shows a still further example of the reverse rotation means for the separation shaft 6.

In FIG. 20, a leaf spring 73 having a base portion secured to the support member 7 is abutted against the auxiliary convey roller 3. The support member 7 is biased in a clockwise direction around the support shaft 22 by an elastic force of a tension spring 75. When the driving force is being transmitted by the first clutch 11, the leaf spring 73 applies to the auxiliary convey roller 3 a load sufficient to rotate the support member 7 in an anti-clockwise direction (shown by the arrow E) in FIG. 20 in opposition to the elastic force of the tension spring 75. When the first clutch 11 is disengaged, the support member 7 is rotated in a clockwise direction (shown by the arrow F) by the tension spring 75, thereby separating the auxiliary convey roller 3 from the sheet stack S on the sheet stacking tray 13.

Incidentally, in place of the leaf spring 73, the load sufficient to rotate the support member 7 in opposition to the elastic force of the tension spring 75 may be applied to the auxiliary convey pulley 23 or the idle pulley 27 by the arrangement shown in FIG. 2 or FIG. 12.

Figure 21:
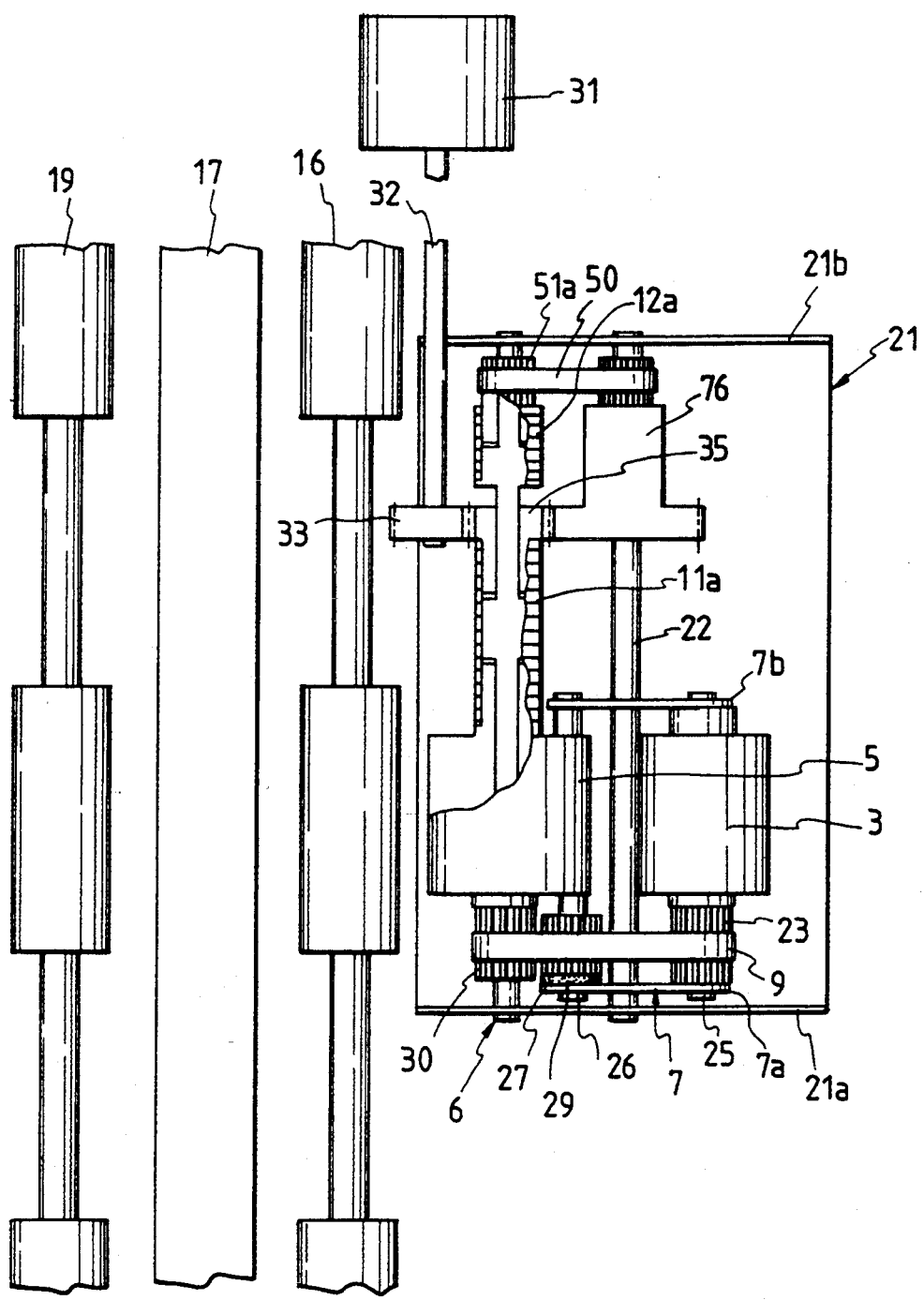
FIG. 21 is a plan view showing a ninth alteration of the first embodiment.

FIG. 21 shows an example that the driving force is transmitted from the separation gear 35 to the reverse rotation driven pulley 51a. In FIG. 21, a reverse rotation drive gear 76 meshed with the separation gear 35 is rotatably mounted on the support shaft 22 and is connected to the reverse rotation driven pulley 51a via reverse rotation belt 50.

Next, a second embodiment of the present invention will be explained with reference to FIGS. 22 and 23.

Figure 22:
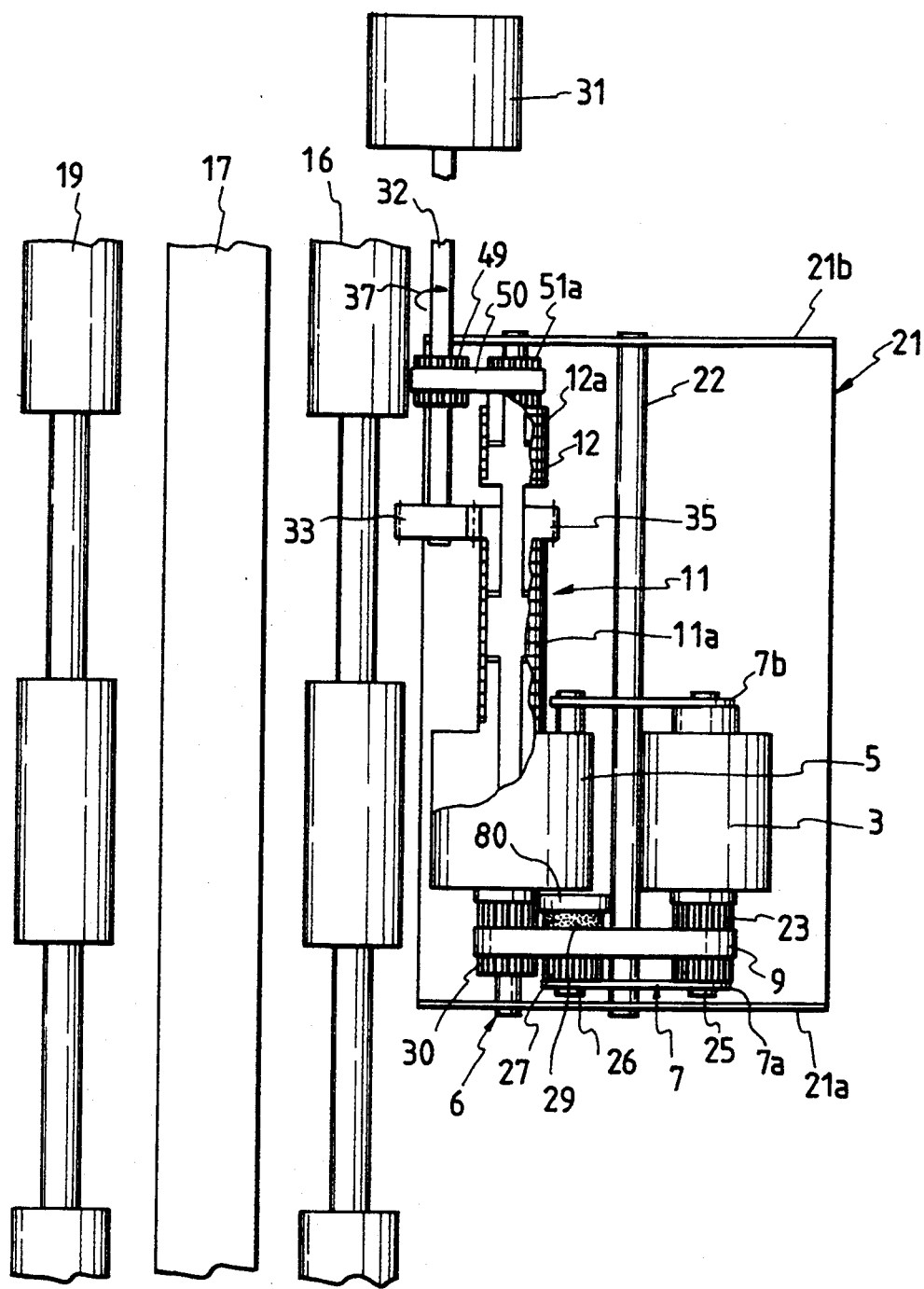
FIG. 22 is a plan view of a sheet supplying apparatus according to a second embodiment of the present invention.
Figure 23:
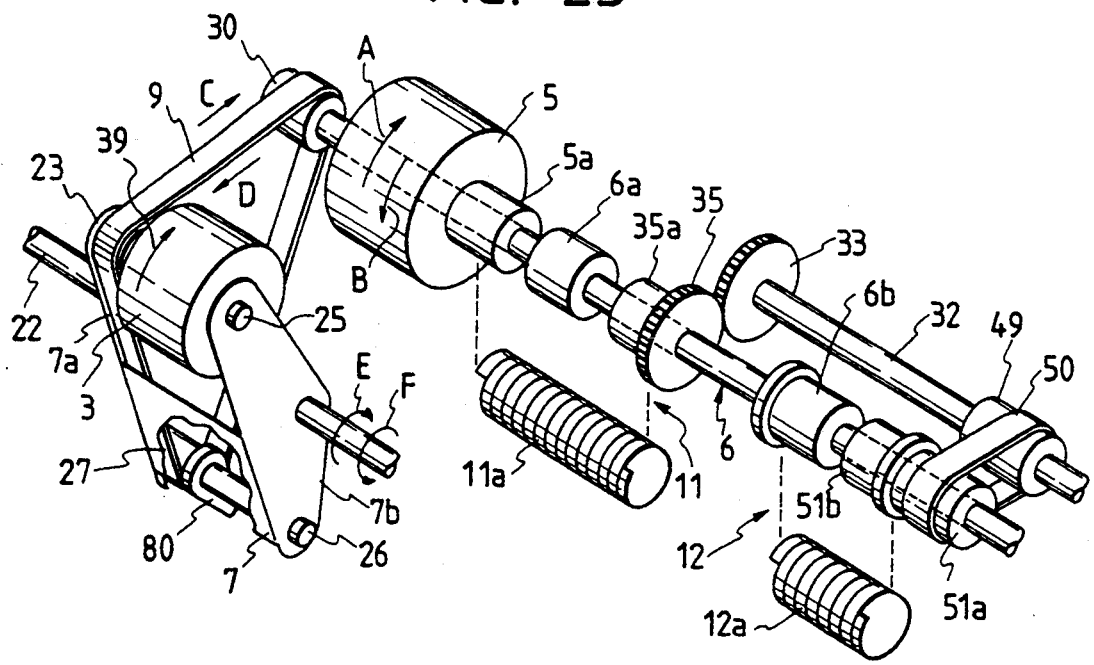
FIG. 23 is a perspective view of the sheet supplying apparatus of FIG. 22.

In FIGS. 22 and 23, according to the second embodiment, a timing plate (timing setting means) 80 is secured to the support shaft 22. Since the other construction is the same as that shown in FIGS. 1 and 2, the explanation thereof will be omitted. The timing plate 80 serves to adjust a timing of the rotation of the support member 7 in a manner which will be described later.

An operation of this embodiment will be explained.

Figure 24:
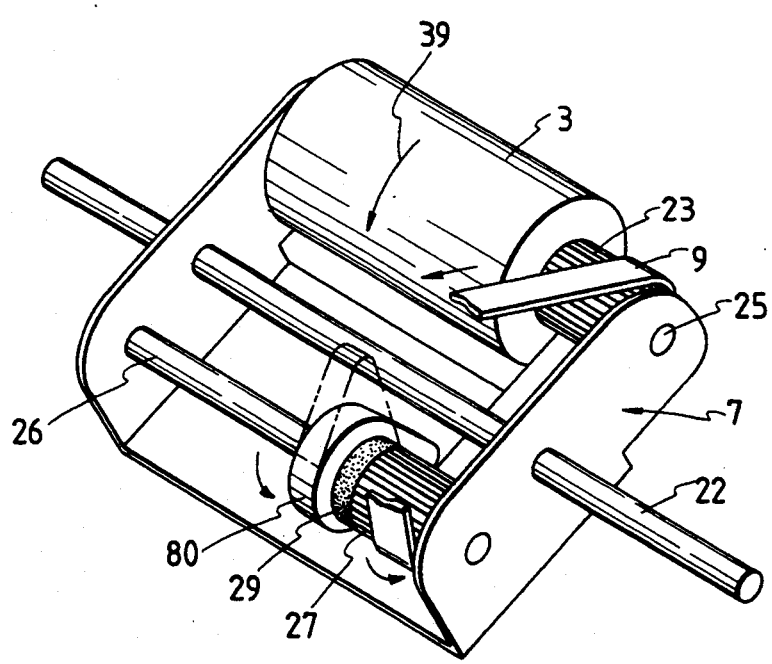
FIGS. 24 and 25 are enlarged views of a main portion of the sheet supplying apparatus of FIG. 22, showing an operation thereof.

In the operation of the auxiliary conveying system, as shown in FIG. 1, from the condition that the auxiliary convey roller 3 is positioned below the sheet stacking tray 13, when the auxiliary convey roller 3 is rotated in the direction shown by the arrow A in FIG. 1, the driving force is transmitted to the auxiliary convey pulley 23 and the idle pulley 27 by the shift belt 9. As a result, as shown in FIG. 24, in a condition that the timing plate 80 can be rotated, the support member 7 is so designed that it cannot be lifted and rotated by the weight of the auxiliary convey roller 3, auxiliary convey pulley 23, pivot shaft 25, idle pulley 27, pivot shaft 26, timing plate 80 and support member 7 themselves.

Figure 5:
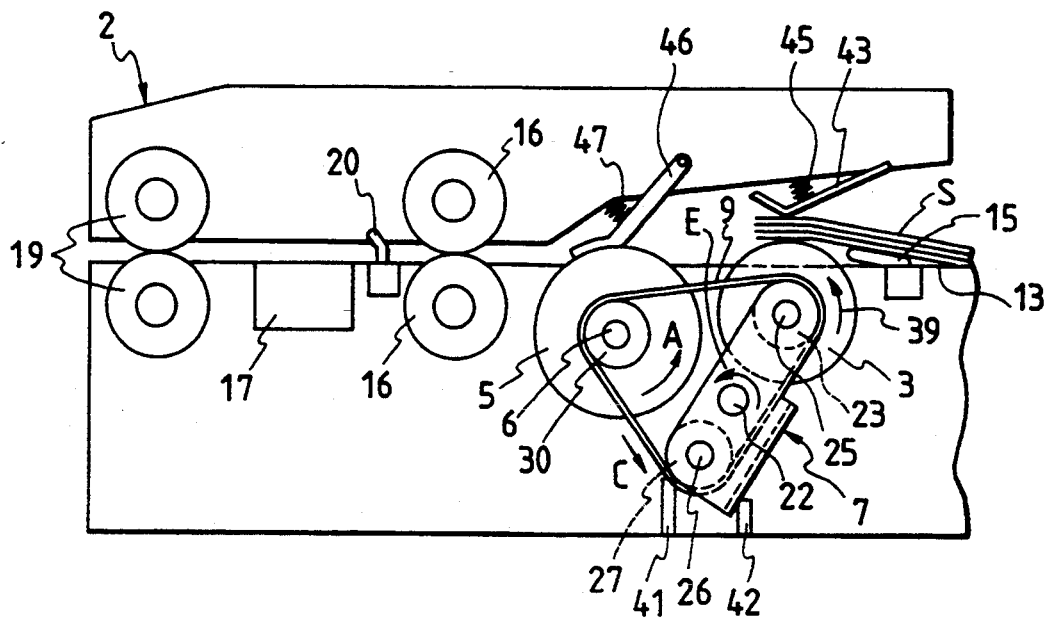
FIG. 5 is a view showing an operation of the sheet supplying apparatus of FIG. 1.
Figure 25:
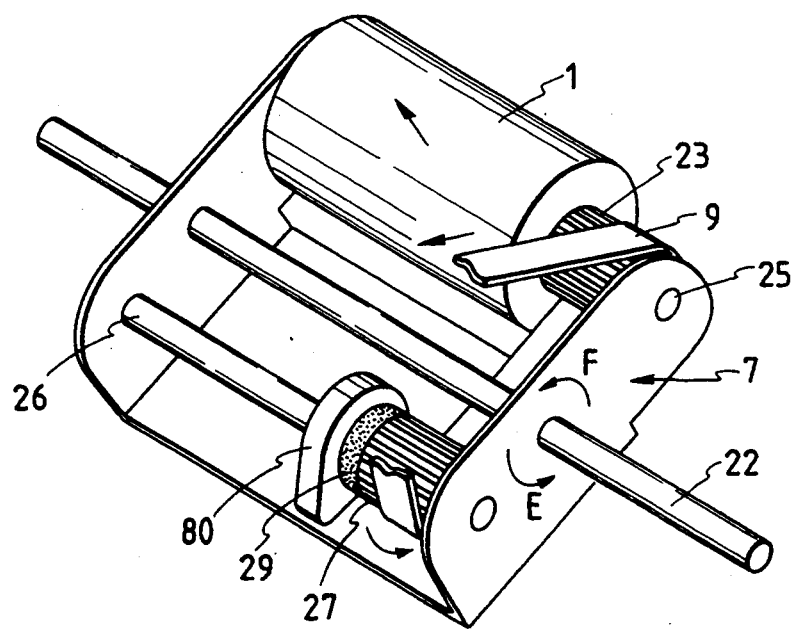

However, as shown in FIG. 25, when the timing plate 80 is abutted against the support member 7 to regulate the rotation of the former, the cushion member 29 applies the load to the rotation of the idle pulley 27 by the friction force. As a result, as shown in FIG. 5, the support member 7 is rotated in the anti-clockwise direction (shown by the arrow E) around the support shaft 22 until it is stopped by the normal rotation stopper 42, and then the auxiliary convey pulley 23 and the idle pulley 27 and accordingly the auxiliary convey roller 3 are rotated.

To the contrary, when the drive pulley 30 is rotated in the direction shown by the arrow B in FIG. 1, the driving force is transmitted to the auxiliary convey pulley 23 and the idle pulley 27 via the shift belt 9, thereby firstly rotating the support member 7 in the clockwise direction (shown by the arrow F) around the support shaft 22 until it is abutted against the reverse rotation stopper 41. The reverse rotation stopper 41 is so arranged that the auxiliary convey roller 3 is positioned below the sheet stacking tray 13 at this point, and the timing plate 80 is returned to a condition shown in FIG. 24.

The reading operation in this embodiment is effected in the same manner as that of the first embodiment explained in connection with FIG. 6. Accordingly, in this second embodiment, the step S7 in FIG. 6 will be explained in connection with this embodiment. When the separated sheet S is conveyed by the pair of convey rollers 16 and the separation roller 5 is driven by the movement of the sheet, the clutch spring 11a is disenabled, with the result that the support member 7 is rotated until it is abutted against the reverse rotation stopper 41, thereby interrupting the auxiliary conveying force of the auxiliary convey roller 3 as in the first embodiment.

Further, there is a case where the auxiliary conveying force for the next sheet is not required, i.e., a case where a plurality of sheets S are properly wedged into the nip between the separation roller 5 and the separation member 46 to thereby convey the sheet only by the separation roller 5. In such a case, the first clutch 11 is disengaged before the auxiliary convey roller 3 is protruded above the sheet stacking tray 13 to restore the auxiliary conveying force as in the first embodiment.

To this end, the timing plate 80 so sets that a time period during which the sheet S is conveyed from the separation position to the convey roller pair 16 by the separation roller 5 becomes shorter than a time period during which the support member 7 is shifted between the normal rotation stopper 42 and the reverse rotation stopper 41, i.e., a time period during which the auxiliary-convey roller 3 is shifted from a position where it is furthest spaced apart from the sheet stack S on the sheet stacking tray 13 to a position where it is abutted against the sheet stack S, thereby preventing the unnecessary conveying force from acting on the next sheet S at a proper timing (step S7). Further, since the timing for applying the auxiliary conveying force can be adjusted by changing the configuration of the timing plate 80, it is possible to design the apparatus relatively freely even when there is the spatial limitation, thereby making the apparatus small-sized.

Figure 26:
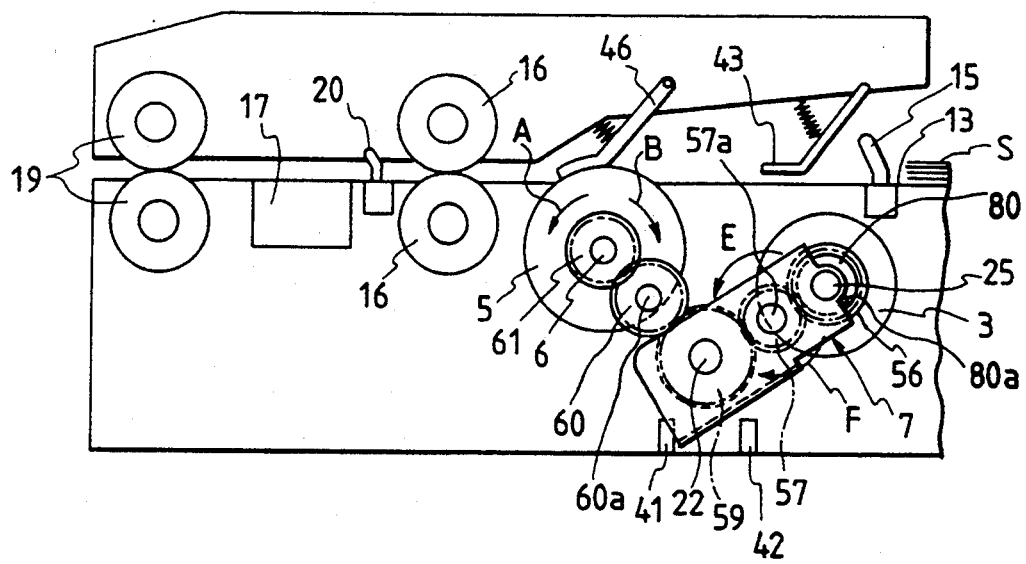
FIG. 26 is a longitudinal sectional view showing a first alteration of the second embodiment.
Figure 27:
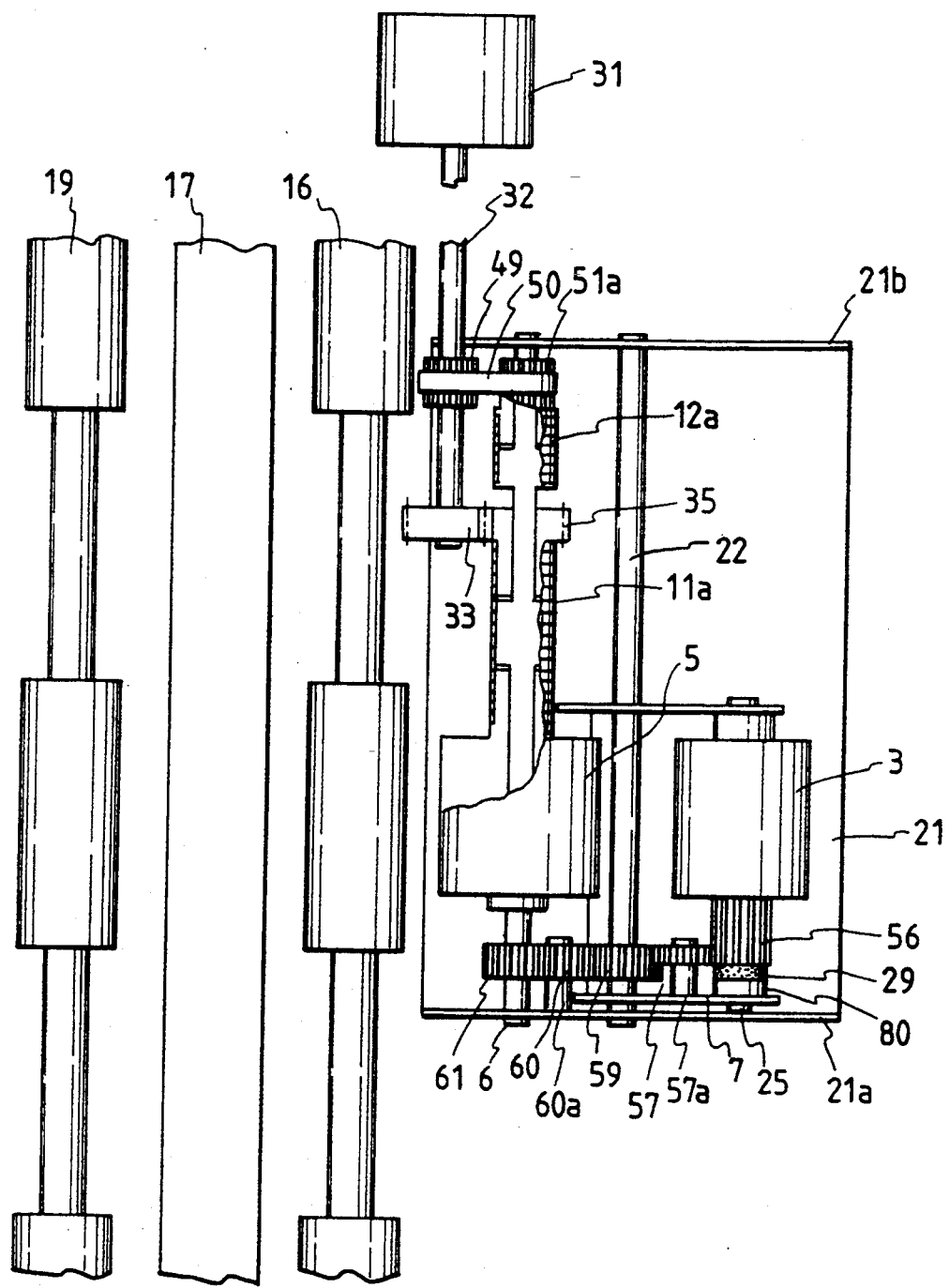
FIG. 27 is a plan view of the sheet supplying apparatus of FIG. 26.
Figure 28:
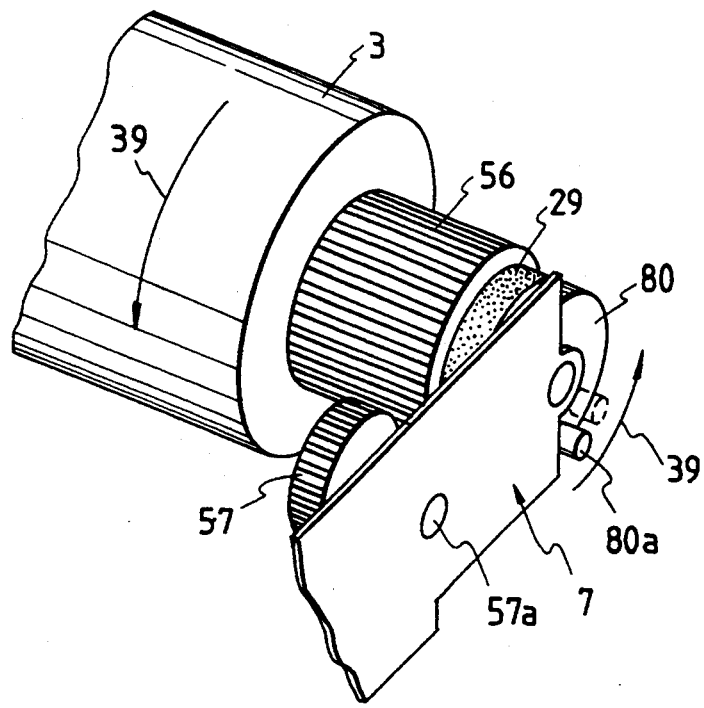
FIGS. 28 and 29 are enlarged views of a main portion of the sheet supplying apparatus of FIG. 26, showing an operation thereof.
Figure 29:
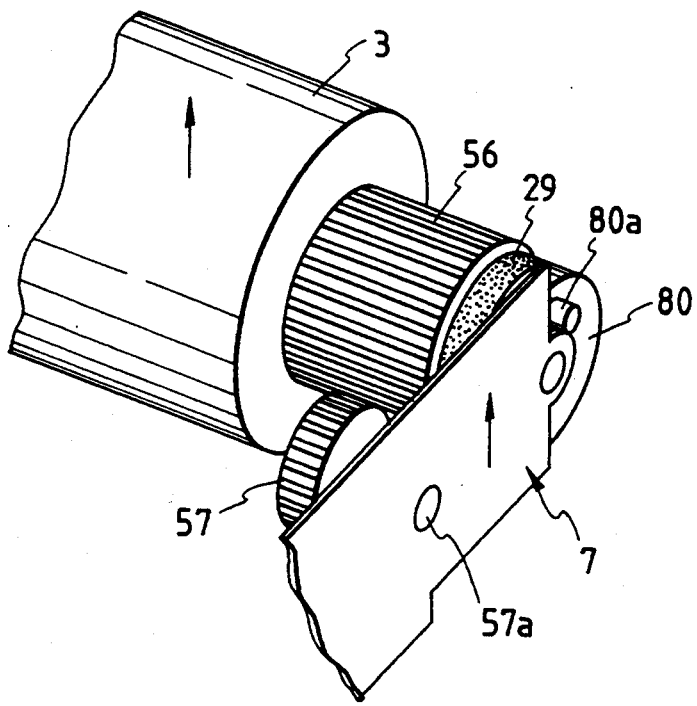

FIGS. 26 to 29 show a first alteration of the second embodiment wherein the auxiliary convey roller 3 is driven by gears in place of the shift belt 9, and, particularly, FIGS. 28 and 29 are perspective view showing the operation of the timing plate 80 when the drive gear 61 is rotated in a direction shown by the arrow A from a condition shown in FIG. 26.

First of all, as shown in FIG. 28, in a condition that the timing plate 80 can be rotated, since the load is not applied to the rotation of the auxiliary convey gear 56, the support member 7 is not lifted. Thereafter, as shown in FIG. 29, when a pin 80a of the timing plate 80 is abutted against the support member 7 to regulate the rotation of the plate, since the load is applied to the auxiliary convey gear 56 by the friction force of the cushion member 29, the support member 7 is rotated in an anti-clockwise direction (shown by the arrow E) in FIG. 26, thereby protruding the auxiliary convey roller 3 above the sheet stacking tray 13. In this way, the sheet S is conveyed by the rotation of the auxiliary convey roller. With this arrangement, by performing the adjustment of the timing plate 80 and by setting the disposition and the numbers of teeth of various gears, it is possible to design the apparatus relatively freely even when there are any severe limitations.

Figure 30:
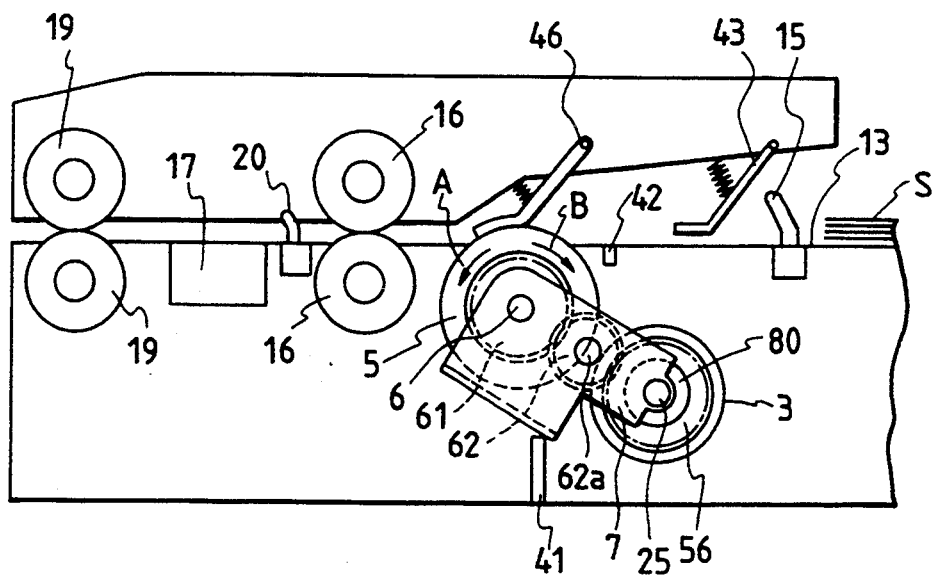
FIG. 30 is a longitudinal sectional view showing a second alteration of the second embodiment.
Figure 31:
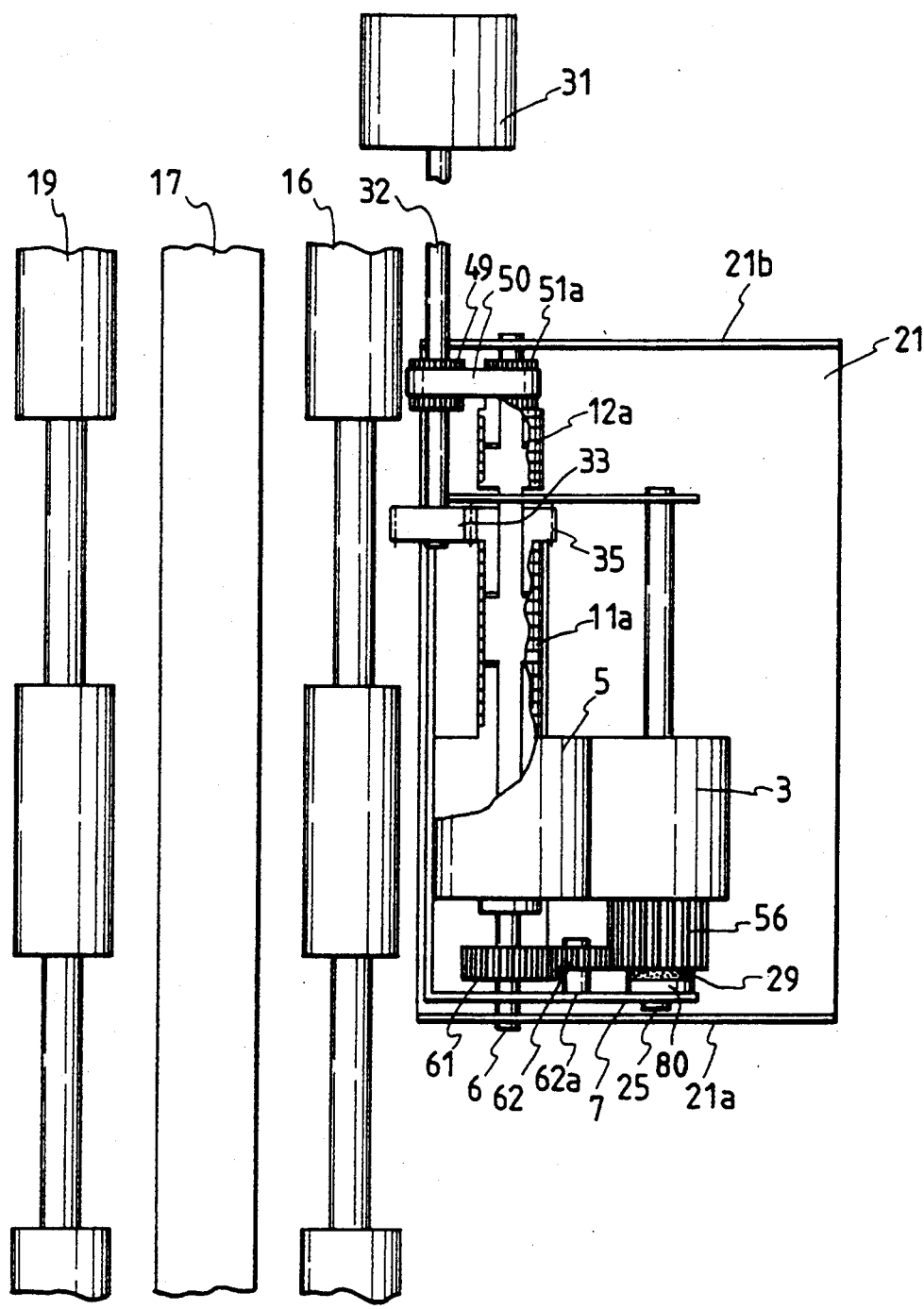
FIG. 31 is a plan view of the sheet supplying apparatus of FIG. 30.

FIGS. 30 and 31 show a second alteration wherein the support member 7 is mounted on the separation shaft 6. The reference numeral 62 denotes an idle gear for transmitting the driving force of the drive gear 661 to the auxiliary convey gear 56; and 62a denotes a support shaft. The operation of the timing plate 80 in this case is the same as the first alteration shown in FIGS. 28 and 29.

With this arrangement, it is possible to reduce the number of parts, thereby making the apparatus inexpensive. Incidentally, even when the driving force is transmitted by a belt in place of the idle gear 62, there arises no problem.

Next, a third embodiment of the present invention will be explained with reference to FIGS. 32 to 37.

Figure 32:
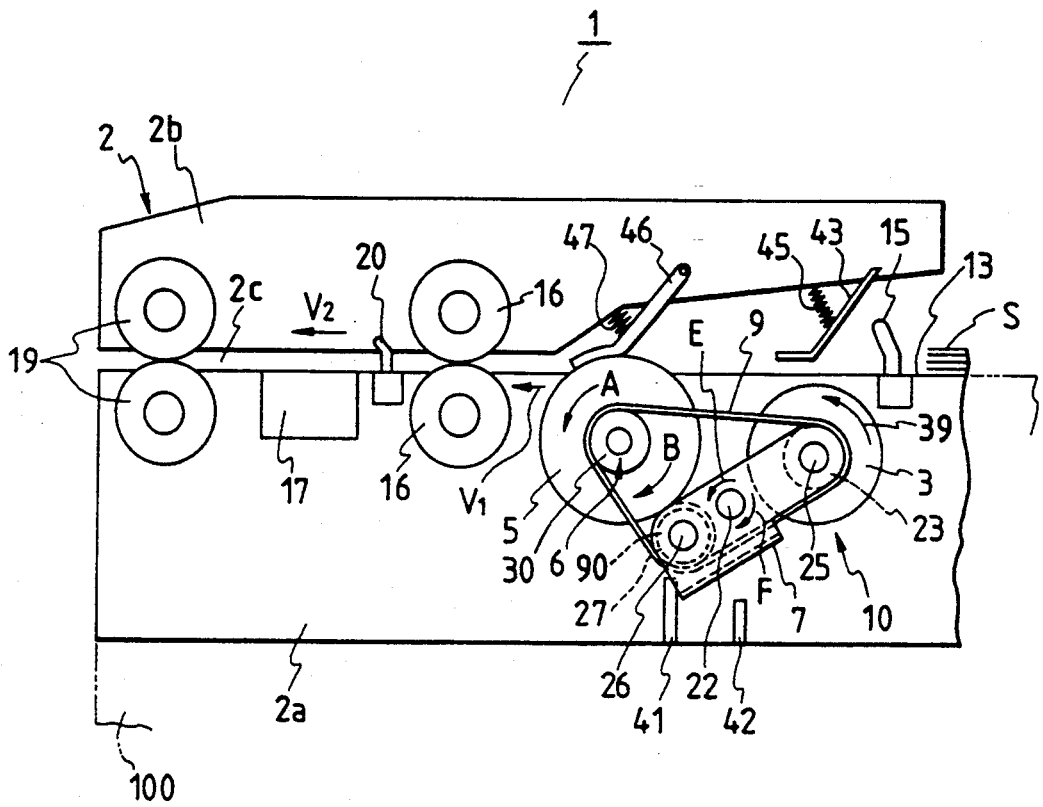
FIG. 32 is a longitudinal sectional view of a sheet supplying apparatus according to a third embodiment of the present invention.
Figure 33:
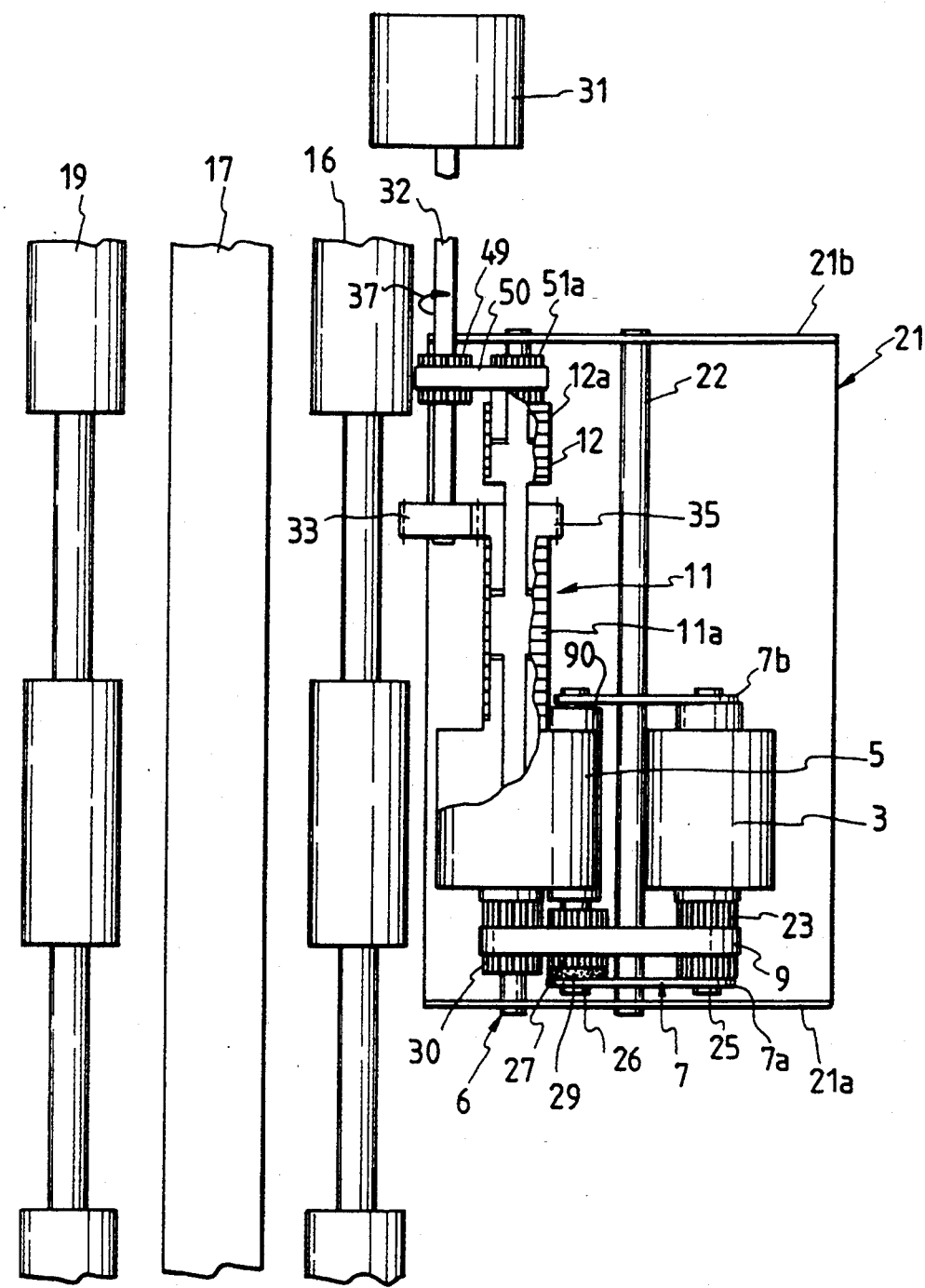
FIG. 33 is a plan view of the sheet supplying apparatus of FIG. 32.
Figure 34:
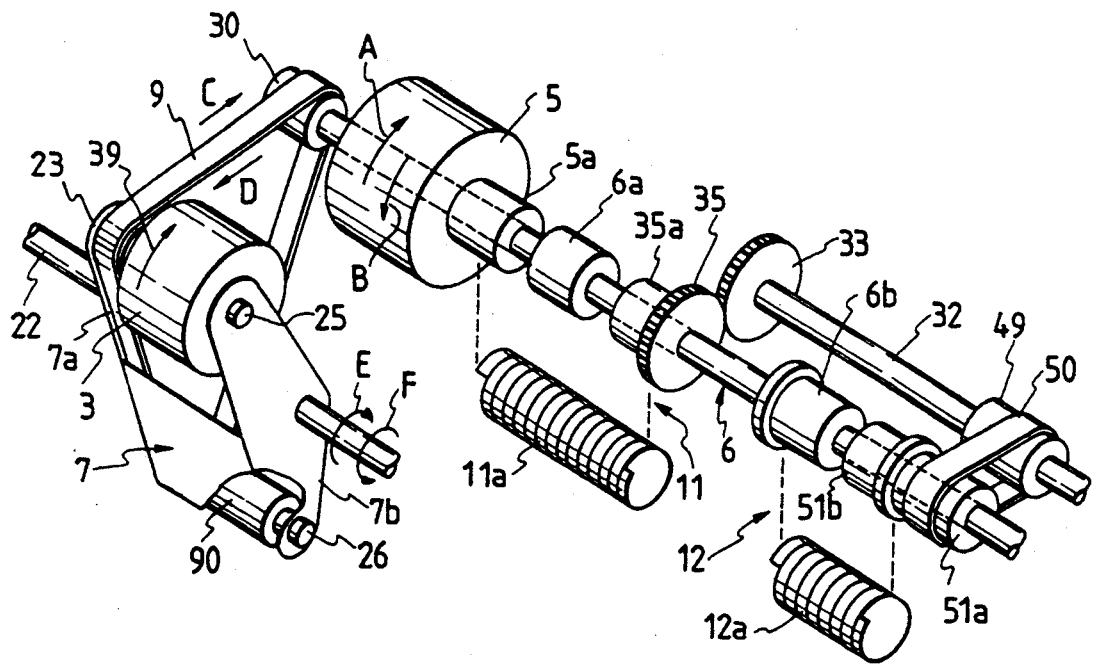
FIG. 34 is a perspective view of the sheet supplying apparatus of FIG. 32.

In this third embodiment, as shown in FIGS. 32 to 34, a cleaning roller (cleaning means) 90 is rotatably mounted on the pivot shaft 26 for the idle pulley 27.

Since the other construction is the same as those in the above first and second embodiment, the explanation thereof will be omitted.

The cleaning roller 90 is provided at its its peripheral surface with a high adhesive member so that, when the roller is abutted against the separation roller 5, paper powder or the like adhered to the separation roller 5 can be removed.

Figure 35:
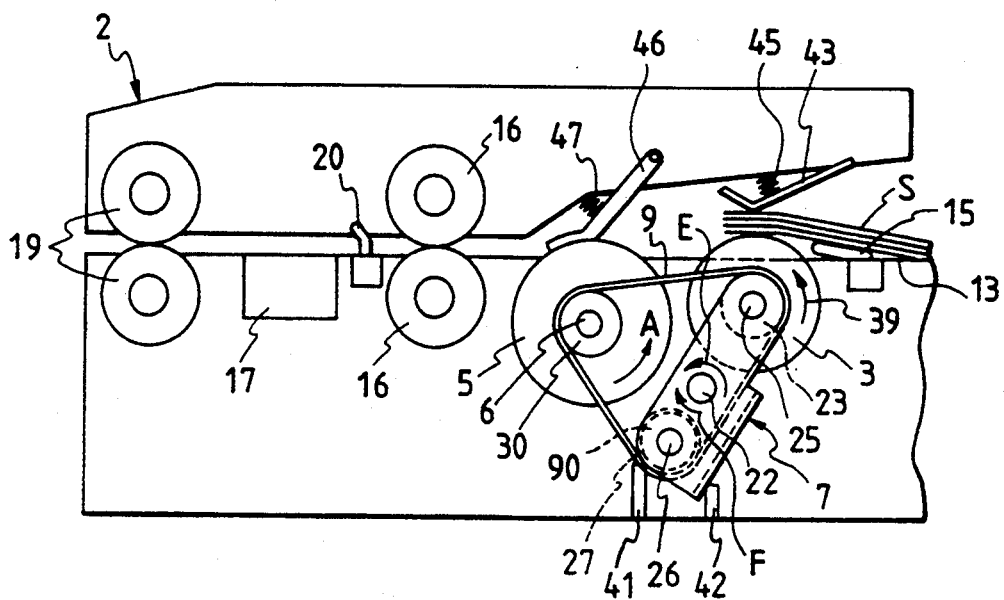
FIG. 35 is a longitudinal sectional view showing an operation of the sheet supplying apparatus of FIG. 32.

When the drive motor 31 is rotated by the signal from the control portion 55 to rotate the separation gear 35 in a direction shown by the arrow A in FIG. 32, the first clutch 11 is engaged, with the result that the support member 7 is rotated in an anti-clockwise direction (shown by the arrow E) in FIG. 35, thereby abutting the auxiliary convey roller 3 against the sheet S to supply the sheet S. When the sheet S separated by the separation roller 5 is conveyed by the pair of convey rollers 16, the first clutch 11 is disengaged and the support member 7 is rotated in a clockwise direction (shown by the arrow F) from the condition shown in FIG. 35 to return to the condition shown in FIG. 32. Such rotation of the support member 7 causes the auxiliary convey roller 3 to lower below the sheet stacking tray 13 and causes the cleaning roller 90 to abut against the separation roller 5, thereby automatically cleaning the peripheral surface of the separation roller 5.

Thereafter, when the trailing end of the sheet S has passed through the separation roller 5 so that the separation roller 5 is not driven by the movement of the sheet S, the first clutch 11 is engaged to rotate the support member 7 in the anti-clockwise direction (shown by the arrow E), thereby stopping the cleaning operation of the cleaning roller 90 regarding the separation roller 5.

Figure 36:
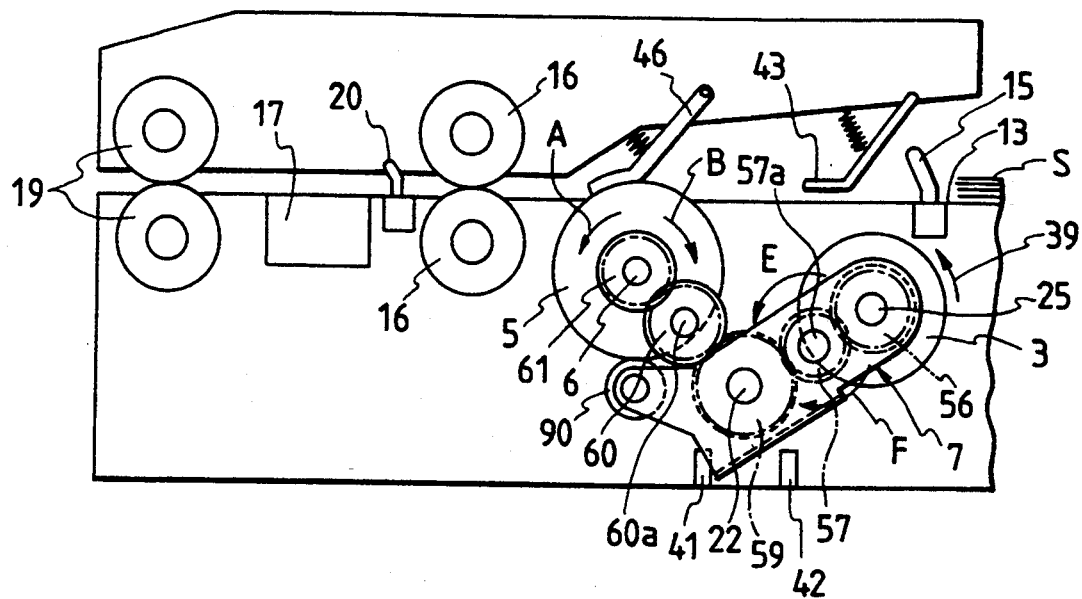
FIG. 36 is a longitudinal sectional view showing a first alteration of the third embodiment.
Figure 37:
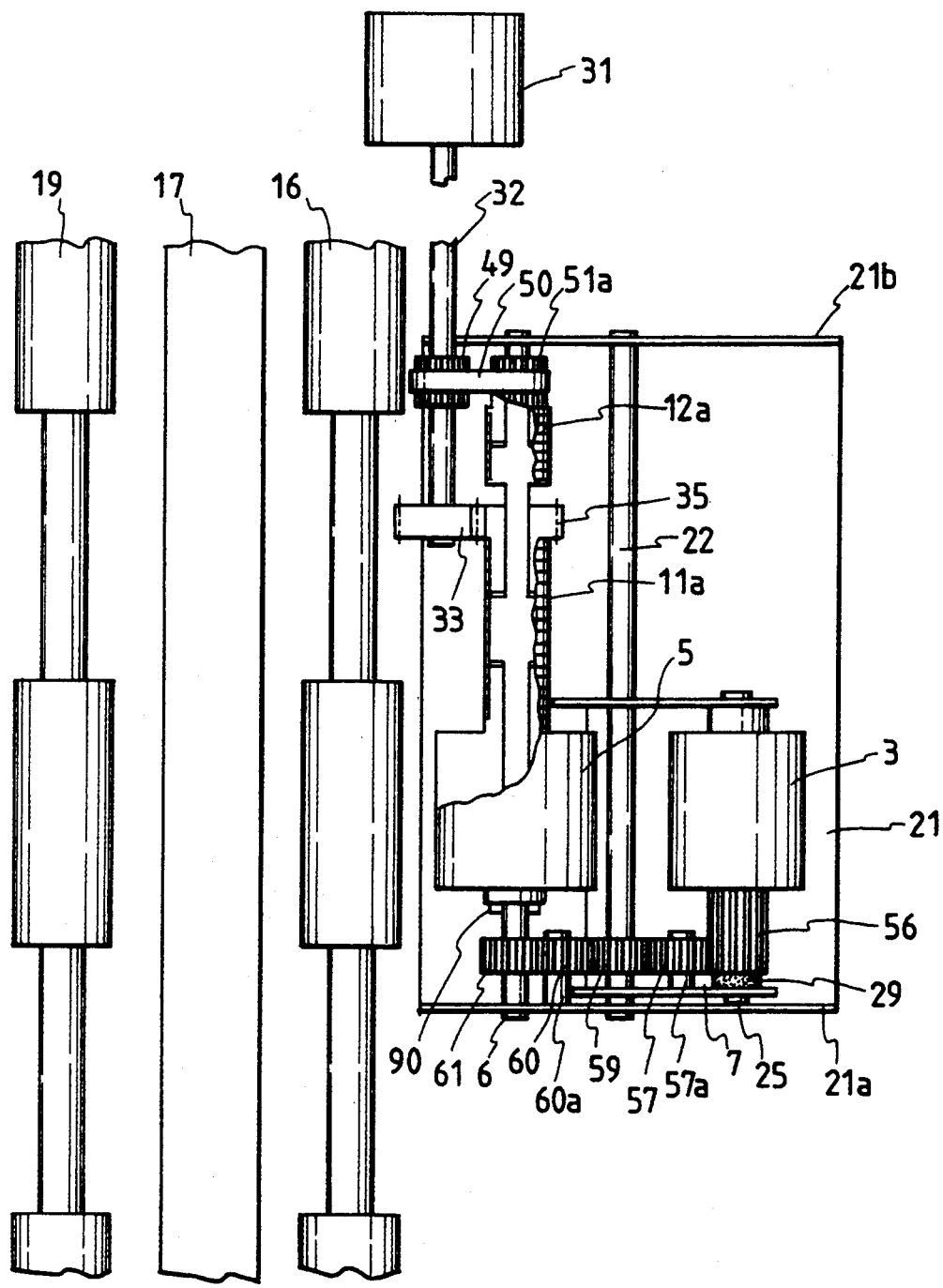
FIG. 37 is a plan view of the sheet supplying apparatus of FIG. 36.

FIGS. 36 and 37 show a first alteration of the third embodiment wherein the auxiliary convey roller 3 is driven by gears in place of the belt. In this alteration, the cleaning roller 90 is mounted at a downstream side of the support member 7, and the other construction is the same as that in the second embodiment shown in FIGS. 7 and 8. Also in this alteration, when the sheet S is supplied by the auxiliary convey roller 3, the cleaning roller 90 is spaced apart from the separation roller 5. When the separation roller 5 is driven by the movement of the separated sheet S and the first clutch 11 is disengaged, the cleaning roller 90 is abutted against the separation roller 5, thereby cleaning the peripheral surface of the separation roller.

As mentioned above, when the separation means is driven by the movement of the separated sheet, the support member for supporting the auxiliary convey means is rotated to separate the auxiliary convey means from the sheet, thereby interrupting the transmission of the conveying force to the sheet. As a result, it is possible to stabilize the separation means without any complicated control and with low cost and without the influence of the auxiliary conveying force upon the separation means, and to improve the setting ability of the sheets. Further, since the timing that the support member for supporting the auxiliary convey means can be adjusted, it is possible to design the apparatus relatively freely and to make the apparatus small-sized.

Next, a fourth embodiment of the present invention will be explained with reference to FIGS. 38 to 40.

In this embodiment, the construction of the clutch and the control of the control portion are different from these in the first embodiment. That is, in place of the first clutch 11 and the second clutch 12 in the first embodiment, a clutch 101 is used.

An operation of this embodiment will be explained. First of all, regarding the auxiliary convey system, as shown in FIG. 38, in a condition that the auxiliary convey roller 3 is positioned below the sheet stacking tray 13, when the drive pulley 30 is rotated in a direction shown by the arrow A in FIG. 38, the driving force is transmitted to the auxiliary convey pulley 23 and the idle pulley 27 via the belt 9. First of all, the support member 7 is rotated in an anti-clockwise direction around the support shaft 22 until it is stopped by the normal rotation stopper 42, and then the auxiliary convey pulley 23 and the idle pulley 27 and accordingly the auxiliary convey roller 3 are rotated. In order to permit such rotation, it is necessary to reduce a rotational resistance of the support member 7 as small as possible, because, in a condition that the belt 9 is stopped, the auxiliary convey pulley 23 or the idle pulley 27 must be subjected to the rotational resistance to an extent that the support member 7 can be kept stationary at any position within a rotational range of the support member 7 without being rotated by the weight of the auxiliary convey roller 3, auxiliary convey pulley 23, pivot shaft 25, idle pulley 27, pivot shaft 26 and support member 7 themselves.

Figure 39:
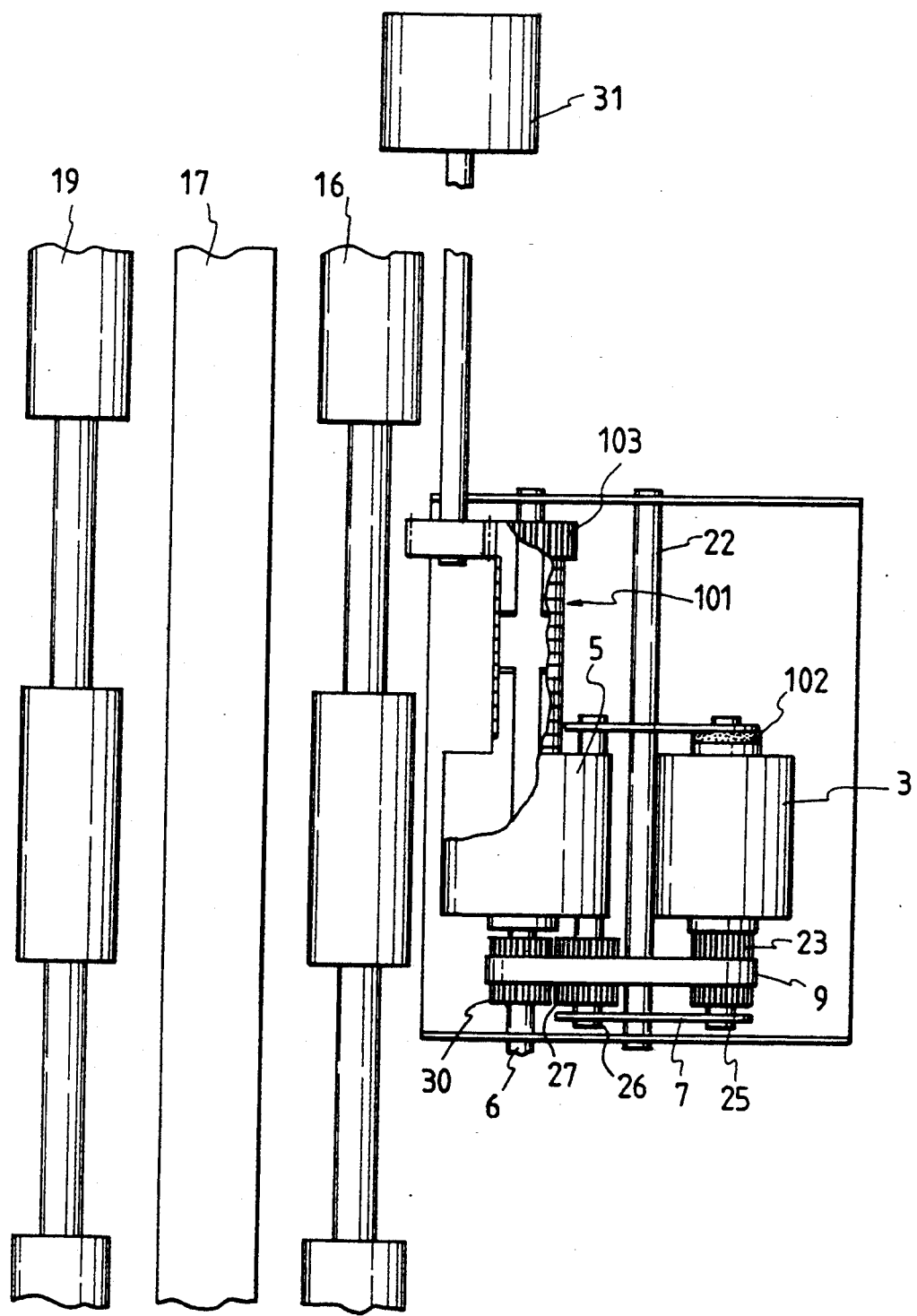
FIG. 39 is a plan view of the sheet supplying apparatus of FIG. 38.
Figure 40:
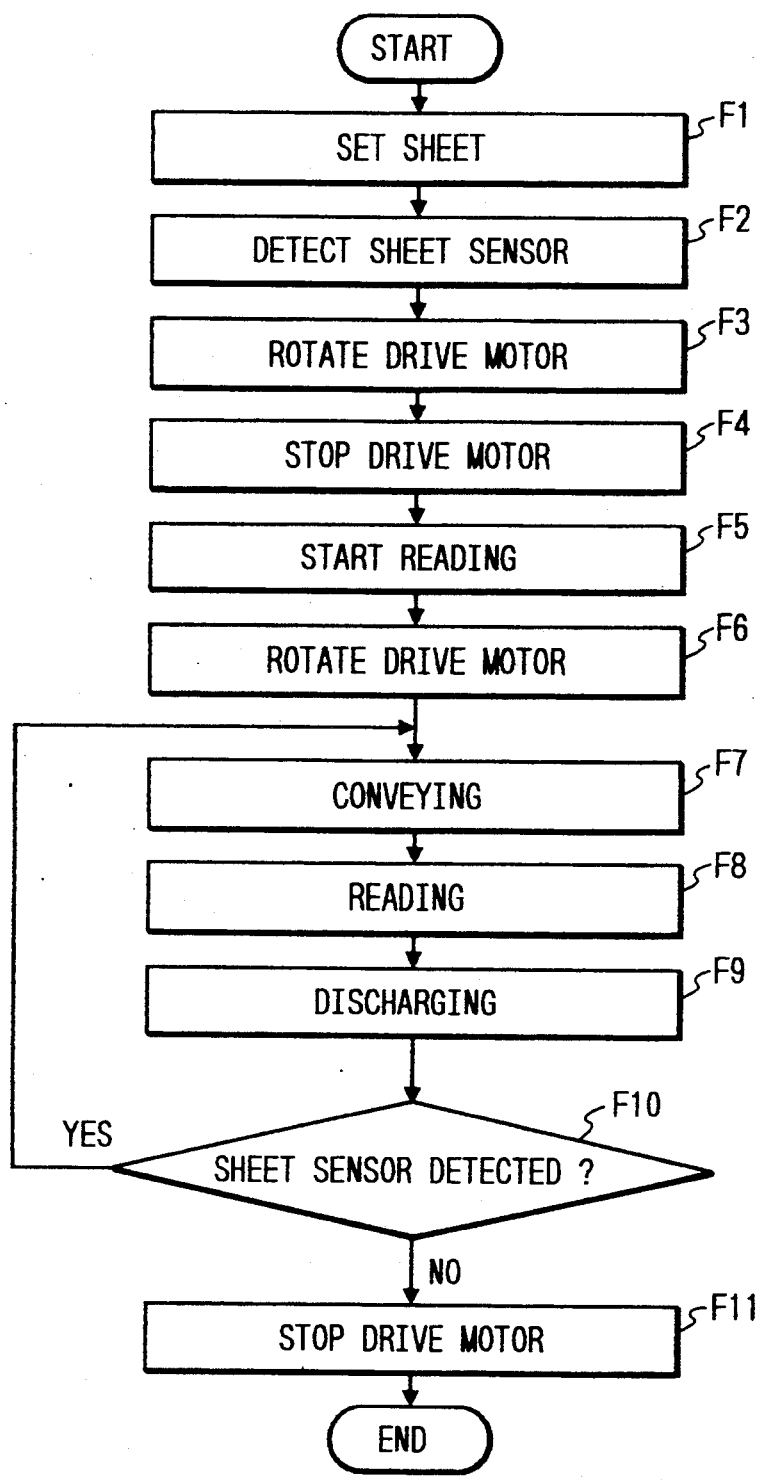
FIG. 40 is a flow chart showing a control of the sheet supplying apparatus of FIG. 38.

In this embodiment, as shown in FIG. 39, a cushion member 102 for applying the load (resistance) to the rotation of the auxiliary convey pulley 23 is disposed between the auxiliary convey roller 3 and the support member 7. Further, the position of the normal rotation stopper 42 is so selected that the auxiliary convey roller 3 is subjected to the pressure from the sheet hold-down member 43 at the same time when the auxiliary convey roller 3 is protruded above the sheet stacking tray 13. Further, since an outer peripheral length defined by the auxiliary convey pulley 23, idle pulley 27 and drive pulley 30 is substantially constant within the rotational range of the support member 7, the belt 9 is prevented from being tensioned too great or too small.

Next, a reading operation will be explained with reference to a flow chart shown in FIG. 40.

An operator sets the sheets S on the sheet stacking tray 13 (step F1). When the sheet S is detected by the sheet detection sensor 15 (step F2), a signal is sent from the sensor to the control portion 55. On the basis of a signal from the control portion 55, a separation gear 103 is rotated by the drive motor 31 (step F3). As a result, since the driving force is transmitted to the separation roller 5 and the separation shaft 6 via a spring clutch 101, thereby rotating these elements 5, 6 in the direction shown by the arrow A in FIG. 38, the drive pulley 30 connected to the separation shaft 6 is also rotated in the direction A, thereby conveying the sheet S to the separation portion by the auxiliary convey roller 3.

By the way, when the operator sets the sheets S on the sheet stacking tray 13, if the sheets S are inserted at a speed slower then a peripheral speed of the auxiliary convey roller 3, the sheets S are pulled by the auxiliary convey roller 3; whereas, if the sheets S are inserted at a speed faster than the peripheral speed of the auxiliary convey roller 3, the auxiliary convey roller 3 is driven by the movement of the sheets S, so that the auxiliary convey roller 3 is rotated faster than a speed given by the drive motor 31. As a result, since a length of the belt 9 between the auxiliary convey pulley 23 and the drive pulley 30 is increased and a length of the belt 9 between the pulley 27 and the drive pulley 30 is decreased, the support member 7 is rotated in the clockwise direction in FIG. 38. Consequently, since the auxiliary convey roller 3 is lowered, the sheets S are not caught by the auxiliary convey roller 3, thereby preventing the damage of the sheets S. Thereafter, when the operator stops the insertion of the sheets S, the auxiliary convey roller 3 conveys the sheets S. Incidentally, the rotation of the support member 7 is regulated by the reverse rotation stopper 41 so that the support member 7 is not excessively rotated in the clockwise direction.

The control portion 55 controls so that the drive motor 31 is rotated until a first sheet S is separated by the separation roller 5 and the separation member 46 and the leading end of the separated sheet S is detected by the aligning sensor 20 (step F4) and then the drive motor is stopped.

The image density and resolving power during the reading of image information are set by the operator, and the reading is started (step F5). The drive motor 31 is rotated by the signal from the control portion 55 to rotate the separation gear 103 (step F6). The separated sheet S is conveyed to the reading portion 17 by the pair of convey rollers 16 (step F7). In this case, since the peripheral speed of the convey roller pair 16 is faster than the peripheral speed of the separation roller 5, the separation roller 5 is driven by the movement of the sheet, with the result that the spring clutch 101 is disengaged, thereby stopping the separation shaft 6, so that the separation gear 103 is rotated idly.

Figure 38:
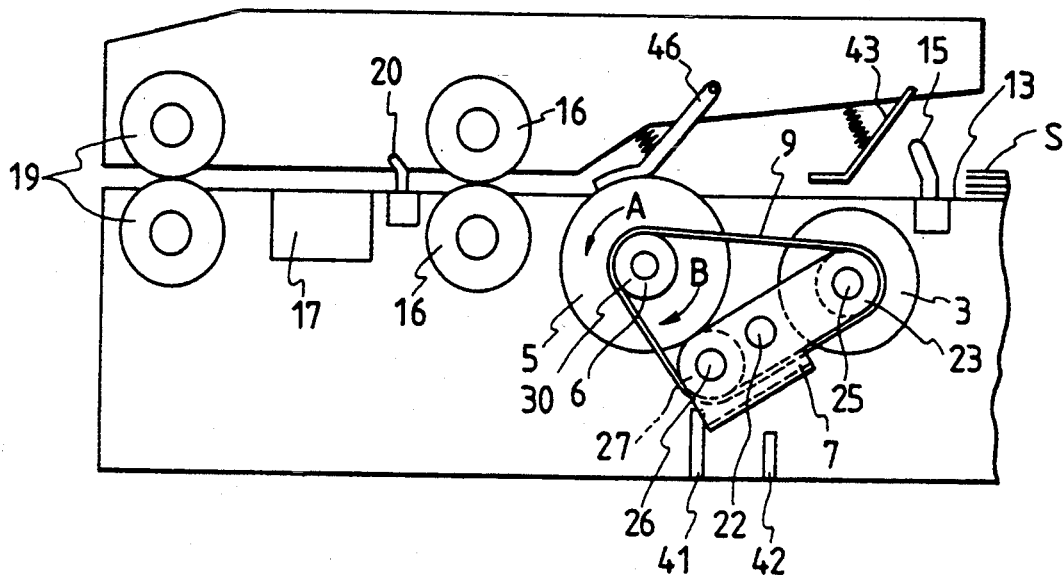
FIG. 38 is a longitudinal sectional view of a sheet supplying apparatus according to a fourth embodiment of the present invention.

Further, although the auxiliary convey roller 3 is also driven by the movement of the sheet, since the separation shaft 6 is stopped, the length of the belt 9 between the auxiliary convey pulley 23 and the drive pulley 30 is increased and the length of the belt 9 between the pulley 27 and the drive pulley 30 is decreased, with the result that the support member 7 is rotated in the clockwise direction in FIG. 38, thereby lowering the auxiliary convey roller 3 to a position where the auxiliary convey roller 3 is not driven by the movement of the sheet. In this way, the auxiliary conveying force is not transmitted to the sheet.

Thereafter, when the trailing end of the sheet S has passed through the separation roller 5, the separation roller 5 is not driven by the movement of the sheet, with the result that the spring clutch 101 is engaged, thus restoring the auxiliary conveying force again.

The image information on the sheet S is read by the reading portion 17 (step F8). Then, the sheet S is discharged by the pair of discharge rollers 19 (step F9). When the reading of the sheet is completed, if there is a next sheet S (step F10), the program returns to the step F7, so that the reading is continued, and, when all of the sheets S are read, the program goes to a step F11. The drive motor 31 is stopped by the signal from the control portion 55 (step F11), and the reading operation is ended.

With the arrangement as mentioned above, it is possible to automatically transmit or interrupt the auxiliary conveying force with respect to the sheet by the single motor without any complicated control and to improve the setting of the sheets.

Figure 41:
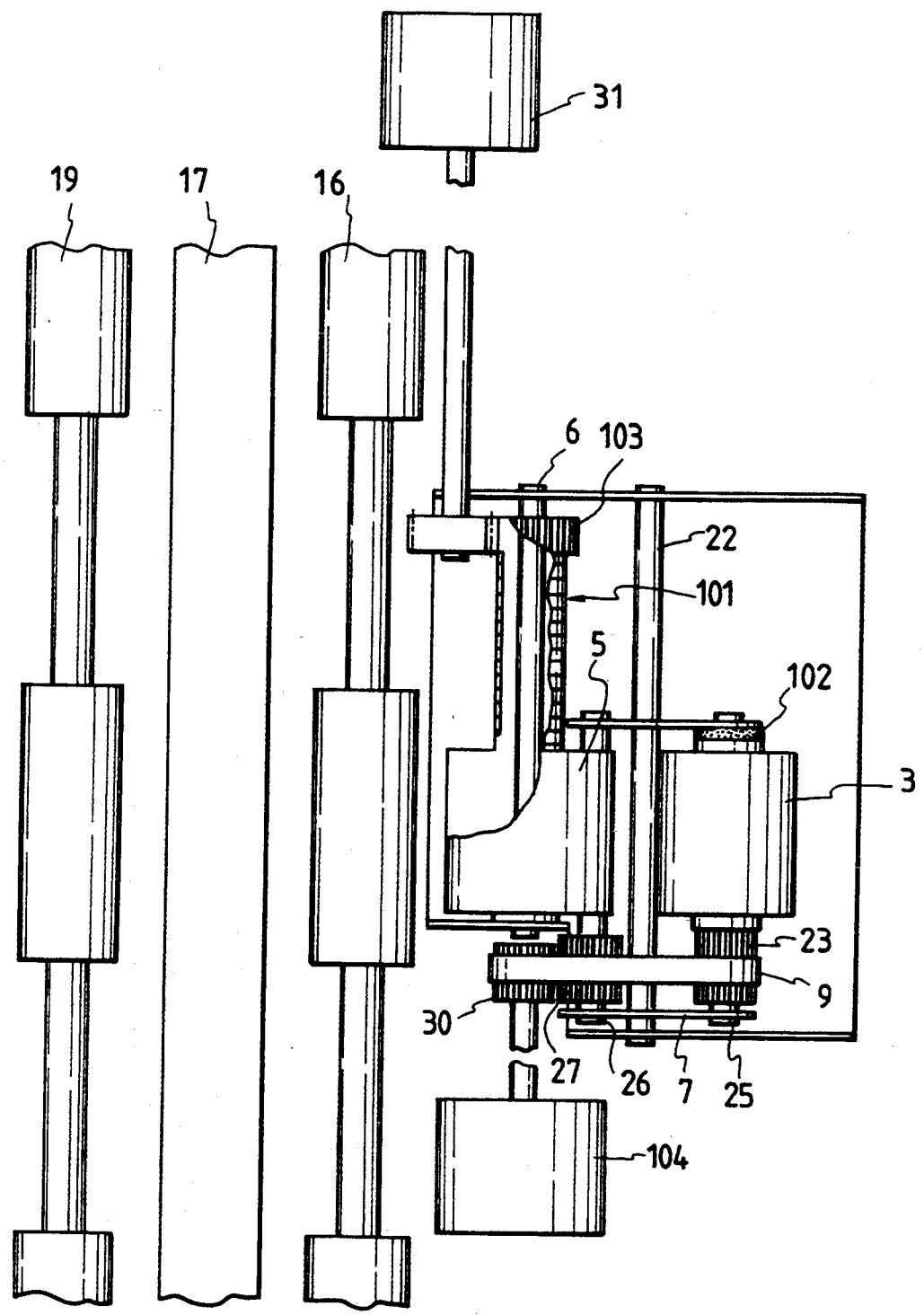
FIG. 41 is a plan view showing a first alteration of the third embodiment.
Figure 42:
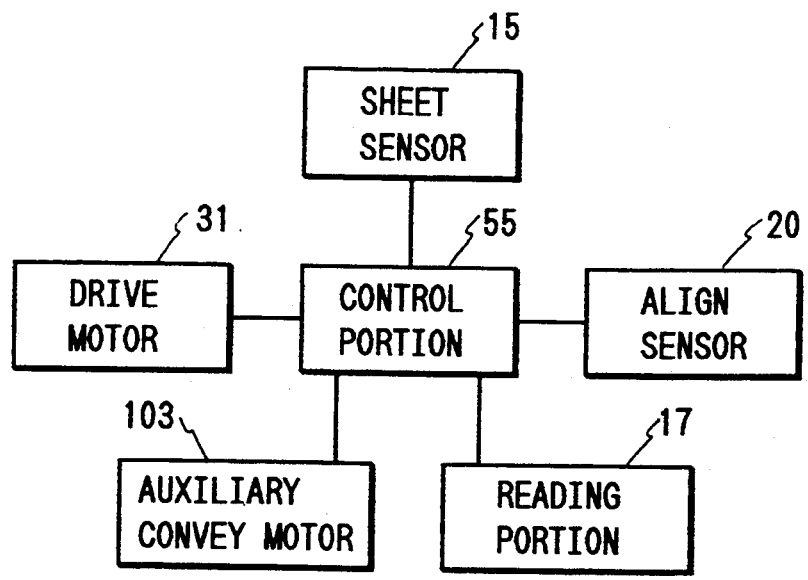
FIG. 42 is a block diagram of a control portion of the sheet supplying apparatus of FIG. 41.
Figure 43:
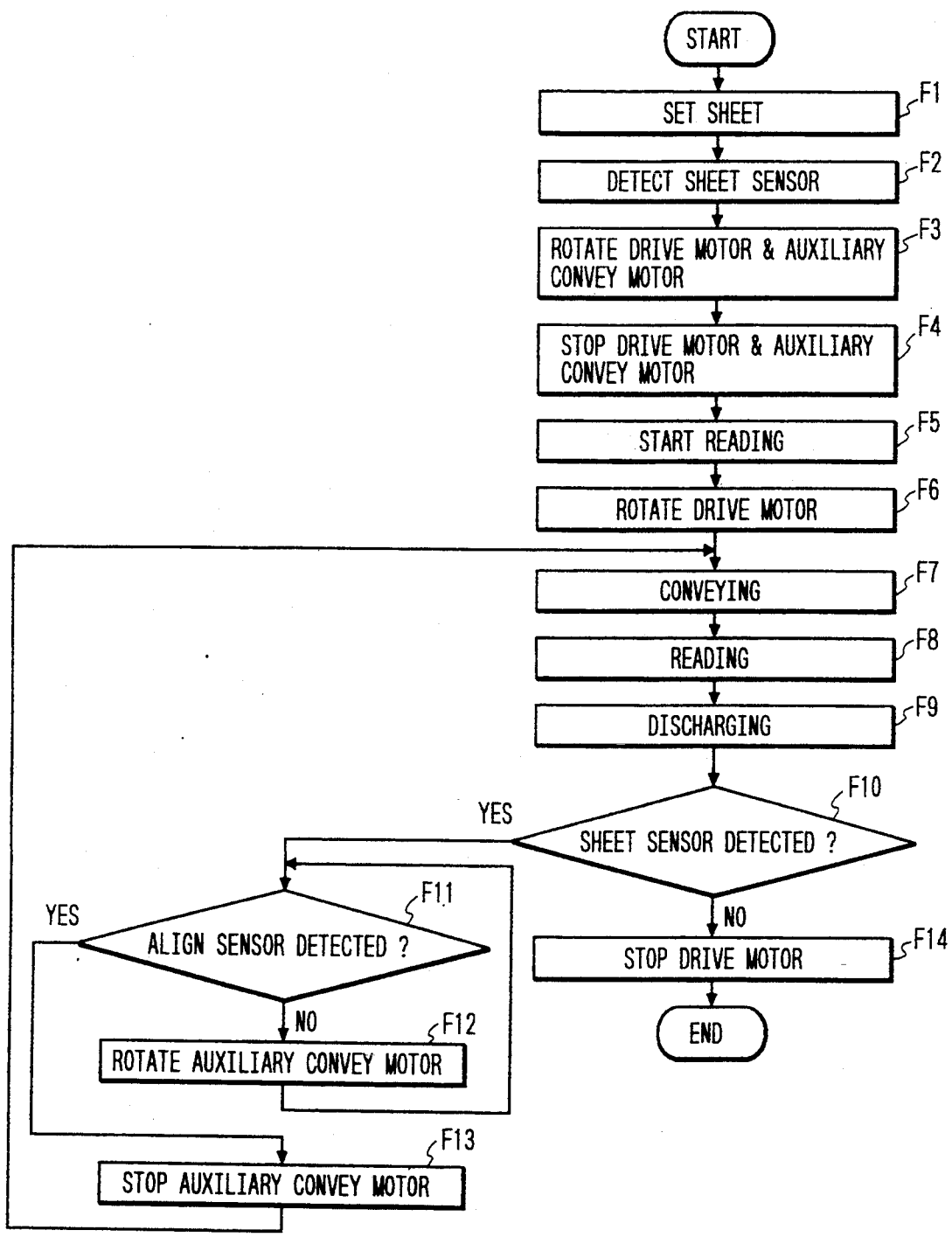
FIG. 43 is a flow chart showing a control of the sheet supplying apparatus of FIG. 41.

FIG. 41 shows a first alteration of the fourth embodiment, wherein an auxiliary convey motor 104 serves to drive the auxiliary convey system alone, and the drive pulley 30 is independently driven by the auxiliary convey motor 104. As shown in a block diagram of FIG. 42, the drive motor 31, sheet detection sensor 15, aligning sensor 20, reading portion 17 and auxiliary convey motor 104 are controlled by a control portion 55 of a facsimile system and the like. The reading operation in this case is as shown in a flow chart of FIG. 43.

The operator sets the sheets S on the sheet stacking tray 13 (step F1). When the sheet S is detected by the sheet detection sensor 15 (step F2), a signal is sent from the sensor to the control portion 55. On the basis of a signal from the control portion 55, the drive motor 31 and the auxiliary convey motor 104 are rotated (step F3). The operation of the auxiliary convey system in this case is the same as that in the fourth embodiment. The control portion 55 controls so that the drive motor 31 is rotated until a first sheet S is separated by the separation roller 5 and the separation member 46 and the leading end of the sheet S is detected by the aligning sensor 20 and then the drive motor is stopped (step F4).

The image density and resolving power during the reading of image information are set by the operator, and the reading is started (step F5).

The drive motor 31 is rotated by the signal from the control portion 55 (step F6) to rotate the separation roller 3, the convey roller pair 16 and the discharge roller pair 19. The separated sheet S is conveyed to the reading portion 17 by the pair of convey rollers 16 (step F7). The image information on the sheet S is read by the reading portion 17 (step F8). Then, the sheet S is discharged by the pair of discharge rollers 19 (step F9).

When the reading of the sheet is completed, if there is a next sheet S (step F10), the program returns to a step F11, and, when all of the sheets S are read, the program goes to a step F14. The next sheet S is separated by the separation roller 5 and the separation member 46. However, in this case, since the auxiliary conveying force does not act, the next sheet is not sometimes conveyed. Thus, when the sheet S is not conveyed (i.e., when the sheet is not detected by the aligning sensor 20) after a predetermined time has been elapsed (step F11), the program goes to a step F12; whereas, if detected, the program goes to a step F13.

The auxiliary convey motor 104 is rotated by the signal from the control portion 55 (step F12) to provide the auxiliary conveying force. The operation of the auxiliary convey system in this case is the same as that of the fourth embodiment. If the auxiliary convey motor 104 is rotated by the signal from the control portion 55, this motor is stopped (step F13), thereby interrupting the auxiliary conveying force, and the program returns to the step F7 to continue the reading. The drive motor 31 is stopped by the signal from the control portion 55 (step F14), and all of the reading operations are finished.

With the arrangement as mentioned above, it is possible to properly control the influence of the auxiliary conveying force upon the separation means with a simple construction.

Figure 44:
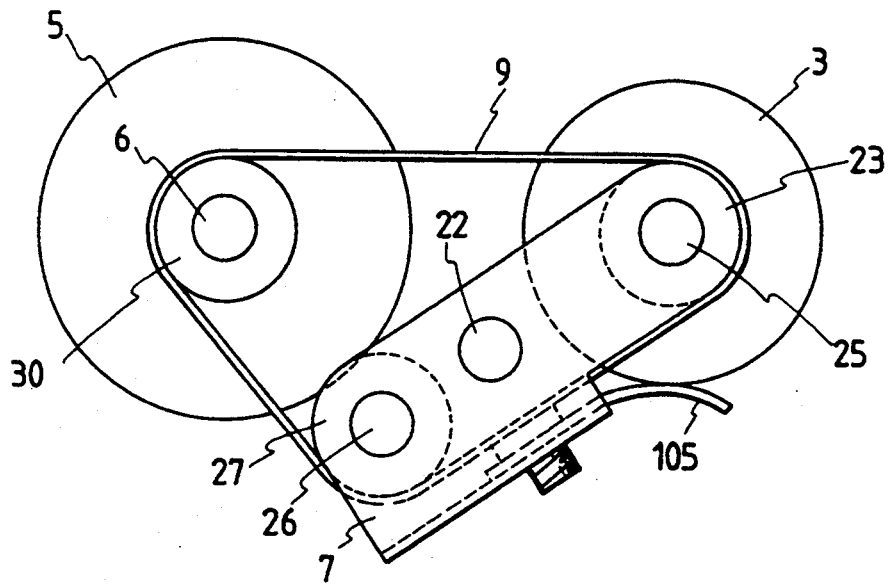
FIG. 44 is a side view showing another example of a main portion of a means for applying a load to auxiliary convey pulleys in previous embodiments.
Figure 45:
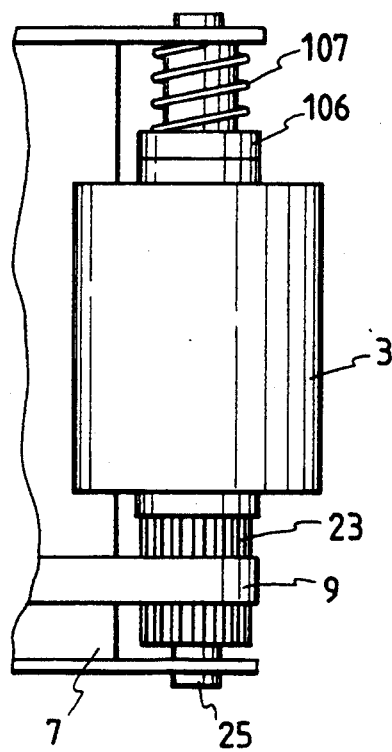
FIGS. 45 and 46 are plan views showing another example of a main portion of a means for applying a load to auxiliary convey pulleys in previous embodiments.
Figure 46:
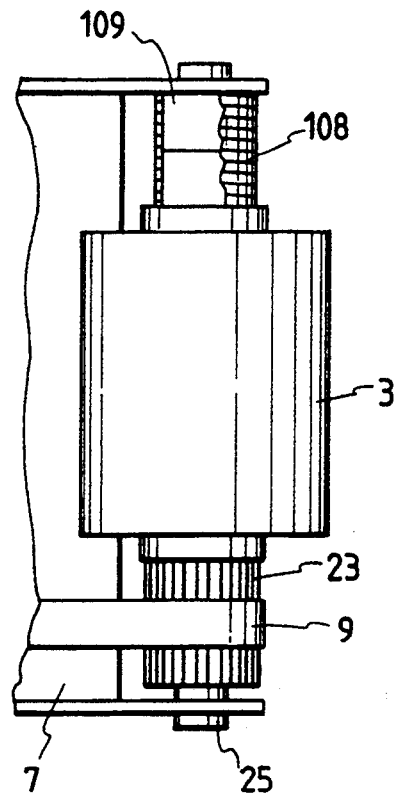

FIGS. 44 to 46 show other examples of the means for applying the load to the rotation of the auxiliary convey pulley 23. In FIG. 44, the reference numeral 105 denotes a leaf spring secured to the support member 7 and adapted to apply the load to the rotation of the auxiliary convey pulley 23 by abutting against the auxiliary convey pulley 23.

Further, in FIG. 45, the reference numeral 10 denotes a friction plate a rotation of which is regulated and which is urged against the end of the auxiliary convey pulley 23 to apply the load to the rotation of the auxiliary convey pulley 23.

Further, in FIG. 46, the reference numeral 108 denotes a spring clutch which is wound around collars 109 secured to the auxiliary convey roller 3 and the support member 7 and which generates an appropriate loosing torque when the auxiliary convey roller 3 is rotated in the sheet conveying direction, thereby applying the load to the rotation of the auxiliary convey pulley 23. Incidentally, as mentioned above, these elements 105, 106, 108 may apply the load to the rotation of the pulley 27.

Next, a fifth embodiment of the present invention will be explained with reference to FIGS. 47 to 49. In this embodiment, the construction of the clutches and the control of the control portion differ from those in the first embodiment. That is, clutches 110, 112 are used in place of the first clutch 11 and the second clutch 12 in the first embodiment.

Figure 47:
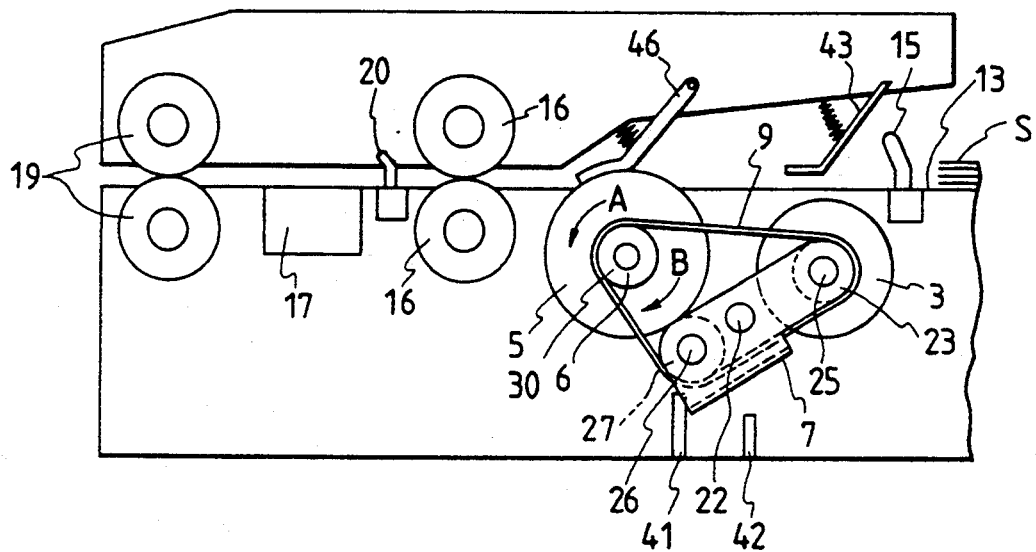
FIG. 47 is a longitudinal sectional view of a sheet supplying apparatus according to a fifth embodiment of the present invention.

First of all, regarding the auxiliary convey system, when the drive pulley 30 is rotated in a direction shown by the arrow A in FIG. 47, the driving force is transmitted to the auxiliary convey pulley 23 and the pulley 27 via the belt 9. The support member 7 is rotated in the anti-clockwise direction around the support shaft 22 until it is stopped by the normal rotation stopper 42, and then the auxiliary convey pulley 23 and the pulley 27 and accordingly the auxiliary convey roller 3 are rotated. In order to permit such rotation, it is necessary to reduce a rotational resistance of the support member 7 as small as possible, because, in a condition that the belt 9 is stopped, the auxiliary convey pulley 23 or the pulley 27 must be subjected to the rotational resistance to an extent that the support member 7 can be kept stationary at any position within a rotational range of the support member 7 without being rotated by the weight of the auxiliary convey roller 3, auxiliary convey pulley 23, pivot shaft 25, pulley 27, pivot shaft 26 and support member 7 themselves.

Figure 48:
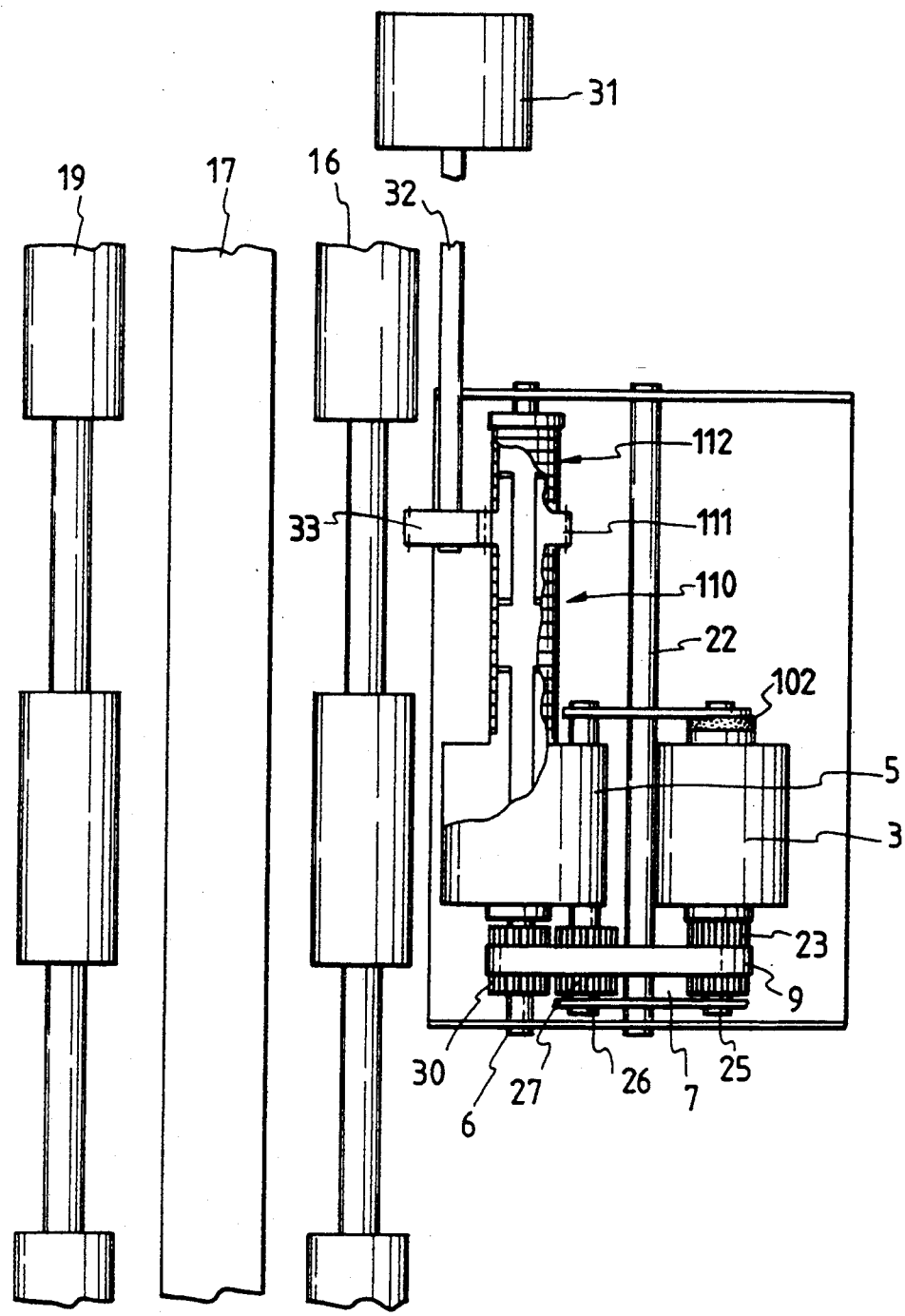
FIG. 48 is a plan view of the sheet supplying apparatus of FIG. 47.
Figure 49:
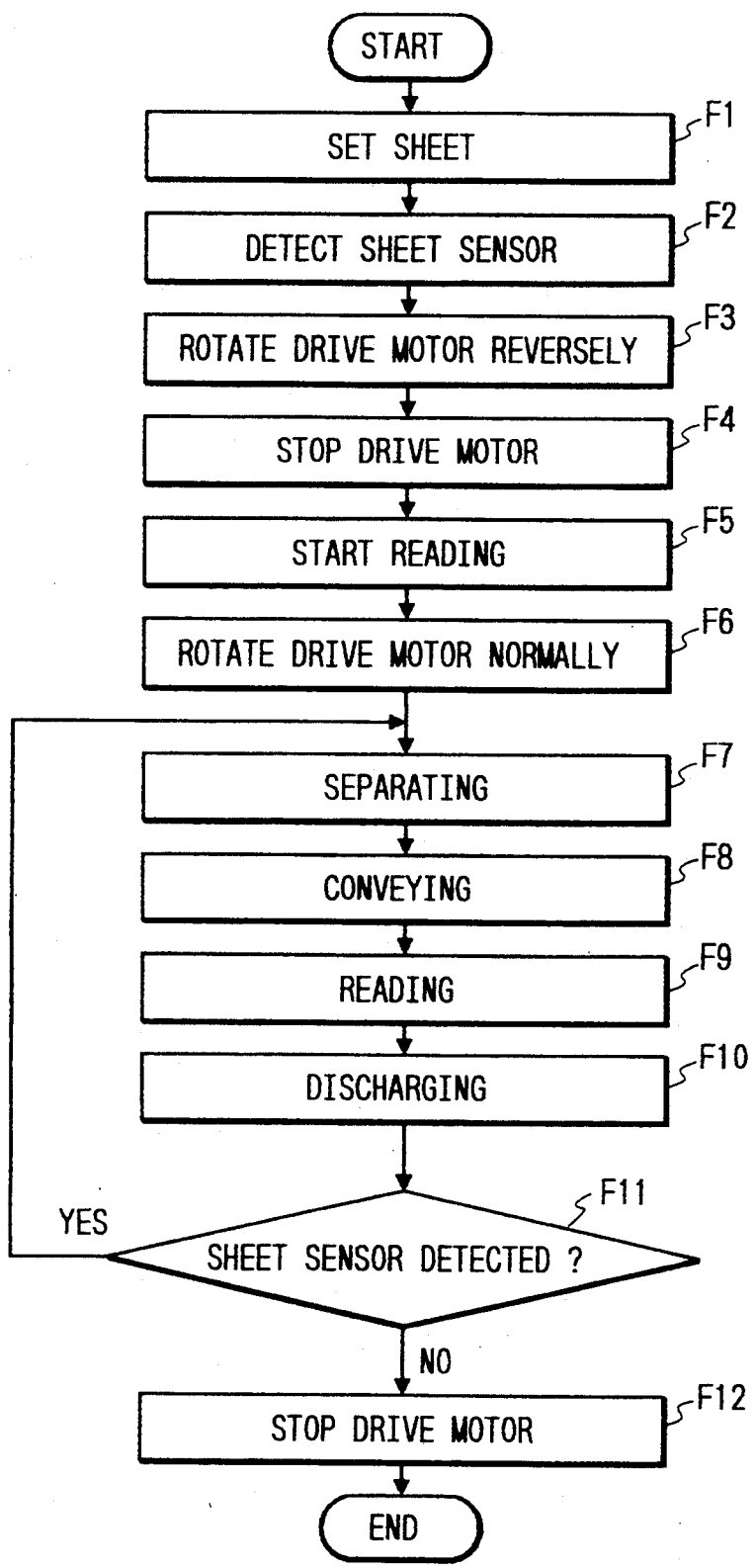
FIG. 49 is a flow chart showing a control of the sheet supplying apparatus of FIG. 47.

In this embodiment, as shown in FIG. 48, a cushion member 102 for applying the load (resistance) to the rotation of the auxiliary convey pulley 23 is disposed between the auxiliary convey roller 3 and the support member 7. Further, the position of the normal rotation stopper 42 is so selected that the auxiliary convey roller 3 is subjected to the pressure from the sheet hold-down member 43 at the same time when the auxiliary convey roller 3 is protruded above the sheet stacking tray 13.

To the contrary, when the drive pulley 30 is rotated in a direction shown by the arrow B in FIG. 47, the driving force is transmitted to the auxiliary convey pulley 23 and the pulley 27 via the belt 9, with the result that, as shown in FIG. 47, the support member 7 is firstly rotated in the clockwise direction around the support shaft 22 until it is stopped by the reverse rotation stopper 41. The position of the reverse rotation stopper 41 is selected so that the auxiliary convey roller 3 is positioned below the sheet stacking tray 13 in this case. Further, since an outer peripheral length defined by the auxiliary convey pulley 23, idle pulley 27 and drive pulley 30 is substantially constant within the rotational range of the support member 7, the belt 9 is prevented from being tensioned too great or too small.

Next, a reading operation will be explained with reference to a flow chart shown in FIG. 49.

An operator sets the sheets S on the sheet stacking tray 13 (step F1). When the sheet S is detected by the sheet detection sensor 15 (step F2), a signal is sent from the sensor to a control portion (not shown). On the basis of a signal from the control portion, a separation gear 111 is rotated in the reverse rotation direction (shown by the arrow B in FIG. 47) by the drive motor 31 (step F3). In this case, although the separation roller 5 is not rotated because of the disengagement of the spring clutch 110, since the driving force is transmitted to the separation shaft 6 via a spring clutch 112, thereby rotating the shaft 6 in the direction shown by the arrow B, the drive pulley 30 connected to the separation shaft 6 is also rotated in the direction B, thereby immediately lowering the auxiliary convey roller 3 even if this auxiliary convey roller is positioned above the sheet stacking tray. Thus, the setting ability of the sheets is improved.

The control portion controls so that drive motor 31 is rotated in the reverse rotation direction until the support member 7 is abutted against the reverse rotation stopper 41 and then the motor 31 is stopped (step F4). The image density and resolving power during the reading of image information are set by the operator, and the reading is started (step F5).

The separation gear 111 is rotated in the normal rotation direction (shown by the arrow A in FIG. 47) by the drive motor 31 on the basis of the signal from the control portion (step F6). In this case, although the spring clutch 112 is disengaged, since the driving force is transmitted to the separation roller 5 and the separation shaft 6 via the spring clutch 110, thereby rotating these elements in the direction A, the drive pulley 30 is also rotated in the direction A, thus lifting the auxiliary convey roller 3. At the same time, the auxiliary convey roller 3 is rotated in the anti-clockwise direction to convey the sheets S to the separation portion.

The sheets S are separated one by one by the separation roller 6 and the separation member 46 (step F7). The separated sheet S is conveyed to the reading portion 17 by the pair of convey rollers 16 (step F8). In this case, since the peripheral speed of the convey roller pair 16 is faster than that of the separation roller 5, the separation roller 5 is driven by the movement of the sheet, with the result that the spring clutch 110 is disengaged, thus stopping the separation shaft 6 and permitting the idle rotation of the separation gear 111. Further, although the auxiliary convey roller 3 is also driven by the movement of the sheet, since the separation shaft 6 is stopped, a length of the belt 9 between the auxiliary convey pulley 23 and the drive pulley 30 is increased and a length of the belt 9 between the pulley 27 and the drive pulley 30 is decreased, thereby rotating the support member 7 in the clockwise direction in FIG. 47 to lower the auxiliary convey roller 3 to a position where the auxiliary convey roller is not driven by the movement of the sheet. In this way, the auxiliary conveying force is interrupted.

Thereafter, when the trailing end of the sheet S has passed through the separation roller 5, the separation roller 5 is not driven by the movement of the sheet, with the result that the spring clutch 110 is engaged, thereby restoring the auxiliary conveying force. That is, the auxiliary convey roller 3 is lifted.

The image information on the sheet S is read by the reading portion 17 (step F9). Then, the sheet S is discharged by the pair of discharge rollers 19 (step F10). When the reading of the sheet is completed, if there is a next sheet S (step F11), the program returns to the step F7 to continue the reading, and, when all of the sheets S are read, the program goes to a step F12.

The drive motor 31 is stopped by the signal from the control portion (step F12), and all of the reading operations are finished.

Next, a first alteration of the fifth embodiment will be explained. Incidentally, in this alteration, only the controlling method differs from that of the fifth embodiment.

Figure 50:
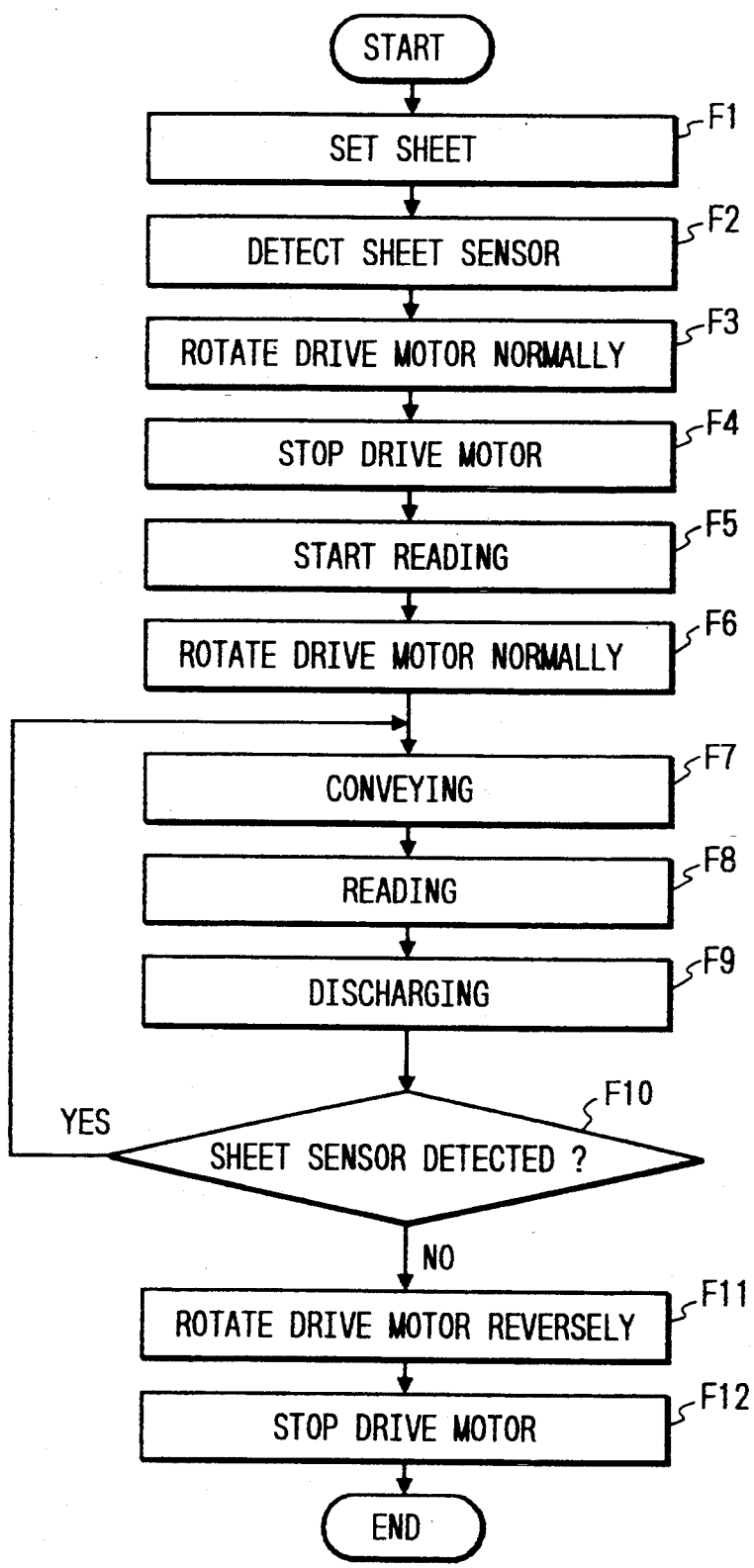
FIG. 50 is a flow chart according to a first alteration of the fifth embodiment.

A reading operation will be described with reference to a flow chart shown in FIG. 50.

The sheets S are set on the sheet stacking tray 13 by the operator (step F1). In this case, the auxiliary convey roller 3 is positioned below the sheet stacking tray 13 so that the sheets S can easily be set by the operator. When the sheet S is detected by the sheet detection sensor 15 (step F2), a signal is sent from the sensor to a control portion.

On the basis of the signal from the control portion, the separation gear 111 is rotated in the normal rotation direction (shown by the arrow A in FIG. 47) by the drive motor 31 (step F3). In this case, although the spring clutch 112 is disengaged, since the driving force is transmitted to the separation roller 5 and the separation shaft 6 via the spring clutch 110, thereby rotating these elements 5, 6 in the direction shown by the arrow A, the drive pulley 30 connected to the separation shaft 6 is also rotated in the direction A, whereby the auxiliary convey roller 3 conveys the sheets S to the separation portion. The control portion controls so that the drive motor 31 is rotated until the first sheet S is separated by the separation roller 5 and the separation member 46 and the leading end of the separated sheet S is detected by the aligning sensor 20 and then the drive motor is stopped (step F4).

The image density and resolving power during the reading of image information are set by the operator, and the reading is started (step F5).

On the basis of the signal from the control portion, the separation gear 111 is rotated in the normal rotation direction (shown by the arrow A in FIG. 47) by the drive motor 31 (step F6). The separated sheet S is conveyed to the reading portion 17 by the pair of convey rollers 16 (step F7). In this case, since the peripheral speed of the convey roller pair 16 is faster than that of the separation roller 5, the separation roller 5 is driven by the movement of the sheet, with the result that the spring clutch 110 is disengaged, thereby stopping the separation shaft 6 and permitting the idle rotation of the separation gear 111. Further, although the auxiliary convey roller 3 is also driven by the movement of the sheet, since the separation shaft 6 is stopped, a length of the belt 9 between the auxiliary convey pulley 23 and the drive pulley 30 is increased and a length of the belt 9 between the pulley 27 and the drive pulley 30 is decreased, thereby rotating the support member 7 in the clockwise direction in FIG. 47 to lower the auxiliary convey roller 3 to a position where the auxiliary convey roller is not driven by the movement of the sheet. In this way, the auxiliary conveying force is interrupted.

Thereafter, when the trailing end of the sheet S has passed through the separation roller 5, the separation roller 5 is not driven by the movement of the sheet, with the result that the spring clutch 110 is engaged, thereby restoring the auxiliary conveying force.

The image information on the sheet S is read by the reading portion 17 (step F8). Then, the sheet S is discharged by the pair of discharge rollers 19 (step F9). When the reading of the sheet is completed, if there is a next sheet S (step F10), the program returns to the step F7 to continue the reading, and, when all of the sheets S are read, the program goes to a step F11.

On the basis of the signal from the control portion, the separation gear 111 is rotated in the reverse rotation direction (shown by the arrow B in FIG. 47) by the drive motor 31 (step F11). In this case, although the separation roller 5 is not rotated because of the disengagement of the spring clutch 110, since the driving force is transmitted to the separation shaft 6 via the spring clutch 112, thereby rotating the separation shaft in the direction B, the drive pulley 30 is also rotated in the direction B to lower the auxiliary convey roller 3 below the sheet stacking tray 13. Thus, the sheets S can easily be set by the operator. The control portion controls so that the drive motor 31 is rotated in the reverse rotation direction until the support member 7 is abutted against the reverse rotation stopper 41 and then the drive motor is stopped (step F12). Thereafter, all of the reading operations are finished.

In this alteration, when the apparatus is in a stand-by condition after a power source is turned ON, or when the apparatus is returned to the stand-by condition after the abnormal condition such as the sheet jam or the sheet removal during the operative condition, the drive motor 31 is controlled so that the drive pulley 30 is rotated in the reverse rotation direction (shown by the arrow B in FIG. 47), thereby lowering the auxiliary convey roller 3 below the sheet stacking tray 13.

Next, a second alteration of the fifth embodiment will be explained. In this second alteration, during the auxiliary convey roller 3 is being lowered after a group of readings have been finished, when a group of next sheets are set, the auxiliary convey roller 3 is lifted. A reading operation will be described with reference to a flow chart shown in FIG. 51.

The sheets S are set on the sheet stacking tray 13 by the operator (step F1). In this case, the auxiliary convey roller 3 is positioned below the sheet stacking tray 13 so that the sheets S can easily be set by the operator. When the sheet S is detected by the sheet detection sensor 15 (step F2), a signal is sent from the sensor to a control portion. On the basis of the signal from the control portion, the separation gear 111 is rotated in the normal rotation direction (shown by the arrow A in FIG. 47) by the drive motor 31 (step F3). In this case, although the spring clutch 112 is disengaged, since the driving force is transmitted to the separation roller 5 and the separation shaft 6 via the spring clutch 110, thereby rotating these elements 5, 6 in the direction shown by the arrow A, the drive pulley 30 connected to the separation shaft 6 is also rotated in the direction A, whereby the auxiliary convey roller 3 conveys the sheets S to the separation portion.

The control portion controls so that the drive motor 31 is rotated until the first sheet S is separated by the separation roller 5 and the separation member 46 and the leading end of the separated sheet S is detected by the aligning sensor 20 and then the drive motor is stopped (step F4). The image density and resolving power during the reading of image information are set by the operator, and the reading is started (step F5). On the basis of the signal from the control portion, the separation gear 111 is rotated in the normal rotation direction (shown by the arrow A in FIG. 47) by the drive motor 31 (step F6).

The separated sheet S is conveyed to the reading portion 17 by the pair of convey rollers 16 (step F7). In this case, since the peripheral speed of the convey roller pair 16 is faster than that of the separation roller 5, the separation roller 5 is driven by the movement of the sheet, with the result that the spring clutch 110 is disengaged, thereby stopping the separation shaft 6 and permitting the idle rotation of the separation gear 111. Further, although the auxiliary convey roller 3 is also driven by the movement of the sheet, since the separation shaft 6 is stopped, a length of the belt 9 between the auxiliary convey pulley 23 and the drive pulley 30 is increased and a length of the belt 9 between the pulley 27 and the drive pulley 30 is decreased, thereby rotating the support member 7 in the clockwise direction in FIG. 47 to lower the auxiliary convey roller 3 to a position where the auxiliary convey roller is not driven by the movement of the sheet. In this way, the auxiliary conveying force is interrupted.

Thereafter, when the trailing end of the sheet S has passed through the separation roller 5, the separation roller 5 is not driven by the movement of the sheet, with the result that the spring clutch 110 is engaged, thereby restoring the auxiliary conveying force.

The image information on the sheet S is read by the reading portion 17 (step F8). Then, the sheet S is discharged by the pair of discharge rollers 19 (step F9). When the reading of the sheet is completed, if there is a next sheet S (step F10), the program returns to the step F7 to continue the reading, and, when all of the sheets S are read, the program goes to a step F11.

On the basis of the signal from the control portion, the separation gear 111 is rotated in the reverse rotation direction (shown by the arrow B in FIG. 47) by the drive motor 31 (step F11). In this case, although the separation roller 5 is not rotated because of the disengagement of the spring clutch 110, since the driving force is transmitted to the separation shaft 6 via the spring clutch 112, thereby rotating the separation shaft in the direction B, the drive pulley 30 is also rotated in the direction B to lower the auxiliary convey roller 3 below the sheet stacking tray 13. Thus, the sheets S can easily be set by the operator.

When the fact that the sheets S are set during the reverse rotation of the drive motor 31 is detected by the sheet detection sensor 15 (step F12), the program is returned to the step F3 on the basis of the signal from the control portion, thereby rotating the drive motor 31 in the normal rotation direction again, and then the program goes to a step F13. The control portion controls so that the drive motor 31 is rotated in the reverse rotation direction until the support member 7 is abutted against the reverse rotation stopper 41 (step F13) and then the drive motor is stopped. And, all of the reading operations are finished.

Figure 51:
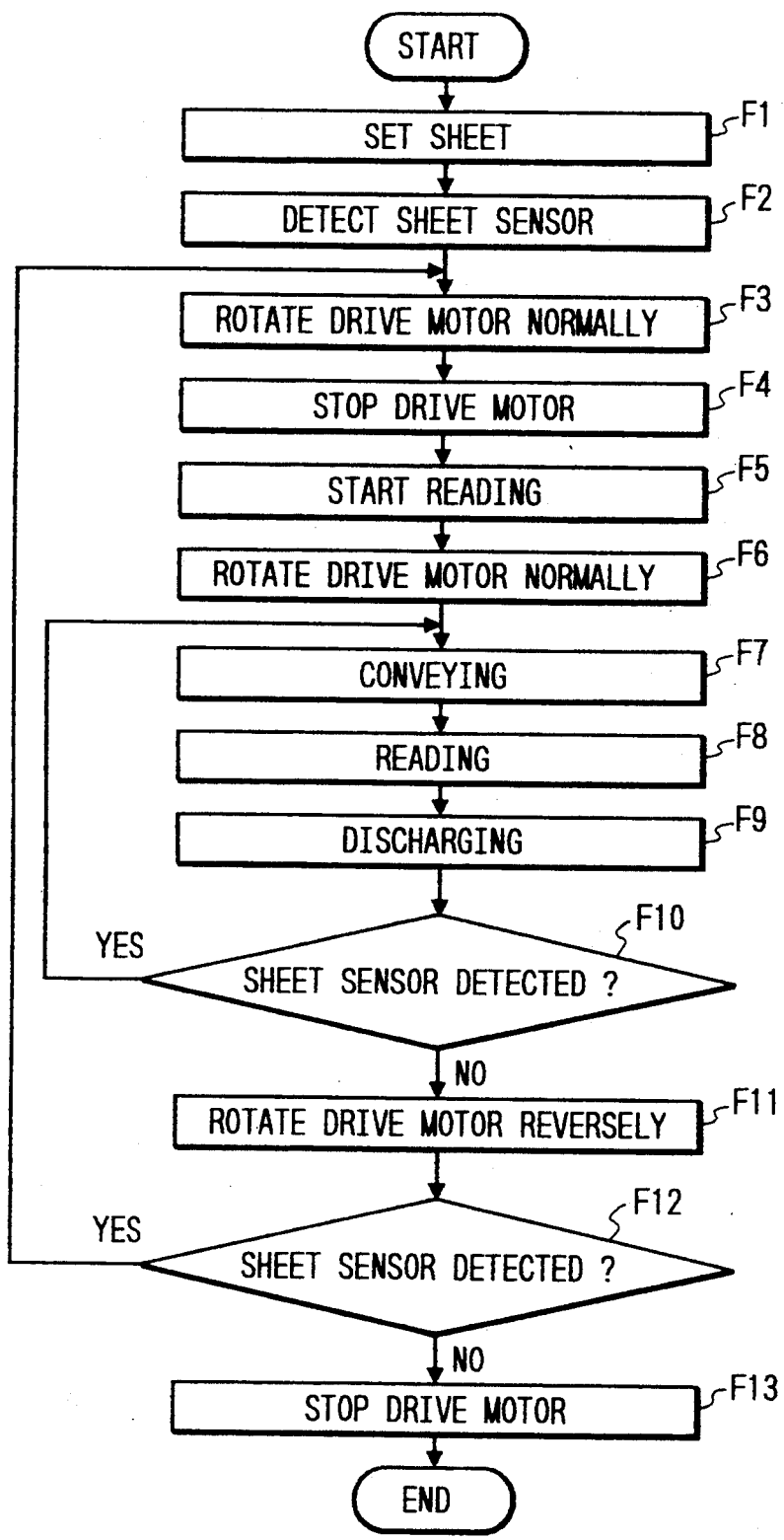
FIG. 51 is a flow chart according to a second alteration of the fifth embodiment.

In this alteration, when the apparatus is in the stand-by condition after the power source is turned ON, or when the apparatus is returned to the stand-by condition after the abnormal condition such as the sheet jam or the sheet removal during the operative condition, the drive motor 31 is controlled so that the drive pulley 30 is rotated in the reverse rotation direction (shown by the arrow B in FIG. 47), thereby lowering the auxiliary convey roller 3 below the sheet stacking tray 13. However, on the way, when the fact that the sheets S are set is detected by the sheet detection sensor 15, the drive pulley 30 is rotated in the normal rotation direction (shown by the arrow A in FIG. 47) by the drive motor 31 so that the sequence after the step F3 in FIG. 51 is effected.

Next, a sixth embodiment of the present invention will be explained. This embodiment has the same construction as that of the first alteration of the fourth embodiment, but the control thereof differs from that of the first alteration of the fourth embodiment.

Figure 52:
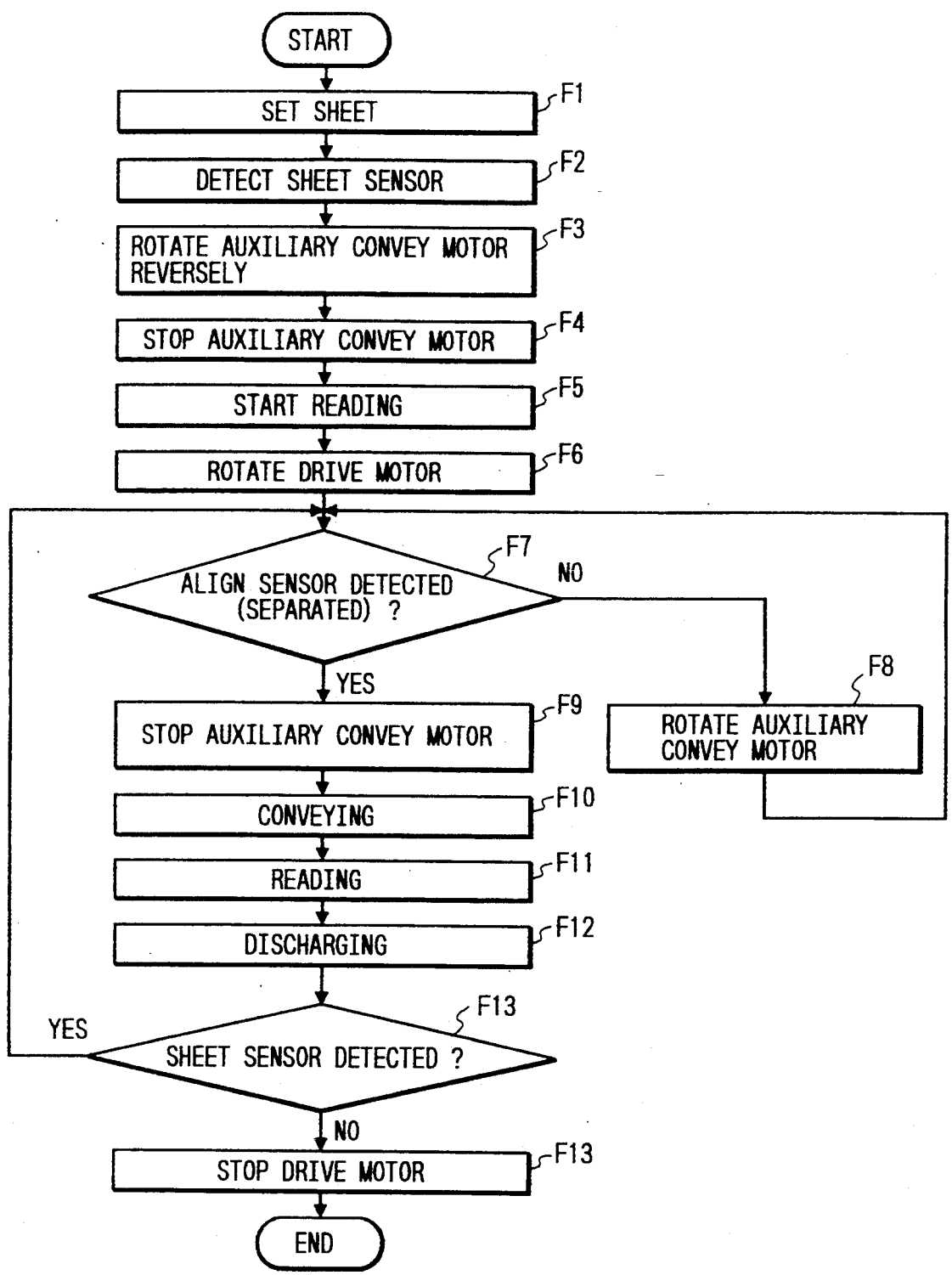
FIG. 52 is a flow chart according to a sixth embodiment of the pre sent invention.

A reading operation is as shown in a flow chart of FIG. 52.

The sheets S are set on the sheet stacking tray 13 by the operator (step F1). When the sheet S is detected by the sheet detection sensor 15 (step F2), a signal is sent from the sensor to a control portion. On the basis of the signal from the control portion, the auxiliary convey motor 104 is rotated in the reverse rotation direction so that the auxiliary convey roller 3 is lowered below the sheet stacking tray 13 (step F3). The control portion controls so that the auxiliary convey motor 104 is rotated in the reverse rotation direction until the support member 7 is abutted against the reverse rotation stopper 41 (step F4) and then the motor is stopped.

The image density and resolving power during the reading of the image information are set by the operator, and the reading is started (step F5). On the basis of the signal from the control portion, the drive motor 31 is rotated (step F6) to drive the separation roller 5, paired convey rollers 16 and paired discharge rollers 19. The sheets S are separated one by one by the separation roller 5 and the separation member 46. In this case, however, since the auxiliary conveying force does not act (the auxiliary convey roller 3 is not lifted by the rotation of the motor 31), the sheets S are not sometimes conveyed. Thus, when the sheet S is not conveyed (i.e., when the sheet S is not detected by the aligning sensor 20) after a predetermined time has been elapsed, the program goes to a step F8; whereas, if detected, the program goes to a step F9 (step F7).

On the basis of the signal from the control portion, the auxiliary convey motor 104 is rotated in the normal rotation direction so that the auxiliary convey roller 3 is lifted above the sheet stacking tray 13, thereby providing the auxiliary conveying force (step F8). When the auxiliary convey motor 104 is rotated in the normal rotation direction by the signal from the control portion, this motor is stopped, thereby interrupting the auxiliary conveying force. The separated sheet S is conveyed to the reading portion 17 by the pair of convey rollers 16 (step F10). The image information on the sheet S is read by the reading portion 17 (step F11). Then, the sheet S is discharged by the pair of discharge rollers 19 (step F12).

When the reading of the sheet is completed, if there is a next sheet S, the program returns to the step F7 to continue the reading, and, when all of the sheets S are read, the program goes to a step F14 (step F13). On the basis of the signal from the control portion, the drive motor 31 is stopped (step F14), and all of the reading operations are finished.

With the arrangement as mentioned above, it is possible to improve the setting ability of the sheets with a simple construction.

Figure 53:
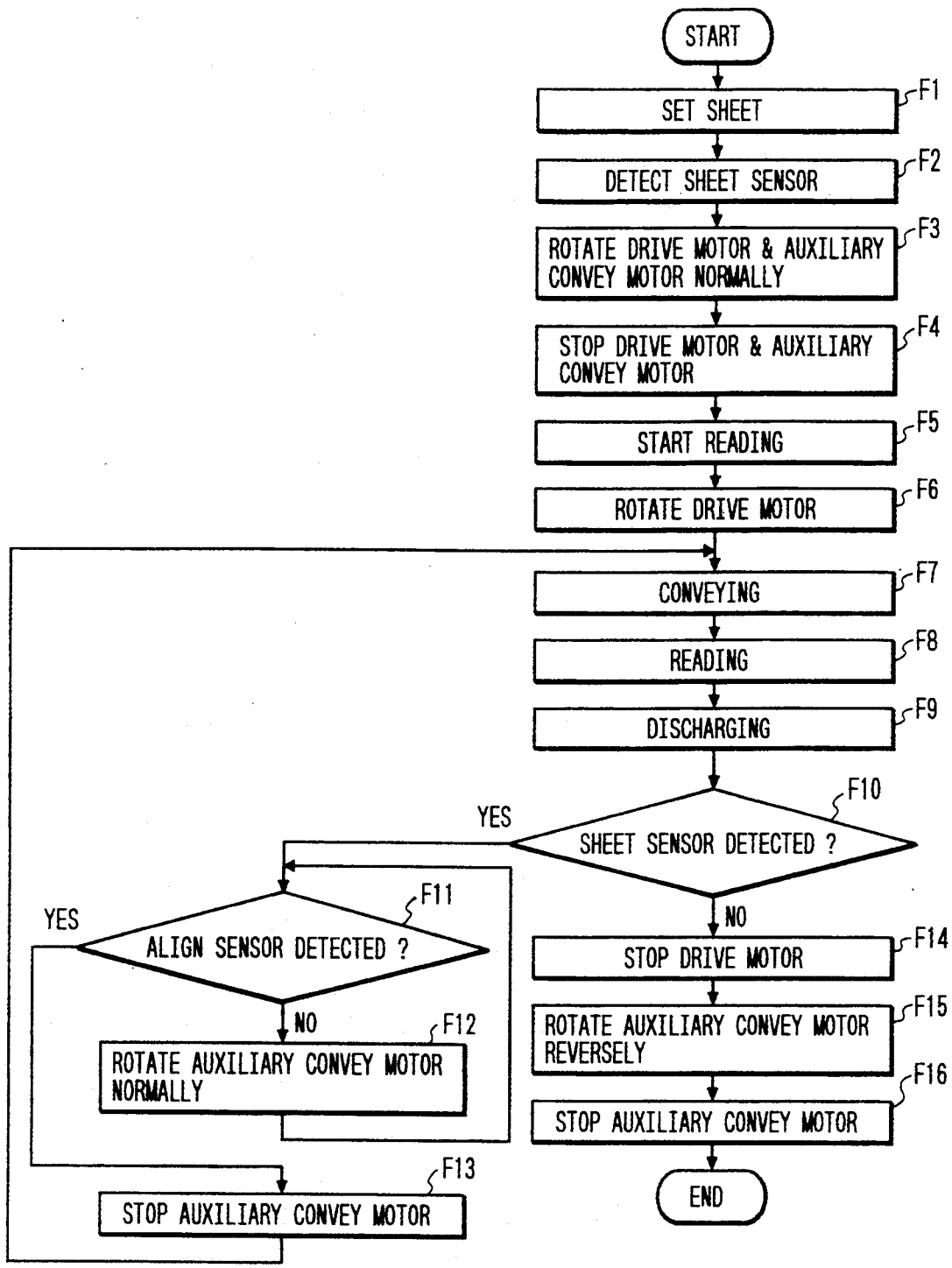
FIG. 53 is a flow-chart according to a first alteration of the sixth embodiment.

Next, a first alteration of the sixth embodiment will be explained with reference to a flow chart shown in FIG. 53.

The sheets S are set on the sheet stacking tray 13 by the operator (step F1). In this case, the auxiliary convey roller 3 is positioned below the sheet stacking tray 13 so that the sheets S can easily be set by the operator. When the sheet S is detected by the sheet detection sensor 15 (step F2), a signal is sent from the sensor to a control portion. On the basis of the signal from the control portion, the drive motor 31 and the auxiliary convey motor 104 are rotated in the normal rotation (step F3).

The control portion controls so that the drive motor 31 and the auxiliary convey roller 104 are rotated until the first sheet S is separated by the separation roller 5 and the separation member 46 and the leading end of the separated sheet S is detected by the aligning sensor 20 and then these motors are stopped (step F4).

The image density and resolving power during the reading of the image information are set by the operator, and the reading is started (step F5). On the basis of the signal from the control portion, the drive motor 31 is rotated (step F6) to drive the separation roller 5, paired convey rollers 16 and paired discharge rollers 19. The separated sheet S is conveyed to the reading portion 17 by the pair of convey rollers 16 (step F7). The image information on the sheet S is read by the reading portion 17 (step F8). Then, the sheet S is discharged by the pair of discharge rollers 19 (step F9).

When the reading of the sheet is completed, if there is a next sheet S, the program returns to a step F11, and, when all of the sheets S are read, the program goes to a step F14 (step F10). The next sheet S is separated by the separation roller 5 and the separation member 46. In this case, however, since the auxiliary conveying force does not act (regarding the next sheet), the sheets S are not sometimes conveyed. Thus, when the sheet S is not conveyed (i.e., when the sheet S is not detected by the aligning sensor 20) after a predetermined time has been elapsed, the program goes to a step F12; whereas, if detected, the program goes to a step F13 (step F11).

On the basis of the signal from the control portion, the auxiliary convey motor 104 is rotated in the normal rotation direction, thereby providing the auxiliary conveying force (step F12). When the auxiliary convey motor 104 is rotated in the normal rotation direction by the signal from the control portion, this motor is stopped, thereby interrupting the auxiliary conveying force, and the program returns to the step F7 to continue the reading (step F13). On the basis of the signal from the control portion, the drive motor 31 is stopped. On the basis of the signal from the control portion, the auxiliary convey motor 104 is rotated in the reverse direction (step F15). The control portion controls so that the auxiliary convey motor 104 is rotated in the reverse rotation direction until the support member 7 is abutted against the reverse rotation stopper 41 and then the motor is stopped (step F16). And, all of the reading operations are finished.

With this arrangement, when the apparatus is in the stand-by condition after the power source is turned ON, or when the apparatus is returned to the stand-by condition after the abnormal condition such as the sheet jam or the sheet removal during the operative condition, the drive pulley 30 is rotated in the reverse rotation direction, and the auxiliary convey motor 104 is controlled so as to lower the auxiliary convey roller 3 below the sheet stacking tray 13.

Figure 54:
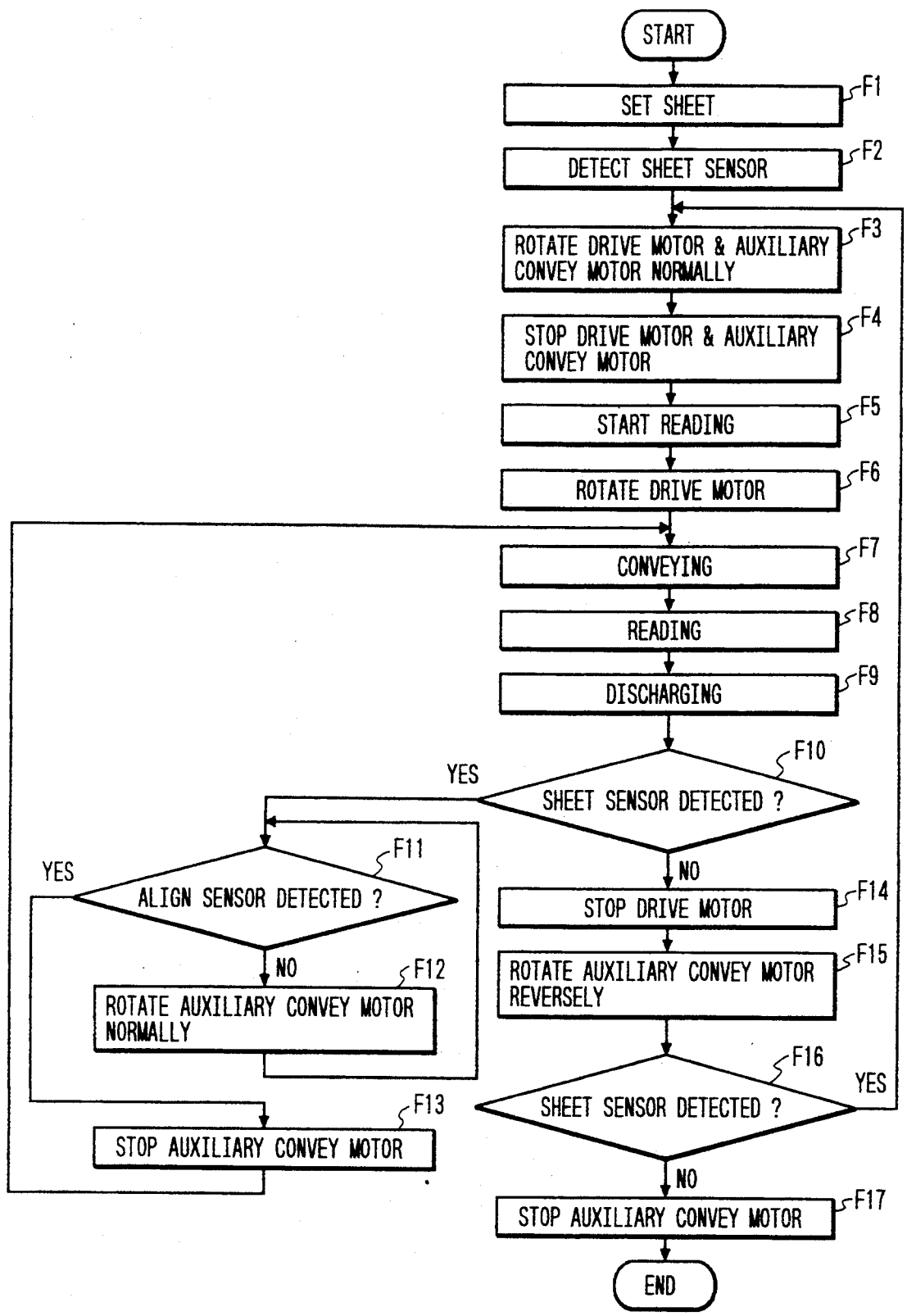
FIG. 54 is a flow chart according to a second alteration of the sixth embodiment.

Next, a second alteration of the sixth embodiment will be explained. A reading operation in this case is as shown by a flow chart of in FIG. 54.

The sheets S are set on the sheet stacking tray 13 by the operator (step F1). In this case, the auxiliary convey roller 3 is positioned below the sheet stacking tray 13 so that the sheets S can easily be set by the operator. When the sheet S is detected by the sheet detection sensor 15 (step F2), a signal is sent from the sensor to a control portion. On the basis of the signal from the control portion, the drive motor 31 and the auxiliary convey motor 104 are rotated in the normal rotation (step F3).

The control portion controls so that the drive motor 31 and the auxiliary convey roller 104 are rotated until the first sheet S is separated by the separation roller 5 and the separation member 46 and the leading end of the separated sheet S is detected by the aligning sensor 20 and then these motors are stopped (step F4).

The image density and resolving power during the reading of the image information are set by the operator, and the reading is started (step F5). On the basis of the signal from the control portion, the drive motor 31 is rotated (step F6) to drive the separation roller 5, paired convey rollers 16 and paired discharge rollers 19. The separated sheet S is conveyed to the reading portion 17 by the pair of convey rollers 16 (step F7). The image information on the sheet S is read by the reading portion 17 (step F8). Then, the sheet S is discharged by the pair of discharge rollers 19 (step F9).

When the reading of the sheet is completed, if there is a next sheet S, the program returns to a step F11, and, when all of the sheets S are read, the program goes to a step F14 (step F10).

The next sheet S is separated by the separation roller 5 and the separation member 46. In this case, however, since the auxiliary conveying force does not act (regarding the next sheet), the sheets S are not sometimes conveyed. Thus, when the sheet S is not conveyed (i.e., when the sheet S is not detected by the aligning sensor 20) after a predetermined time has been elapsed, the program goes to a step F12; whereas, if detected, the program goes to a step F13 (step F11). On the basis of the signal from the control portion, the auxiliary convey motor 104 is rotated in the normal rotation direction, thereby providing the auxiliary conveying force (step F12). When the auxiliary convey motor 104 is rotated in the normal rotation direction by the signal from the control portion, this motor is stopped, thereby interrupting the auxiliary conveying force, and the program returns to the step F7 to continue the reading (step F13). On the basis of the signal from the control portion, the drive motor 31 is stopped (step F15). On the basis of the signal from the control portion, the auxiliary convey motor 104 is rotated in the reverse direction (step F15). When the fact that the sheets S are set during the reverse rotation of the auxiliary convey motor 104 is detected by the sheet detection sensor 15, the program is returned to the step F3 by the signal from the control portion, thereby rotating the drive motor 31 and the auxiliary convey motor 104 in the normal rotation direction again; whereas, if not detected, the program goes to a step F17 (step F16).

The control portion controls so that the auxiliary convey motor 104 is rotated in the reverse rotation direction until the support member 7 is abutted against the reverse rotation stopper 41 and then the motor is stopped. And, all of the reading operations are finished.

With this arrangement, when the apparatus is in the stand-by condition after the power source is turned ON, or when the apparatus is returned to the stand-by condition after the abnormal condition such as the sheet jam or the sheet removal during the operative condition, the drive pulley 30 is rotated in the reverse rotation direction, and the auxiliary convey motor 104 is controlled so as to lower the auxiliary convey roller 3 below the sheet stacking tray 13. However, on the way, when the fact that the sheets S are set is detected by the sheet detection sensor 15, the drive pulley 31 is rotated in the normal rotation direction by the auxiliary convey motor 104, whereby the sequence after the step F3 in FIG. 52 is effected.

What is claimed is:

1. A sheet supplying apparatus, comprising:

sheet supporting means for supporting sheets;

feeding means for feeding out the sheets supported on said sheet supporting means;

separation means for separating the sheets fed out by said feeding means one by one and for conveying a separated sheet;

support means for supporting said feeding means for shifting said feeding means between a sheet convey position and a non-convey position; and retract means for retracting said feeding means to said non-convey position when said feeding means is rotated in a sheet feeding direction by a sheet separated by said separation means.

2. A sheet supplying apparatus according to claim 1, wherein said support means is a pivotable support member for supporting said feeding means.

3. A sheet supplying apparatus according to claim 2, wherein said retract means comprises pulleys provided on said separation means, said feeding means and said support means, respectively, and a belt wound around said pulleys, and wherein, when said pulleys and belt transmit a rotation from said separation means to said feeding means they maintain said feeding means at said sheet convey position, and when said feeding means is rotated in a sheet feeding direction by the sheet separated by said separation means said feeding means is shifted to said non-convey position by said pulleys and belt.

4. An image reading apparatus, comprising:

sheet supporting means for supporting sheets;

feeding means for feeding out the sheets supported on said sheet supporting means;

separation means for separating the sheets fed out by said feeding means one by one and for conveying the separated sheet;

support means for supporting said feeding means for shifting said feeding means between a sheet convey position and a non-convey position;

retract means for retracting said feeding means to said non-convey position when said feeding means is rotated in a sheet feeding direction by a sheet separated by said separation means; and reading means for reading an image written on an original as the sheet separated and conveyed by said separation means.

5. An image reading apparatus according to claim 4, wherein said support means is a pivotable support member for supporting said feeding means.

6. An image reading apparatus according to claim 5, wherein said retract means comprises pulleys provided on said separation means, said feeding means and said support means, respectively, and a belt wound around said pulleys, and wherein, when said pulleys and belt transmit a rotation from said separation means to said feeding means they maintain said feeding means at said sheet convey position, and when said feeding means is rotated in a sheet feeding direction by the sheet separated by said separation means said feeding means is shifted to said non-convey position by said pulleys and belt.

7. A sheet supplying apparatus, comprising:

sheet supporting means for supporting sheets thereon;

feeding means for feeding out the sheets supported on said sheet supporting means;

separation means for separating the sheets fed out by said feeding means one by one to convey the separated sheet;

rotary transmission means for transmitting a rotation in a sheet conveying direction to said separation means;

sheet convey means for conveying the sheet separated by said separation means at a speed faster than a conveying speed of said separation means;

support means for supporting said feeding means to shift said feeding means between a sheet convey position and a sheet non-convey position, said support means shifting said feeding means to the sheet convey position when the rotation is transmitted to said separation means by said rotary transmission means;

rotation control means for interrupting the transmission of the rotation by said rotary transmission means, when said separation means is rotated due to a difference of the conveying speed of said separation means and that of said sheet convey means; and retract means for retracting said feeding means to the sheet non-convey position, when the transmission of rotation by said rotary transmission means is interrupted by said rotation control means.

8. A sheet supplying apparatus according to claim 7, wherein said rotary transmission means comprises a drive shaft transmitting the rotation in a first direction and that of a second direction opposite thereto; and wherein when said drive shaft transmits rotation in the first direction, said separation means rotates in the sheet convey direction and said support means shifts said feeding means to the sheet convey position, while when said drive shaft transmits rotation in the second direction, said feeding means is retracted to the non-convey position.

9. A sheet supplying apparatus according to claim 8, wherein said support means comprises a rockable support member for supporting said feed means, a rotation transmitting member provided on said support member and adapted to transmit the rotation of said drive shaft to said feed means, and a friction means for generating a load for rocking said support member by the rotation transmitted by said rotation transmitting member.

10. A sheet supplying apparatus according to claim 8, wherein said separation means is rotatably mounted on said drive shaft, and said rotation control means comprises a spring clutch having a spring; and wherein said spring clutch transmits the rotation of said drive shaft in the first direction to said separation means when the spring is tightened, and interrupts the rotation when the spring is loosened due to a difference in conveying speed of the sheet between said separation means and said convey means.

11. A sheet supplying apparatus according to claim 8, wherein said retract means comprises rotation generating means for generating the rotation of said drive shaft in the second direction when the transmission of the rotation to said separation means is interrupted by said rotation control means; and wherein said support means shifts said feeding means from the sheet convey position to the non-convey position by the rotation in the second direction generated by said rotation generating means.

12. A sheet supplying apparatus according to claim 11, wherein said rotation generating means comprises transmission means for transmitting the rotation in the second direction to said drive shaft and a torque limiter disposed between said transmission means and said drive shaft, said torque limiter having a torque limit value at which the transmission of rotation in the second direction is interrupted when the rotation in the first direction is transmitted to said separation means, but is transmitted to said drive shaft when the transmission of the rotation in the first direction is interrupted by said rotation control means.

13. A sheet supplying apparatus according to claim 12, wherein said torque limiter comprises a spring clutch.

14. A sheet supplying apparatus according to claim 11, wherein said rotation generating means comprises transmission means for transmitting the rotation in the second direction to said drive shaft and a friction transmitting member disposed between said transmission means and said drive shaft, said friction transmitting member slips and interrupts the transmission of the rotation in the second direction when the rotation in the first direction is transmitted to said separation means, but is transmitted to said drive shaft when the transmission of the rotation in the first direction is interrupted by said rotation control means.

15. A sheet supplying apparatus according to claim 11, wherein said rotation generating means comprises a cam in frictional contact with said drive shaft and biasing means for applying to said cam a rotational force for rotating said drive shaft in the second direction, said cam being designed to be rotated to balance with a biasing force of said biasing means by frictional contact with said drive shaft when the rotation is transmitted to said separation means by said rotary transmission means, and causes said drive shaft to rotate in the second direction by a biasing force of said biasing means when the transmission of the rotation in the first direction to said separation means is interrupted by said rotation control means.

16. A sheet supplying apparatus according to claim 7, wherein said retract means comprises bias means for biasing said support means toward a direction in which said feeding means is shifted to said non-convey position, said bias means having a biasing force for permitting said support means to shift said feeding means to the sheet convey position when the rotation is transmitted to said separation means by said rotary transmission means and causes said support means to shift said feeding means to said sheet non-convey position when the transmission of the rotation to said separation means is interrupted by said rotation control means.

17. A sheet supplying apparatus according to claim 16, wherein said bias means comprises a spring.

18. A sheet supplying apparatus according to claim 7, wherein a time period during which the sheet is conveyed from said separation means to said sheet convey means becomes shorter than a time period during which said feeding means is shifted from said non-convey position to said sheet convey position by said support means.

19. A sheet supplying apparatus according to claim 18, wherein said support means comprises a pivotable support member for supporting said feeding means, a rotation transmitting member provided on said support member and adapted to transmit the rotation of said drive shaft to said feeding means, and a friction means for generating a load for pivoting said support member by the rotation transmitted by said rotation transmitting member, means for setting said timing comprises a timing plate for causing said friction means to generate the load when a predetermined time is elapsed after the rotation is transmitted by said rotation transmitting means.

20. A sheet supplying apparatus according to claim 7 or 8, wherein support means includes a cleaning means for cleaning said separation means, and wherein said cleaning means is shifted to a position where said separation means is cleaned by said cleaning means as said feeding means is shifted from said sheet convey position to said non-convey position.

21. An image reading apparatus comprising:
sheet supporting means for supporting sheets thereon;
feeding means for feeding out the sheets supported on said sheet supporting means;
separation means for separating the sheets fed out by said feeding means one by one to convey the separated sheet;
rotary transmission means for transmitting a rotation in a sheet conveying direction to said separation means;
sheet convey means for conveying the sheet separated by said separation means at a speed faster than a conveying speed of said separation means;
support means for supporting said feeding means to shift said feeding means between a sheet convey position and a sheet non-convey position, said support means shifting said feeding means to the sheet convey position when the rotation is transmitted to said separation means by said rotary transmission means;
rotation control means for interrupting the transmission of the rotation by said rotary transmission means, when said separation means is rotated due to a difference of the conveying speed of said separation means and that of said sheet convey means;
retract means for retracting said feeding means to the sheet non-convey position, when the transmission of rotation by said rotary transmission means is interrupted by said rotation control means; and
image reading means for reading an image on an original as the sheet supplied by said sheet supplying apparatus.

22. An image reading apparatus according to claim 21, wherein said rotary transmission means comprises a drive shaft transmitting the rotation in a first direction and that of a second direction opposite thereto; and wherein when said drive shaft transmits rotation in the first direction, said separation means rotates in the sheet convey direction and said support means shifts said feeding means to the sheet convey position, while when said drive shaft transmits rotation in the second direction, said feeding means is retracted to the non-convey position.

23. An image reading apparatus according to claim 22, wherein said support means comprises a rockable support member for supporting said feed means, a rotation transmitting member provided on said support member and adapted to transmit the rotation of said drive shaft to said feed means, and a friction means for generating a load for rocking said support member by the rotation transmitted by said rotation transmitting member.

24. An image reading apparatus according to claim 22, wherein said separation means is rotatably mounted on said drive shaft, and said rotation control means comprises a spring clutch having a spring; and wherein said spring clutch transmits the rotation of said drive shaft in the first direction to said separation means when the spring is tightened, and interrupts the rotation when the spring is loosened due to a difference in conveying speed of the sheet between said separation means and said convey means.

25. An image reading apparatus according to claim 22, wherein said retract means comprises rotation generating means for generating the rotation of said drive shaft in the second direction when the transmission of the rotation to said separation means is interrupted by said rotation control means; and wherein said support means shifts said feeding means from the sheet convey position to the non-convey position by the rotation in the second direction generated by said rotation generating means.

26. An image reading apparatus according to claim 25, wherein said rotation generating means comprises transmission means for transmitting the rotation in the second direction to said drive shaft and a torque limiter disposed between said transmission means and said drive shaft, said torque limiter having a torque limit value at which the transmission of rotation in the second direction is interrupted when the rotation in the first direction is transmitted to said separation means, but is transmitted to said drive shaft when the transmission of the rotation in the first direction is interrupted by said rotation control means.

27. An image reading apparatus according to claim 26, wherein said torque limiter comprises a spring clutch.

28. An image reading apparatus according to claim 25, wherein said rotation generating means comprises transmission means for transmitting the rotation in the second direction to said drive shaft and a friction transmitting member disposed between said transmission means and said drive shaft, said friction transmitting member slips and interrupts the transmission of the rotation in the second direction when the rotation in the first direction is transmitted to said separation means, but is transmitted to said drive shaft when the transmission of the rotation in the first direction is interrupted by said rotation control means.

29. An image reading apparatus according to claim 25, wherein said rotation generating means comprises a cam in frictional contact with said drive shaft and biasing means for applying to said cam a rotational force for rotating said drive shaft in the second direction, said cam being designed to be rotated to balance with a biasing force of said biasing means by frictional contact with said drive shaft when the rotation is transmitted to said separation means by said rotary transmission means, and causes said drive shaft to rotate in the second direction by a biasing force of said biasing means when the transmission of the rotation in the first direction to said separation means is interrupted by said rotation control means.

30. An image reading apparatus according to claim 21, wherein said retract means comprises bias means for biasing said support means toward a direction in which said feeding means is shifted to said non-convey position, said bias means having a biasing force for permitting said support means to shift said feeding means to the sheet convey position when the rotation is transmitted to said separation means by said rotary transmission means and causes said support means to shift said feeding means to said sheet non-convey position when the transmission of the rotation to said separation means is interrupted by said rotation control means.

31. An image reading apparatus according to claim 30, wherein said bias means comprises a spring.

32. An image reading apparatus according to claim 21, wherein a time period during which the sheet is conveyed from said separation means to said sheet convey means becomes shorter than a time period during which said feeding means is shifted from said non-convey position to said sheet convey position by said support means.

33. An image reading apparatus according to claim 32, wherein said support means comprises a pivotable support member for supporting said feeding means, a rotation transmitting member provided on said support member and adapted to transmit the rotation of said drive shaft to said feeding means, and a friction means for generating a load for pivoting said support member by the rotation transmitted by said rotation transmitting member, means for setting said timing comprises a timing plate for causing said friction means to generate the load when a predetermined time is elapsed after the rotation is transmitted by said rotation transmitting means.

34. An image reading apparatus according to claim 21 or 22, wherein support means includes a cleaning means for cleaning said separation means, and wherein said cleaning means is shifted to a position where said separation means is cleaned by said cleaning means as said feeding means is shifted from said sheet convey position to said non-convey position.

* * * * *

UNITED STATES PATENT AND TRADEMARK OFFICE
CERTIFICATE OF CORRECTION

PATENT NO. : 5,423,526
DATED : June 13, 1995
INVENTOR(S) : KAZUHIKO HASEGAWA

It is certified that error appears in the above-indentified patent and that said Letters Patent is hereby corrected as shown below:

Title page, item [56];
    line 4, "3216428 9/1991 Japan" should read --3-216428 9/1991 Japan--.

Title page, item [57];
    line 2, "tacked" should read --stacked--.

Column 1,
    line 49, "the-separa-" should read --the separa- --.

Column 4,
    line 33, "pre sent" should read --present--.

Column 5,
    line 9, "a" should be deleted; and
    line 23, "direct ion" should read --direction--.

Column 11,
    line 22, "sheets s" should read --sheets S--.

Column 18,
    line 65, "plate" should read --plate,--.

Signed and Sealed this

Tenth Day of October, 1995

*Attest:*

BRUCE LEHMAN

*Attesting Officer*     Commissioner of Patents and Trademarks